US012631881B2

(12) United States Patent
McGrew et al.

(10) Patent No.: US 12,631,881 B2
(45) Date of Patent: May 19, 2026

(54) NEAR-EYE DISPLAY BASED ON CONICAL DIFFRACTION

(71) Applicant: Vuzix Corporation, West Henrietta, NY (US)

(72) Inventors: Stephen P. McGrew, Spokane, WA (US); Elliot Burke, Santa Barbara, CA (US); Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 814 days.

(21) Appl. No.: 17/794,251

(22) PCT Filed: Jan. 20, 2021

(86) PCT No.: PCT/US2021/014214
§ 371 (c)(1),
(2) Date: Jul. 20, 2022

(87) PCT Pub. No.: WO2021/150627
PCT Pub. Date: Jul. 29, 2021

(65) Prior Publication Data
US 2023/0050198 A1 Feb. 16, 2023

Related U.S. Application Data

(60) Provisional application No. 62/963,482, filed on Jan. 20, 2020.

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1842* (2013.01); *G02B 5/32* (2013.01); *G02B 27/4205* (2013.01); *G02B 2027/0174* (2013.01)

(58) Field of Classification Search
CPC .... G02B 27/0172; G02B 5/1842; G02B 5/32; G02B 27/4205; G02B 2027/0174; G02B 6/00; G02B 30/50
See application file for complete search history.

(56) References Cited

U.S. PATENT DOCUMENTS

2006/0126181 A1 6/2006 Levola
2006/0291021 A1 12/2006 Mukawa
(Continued)

OTHER PUBLICATIONS

Kim et al. (2018) "Photonic Waveguide to Free-Space Gaussian Beam Extreme Mode Converter," Light: Science & Applications 7(72): 1-13.
(Continued)

*Primary Examiner* — Charles S Chang
(74) *Attorney, Agent, or Firm* — Harter Secrest & Emery LLP; Jacob D. Merrill, Esq.

(57) ABSTRACT

A near-eye display system that employs a volume holographic element containing distinct but overlapped planar volume gratings, each corresponding to a subset of pixels in the display. The volume gratings are illuminated using light incident from angles, and at wavelengths, that match the conical diffraction conditions for each grating, thereby achieving both high diffraction efficiency and a wide field of view. A single volume grating can thus be used to display thousands of pixels independently with high efficiency.

20 Claims, 49 Drawing Sheets

(51) Int. Cl.
    *G02B 5/32*         (2006.01)
    *G02B 27/42*     (2006.01)

(56)                References Cited

U.S. PATENT DOCUMENTS

| | | |
|---|---|---|
| 2011/0122469 A1 | 5/2011 | Dickson et al. |
| 2012/0154881 A1 | 6/2012 | Gruhlke et al. |
| 2015/0260993 A1 | 9/2015 | Bickerstaff et al. |
| 2016/0238772 A1 | 8/2016 | Waldern et al. |
| 2018/0284466 A1* | 10/2018 | Moebius ................. G02F 1/335 |
| 2019/0271944 A1* | 9/2019 | Cormier ................. G03H 1/265 |
| 2021/0223738 A1* | 7/2021 | Futterer ................. G03H 1/268 |

OTHER PUBLICATIONS

Nikolay et al. (2017) "New Photo-Thermo-Refractive Glasses for Holographic Optical Elements: Properties and Applications," Chapter 19 in Holographic Materials and Optical Systems: 435-461.

* cited by examiner

3700

NEAR-EYE DISPLAY BASED ON CONICAL DIFFRACTION

TECHNICAL FIELD

The present disclosure relates generally to display systems such as near-eye display systems including augmented reality (AR) glasses, head-mounted displays (HMDs), and the like, and more specifically to near-eye display systems in which volume Bragg gratings direct light therefrom.

BACKGROUND

The images presented by head-worn near-eye displays are typically generated in positions that are offset from a wearer's eyes, such as along the temples of eyeglasses, and waveguides convey the images to eyeboxes within which the pupils of the wearer's eyes are expected to be located. The eyeboxes themselves are generally arranged as pupils of the near-eye display systems within which the generated images are visible as virtual images appearing at a distance in front of the wearer's eyes.

Holographic elements are among the elements which can be used for directing light into or out of the waveguides in a fashion that generally preserves desired angular relationships among beams producing the virtual images. While contributing to compact, lightweight designs, the holographic elements tended to limit imaging performance including combinations of image resolution and field of view (FOV), which require the conveyance of large ranges of densely spaced angularly related beams.

Various other constraints, including those imposed by transmissive waveguides that convey light within limited angular ranges supported by the mechanism of total internal reflection (TIR), also present obstacles to conveying wide ranges of angles of light beams in two angular dimensions as required for displaying virtual images over wide fields of view. These constraints can be particularly problematic in augmented reality applications, where the generated images are limited to just a portion of the wearer's field of view of the ambient environment.

SUMMARY

Volume Bragg gratings (VBGs) operating under conditions of conical diffraction as presented in various embodiments described herein can overcome limitations relating to both image resolution and field of view (FOV) by encoding images in a new way. For example, instead of preserving the angular relationships among generated beams in two dimensions for conveying images along a waveguide to an eyebox, the generated beams can be encoded in a different angular format and further defined by otherwise incidental variations in wavelength.

The term "hoxel", as used in this disclosure, refers to a sub-hologram in a holographic optical element (HOE) consisting of a plurality of sub-holograms where the sub-holograms may be overlapped within the HOE. More specifically, a "hoxel" is a sub-hologram in an HOE, in which the sub-hologram comprises a collection of Bragg planes. The Bragg planes comprising a single hoxel have essentially the same orientation and spacing.

Multiplexed volume Bragg gratings can be constructed as a plurality of partially overlapping hoxels each comprising a set of Bragg planes operating under unique conical diffraction conditions involving both wavelength and incidence angle. The incidental variations in wavelength are preferably not readily perceivable by the wearer as changes of color but instead exploit the angular sensitivity of the hoxels to small variations in wavelength.

In accordance with the conical diffraction conditions, each hoxel exhibits diffraction-based reflection at a given incidence angle associated with a given wavelength, which angle is measured with respect to a conical axis that extends normal to the Bragg planes. The incidence angle at which light is subject to reflection varies significantly with even small changes in the illuminating wavelength. However, the reflections at each given incidence angle are rotationally symmetric about the conical axis.

As such, each hoxel is capable of reflecting light beams for producing a subset of pixels within an image, where one nonlinear dimension of pixel position is defined by different rotational angles around the conical axis and a second nominally perpendicular dimension of pixel position is defined by the different incidence angle and wavelength pairings at which reflection occurs in accordance with conical diffraction conditions. The orientation (tilt) and spacing (pitch or period) of the Bragg planes of overlapping hoxels can be set to reflect neighboring subsets of pixels or different color components of the image.

One example of a display apparatus for encoding and displaying images as disclosed herein includes a volume Bragg grating having at least one hoxel for reflecting light beams satisfying conical diffraction conditions with paired combinations of wavelength and incidence angle to a conical axis independently of a range of rotational angles about the conical axis. A controller together with an illuminator provides for generating an encoded form of the images by controlling both the rotational angles and the paired combinations of wavelength and incidence angle of the light beams reflected from the at least one hoxel.

The controller together with the illuminator can be arranged such that one or more pixels of the images in the generated encoded form is associated with a change in the incidence angle along with a corresponding change in the wavelength of the light beams for satisfying the conical diffraction conditions. The controller together with the illuminator can also be arranged such that one or more other pixels of the images in the generated encoded form is associated with a change in the rotational angle of the light beams otherwise satisfying the conical diffraction conditions. The illuminator may include a light source and a beam steering device to direct the light beams into the volume Bragg grating over one or more ranges of incidence and rotational angles as well as over one or more wavelength bands.

The at least one hoxel can be one of a plurality of hoxels within the volume Bragg grating, which can include a first hoxel and a second hoxel that at least partially overlap each other within the volume Bragg grating and have different conical diffraction conditions for generating different portions of the images. Each of the first and second hoxels can be formed as a plurality of Bragg planes having respective first and second conical axes oriented normal to their Bragg planes. For directing light to different portions of the images, the first and second conical axes can be oriented in different directions and the spacing of their respective Bragg planes can also differ. While generally overlapping for forming adjacent portions of the images, the first and second hoxels can also be limited in size and shape and relatively offset to minimize the amount of overlap and provide for more efficiently filling a common eyebox. That is, the areas of the respective hoxels can be limited to areas that tend to direct light beams into the common eyebox over the range of pixels supported by each hoxel.

While a much larger number of hoxels may be needed for displaying high resolution images over large fields of view, the number of hoxels needed especially in conditions of overlap is reduced in accordance with a range of incidence angles that satisfy the conical diffraction conditions of respective hoxels through the incidental variations in wavelength. That is, since each hoxel can contribute to illuminating a plurality of pixels defined by variations in both the rotational angle and the wavelength at which different incidence angles satisfy the conical diffraction condition, the number of hoxels required for displaying high resolution images over large fields of view is greatly reduced. The ranges of pixels in two dimensions that can be illuminated by each hoxel also reduces the number of hoxels subject to overlap within a given volume for preserving adequate diffraction efficiencies of the individual hoxels.

The illuminator can be arranged for emitting light within discrete wavelength bands associated with the different hoxels so that at any given incidence angle within the ranges of incidence angles intended to be reflected by the first and second hoxels, the light beams are reflected from only one of the first and second hoxels. However, where desired, the incidental wavelengths together with the Bragg plane spacing and relative orientation can be controlled so that more than one hoxel contributes to illuminating individual pixels. The discrete wavelength bands for controlling angular outputs or the hoxels can be limited such that variations in wavelength within the bands are not readily discernable as changes in color. However, even small variations in wavelength over a few tens of nanometers, e.g., 40 nanometers, can change the incidence angles at which light is reflected from respective hoxels by one or more degrees.

For displaying high resolution images over a wide field of view, a much larger number of hoxels can be used in configurations that provide more freedoms for converting generated light beams into the desired images, including by using incidental variations in wavelength to reflect light through different incidence angles. For example, by controlling the spacing and orientation of the Bragg planes of the different hoxels together with the angular and spectral output of the illuminator, where incidental variations in spectral output influence the angular reflections and more significant variations in spectral output are managed for displaying different colors, high resolution color images can be displayed over a wide field of view, e.g., as large as 90 degrees vertical and 100 degrees horizontal.

For use in augmented reality eyewear, the hoxels may be formed as a part of, or in association with, transmissive waveguides, including such waveguides for conveying images generated in positions that are offset from the wearer's eyes. The hoxels can be formed within the volume of the waveguide, within one or more components associated with the waveguide, or within another type of light conveyance in arrangements for directing light into an eyebox in alignment with the wearer's eye. However, instead of generating images from the offset position in a form that can be readily viewed through a pupil, which requires a full complement of angles in two dimensions, the controller together with the illuminator for directing light to the hoxels encodes images in a different form having more flexibility for using different sets of angles that no longer represent readily viewable images. The hoxels themselves can vary in the orientation and spacing of their Bragg planes and are further responsive to incidental variations in wavelength for expanding the range of angles that can be reflected from individual hoxels while distinguishing the angular responses from different hoxels. For example, the Bragg plane orientations of respective hoxels can be progressively varied to expand angular output with respect to angular input of light beams in the dimension of the progressive variation while progressive incidental changes in the wavelengths of the light beams intended for reflection from individual hoxels can provide for more finely selecting among the angular outputs of individual hoxels that satisfy conical diffraction conditions. Thus, instead of preserving a prescribed set of angles in two dimensions, the embedded hoxels work in conjunction with the illuminator and controller to output viable images that are originally encoded in terms of both angle and wavelength. As such, light beams organized into a prescribed set of angles for viewing an image are not required for input into the embedded hoxels. Instead, light beams from an illuminator can be configured in a different way for overcoming angular-based limitations and thereby expanding the field of view of the displayed images.

The Bragg planes of the individual hoxels that are embedded into the waveguide, into a component associated the waveguide, or into another type of optical conveyance can be formed by recording interference structures into a recording medium such as a photopolymer or photothermal refractive glass. For example, actinic radiation in the form of two mutually coherent and collimated laser beams can be directed at selected angles into the recording medium for producing interference patterns matching the desired orientation and spacing of the desired Bragg planes. Light energy concentrated into evenly spaced planes of constructive interference produces corresponding changes in the refractive index of the recording medium in the pattern of Bragg gratings. One or more masks interposed between the recording medium and one or both coherent beams can be used to control the shape and size of each hoxel and thereby eliminate any unnecessary overlap between hoxels for filling a common eyebox. The thickness or depth of each hoxel, which relates directly to the number of Bragg planes within each hoxel, can be set in accordance with requirements for diffraction efficiency and angular selectivity. For certain envisioned applications, hoxel depths can range from 0.05 to 5 millimeters. The amount of refractive index modulation within the recording medium can also be controlled to optimize diffraction efficiencies.

The hoxels define a volume Bragg grating that can be formed within a waveguide, within a component associated with the waveguide, or within another type of optical conveyance. Each of the one or more hoxels can be arranged to fill the eyebox with a range of angularly related beams corresponding to a certain set of pixels within an image. Each such angularly related beam is defined by a given rotational angle about the conical axis of the hoxel as well as by a given incidence angle and wavelength pairing meeting the conical diffraction conditions of the hoxel. The multiple angularly related beams capable of being reflected by the hoxel to the eyebox can be delivered individually or in groups depending upon the capabilities of the illuminating system to deliver beams at different angles and wavelengths that satisfy the conical diffraction conditions of the hoxel.

Various kinds of apparatus can be used for delivering beams of varying intensity that satisfy the conical diffraction conditions of individual hoxels including light sources of varying wavelength coupled with beam steering devices that can include, for example, one or more movable mirrors for directing collimated light in different directions. Alternatively, specularly or angularly diverse light can be filtered or otherwise selectively propagated for directing the portions of the light having the required angular and spectral characteristics to the individual hoxels for differentially illuminating pixels of the desired images.

A method of encoding and displaying images as disclosed herein includes (a) reflecting light beams satisfying conical diffraction conditions of at least one hoxel of a volume Bragg grating with paired combinations of wavelength and incidence angle to a conical axis of the at least one hoxel over a plurality of rotational angles about the conical axis, and (b) generating the light beams in an encoded form of the images by controlling both the rotational angles and the paired combinations of wavelength and incidence angle of the light beams reflected from the at least one hoxel.

The step of generating the light beams can include generating light beams having different incidence angles along with different wavelengths collectively satisfying the conical diffraction conditions for encoding different pixels within the images. The step of generating the light beams can also include generating such light beams satisfying the conical diffraction conditions of the at least one hoxel at different rotational angles about the conical axis of the at least one hoxel for displaying a two-dimensional arrangement of pixels within the images. The step of reflecting can include reflecting the light beams satisfying the conical diffraction conditions of the at least one hoxel into a common eyebox within which the images can be seen.

For displaying larger images or larger portions of the images involving more pixels, the at least one hoxel can be one of a plurality of hoxels within the volume Bragg grating, which can include a first hoxel and a second hoxel that at least partially overlap each other within the volume Bragg grating and have different conical diffraction conditions for generating different portions of the images. In addition, the first and second hoxels can have respective first and second conical axes that are relatively inclined to one another. The first and second conical axes can be defined as normals to respective first and second sets of Bragg planes that differ from one another in periodicity, i.e., the spacing between their respective Bragg planes.

Especially where the volume Bragg grating contains a larger plurality of hoxels, the number of hoxels overlapping within any given volume of the volume Bragg grating can be minimized to preserve adequate diffraction efficiencies of the individual hoxels. For example, the hoxels can be limited in size and shape and relatively offset to minimize the amount of overlap in accordance with respective requirements for filling without unnecessarily overfilling a common eyebox. That is, the size, shape, and relative position of each hoxel can be limited to regions of the volume Bragg grating that tend to direct light beams into the common eyebox over the range of pixels supported for display by each hoxel. The number of pixels that are supported for display by individual hoxels subject to overlap can also be maximized to limit the number of overlapping hoxels. For example, the number of rotational angles about the conical axes of the individual hoxels and the number of incidental wavelengths and associated incidence angles meeting the conical diffraction conditions can be maximized for supporting the display of a larger number of pixels. The amount of overlap affecting the diffraction efficiency of individual hoxels can also be minimized by using multiple volume Bragg gratings having separate volumes within which the hoxels are formed. In at least one envisioned application, the number of hoxels subject to overlap within a common volume is limited to three hoxels.

6

BRIEF DESCRIPTION OF THE DRAWING FIGURES

The accompanying drawings are incorporated herein as part of the specification. The drawings described herein illustrate embodiments of the present disclosure and are illustrative of selected principles and teachings thereof. However, the drawings do not illustrate all possible implementations of the presently disclosed subject matter and are not intended to limit the scope of the present disclosure in any way.

Figure 7:
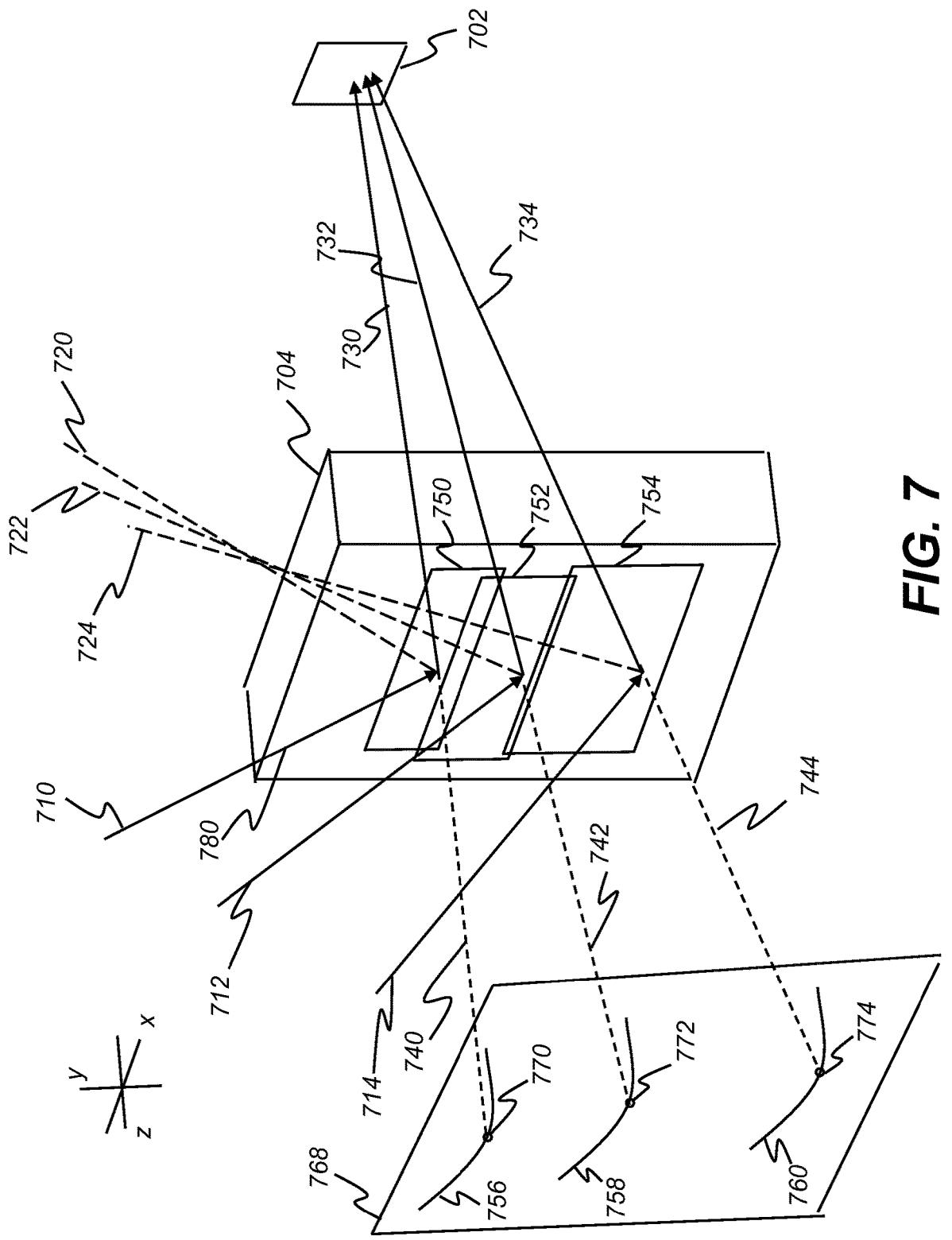

FIG. 7 illustrates a perspective view of an optical diagram of a transmissive volume Bragg grating having three partially overlapping hoxels arranged for use in a near-eye display showing incident and diffraction reflected beams of the three hoxels at a common rotational angle for displaying central pixels of three vertically displaced arcs in a plane at optical infinity according to an embodiment of the present disclosure.

Figure 8:
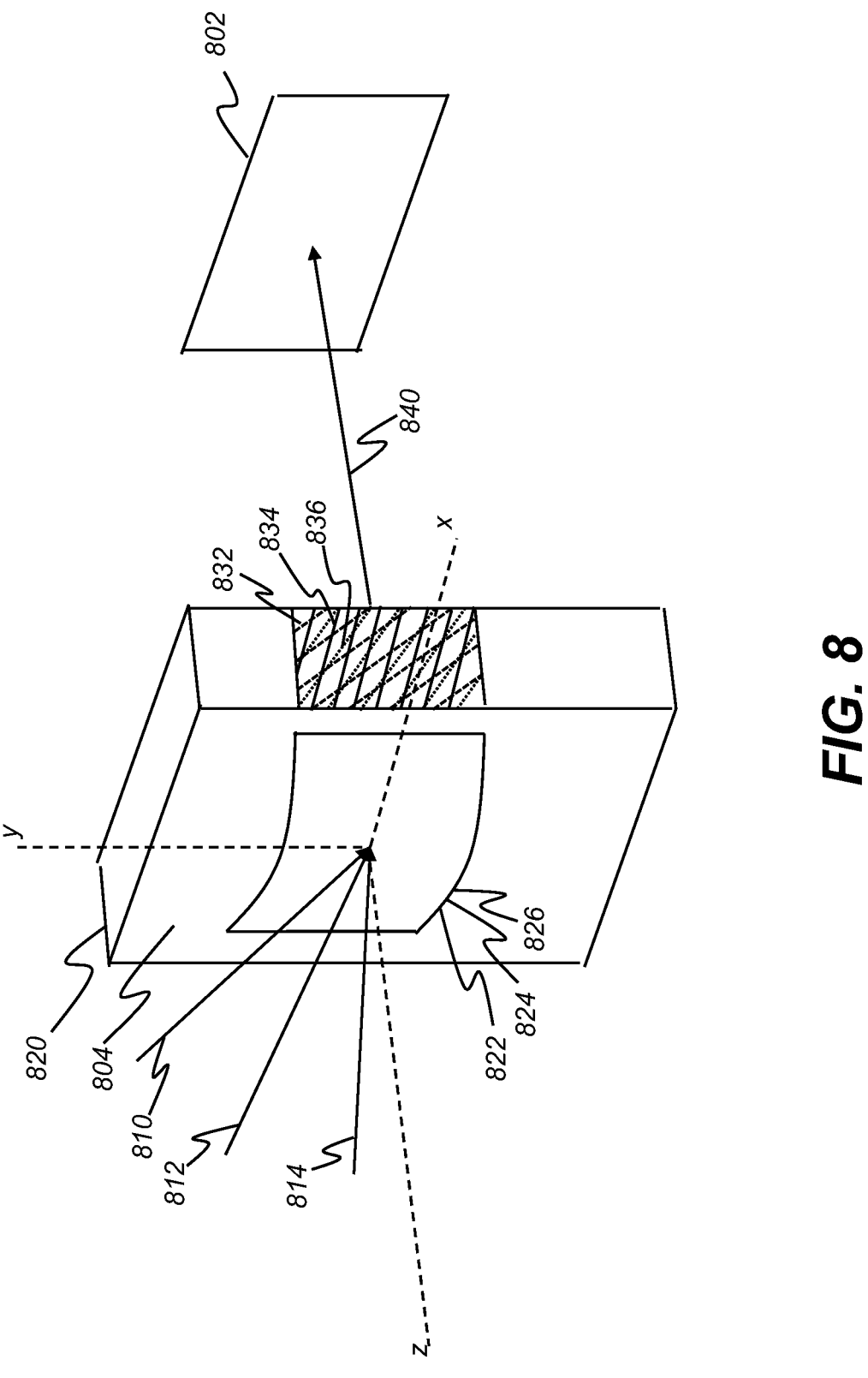

FIG. 8 illustrates a perspective view of an optical diagram of a transmissive volume Bragg grating having three overlapping hoxels arranged for use in a full-color near-eye display showing three angularly related incident beams having respective wavelengths corresponding to different additive colors forming a common diffraction reflected beam that is directed to an eyebox according to an embodiment of the present disclosure.

Figure 9:
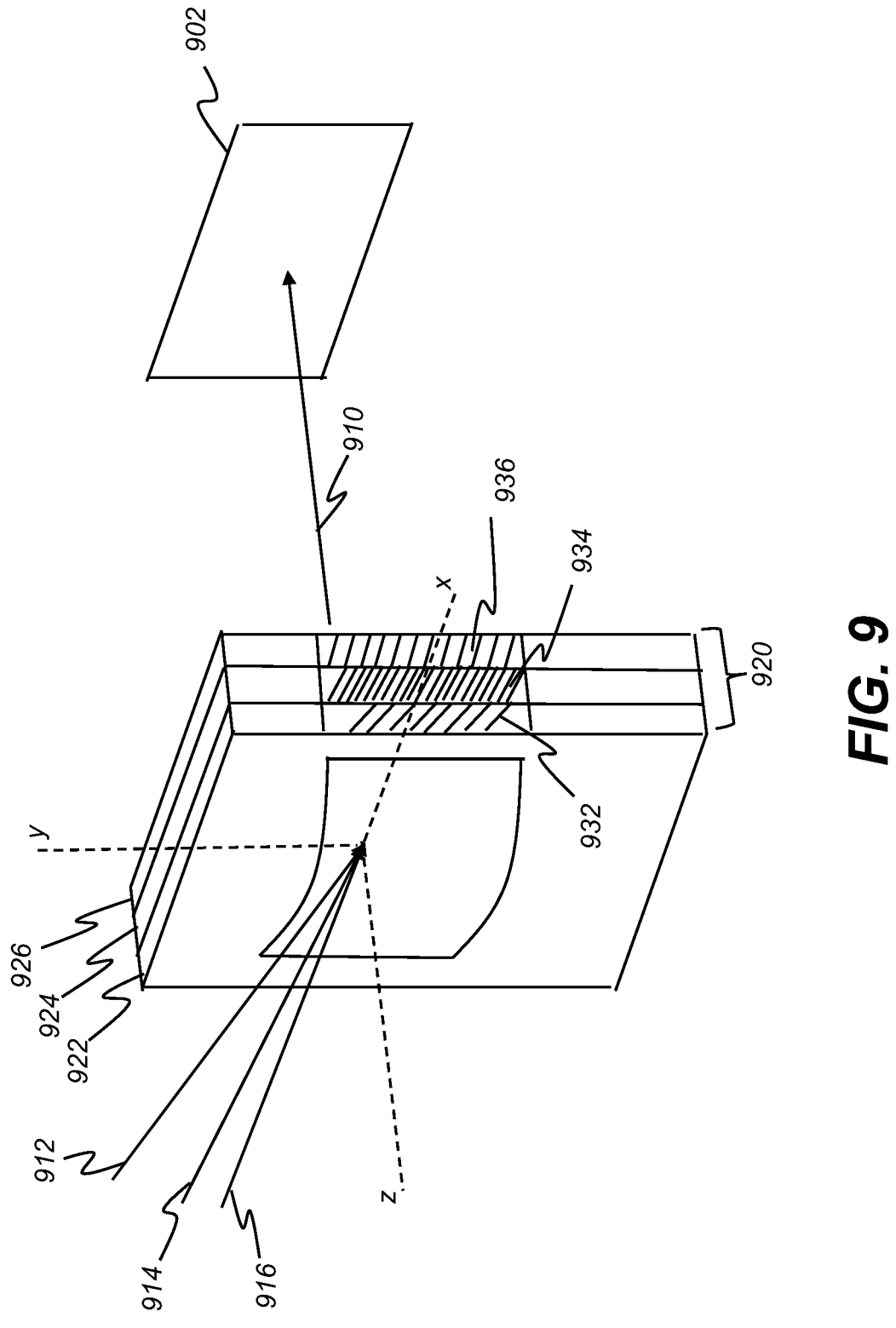

FIG. 9 illustrates a perspective view of an optical diagram of a compound volume Bragg grating operating in a transmissive mode and assembled in layers for use in a full-color near-eye display showing three angularly related incident beams having respective wavelengths corresponding to different additive colors forming a common diffraction reflected beam that is directed to an eyebox according to an embodiment of the present disclosure.

Figure 10:
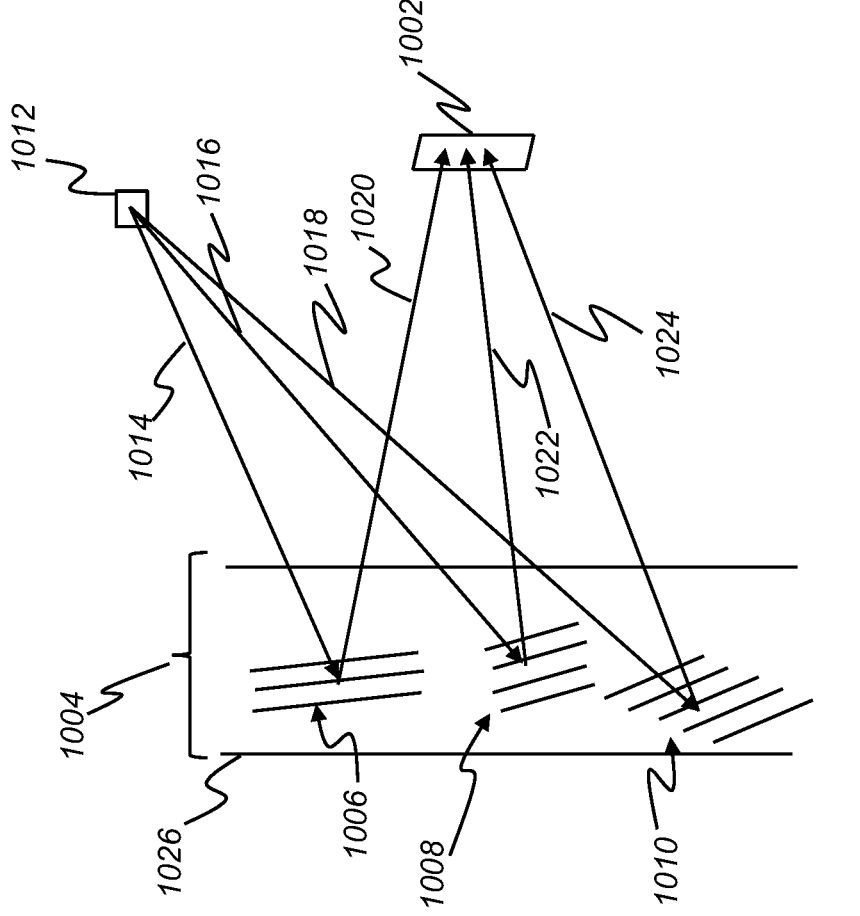

FIG. 10 illustrates illumination and diffraction reflection from different Bragg planes in a reflection hologram configuration according to an embodiment of the present disclosure.

Figure 11:
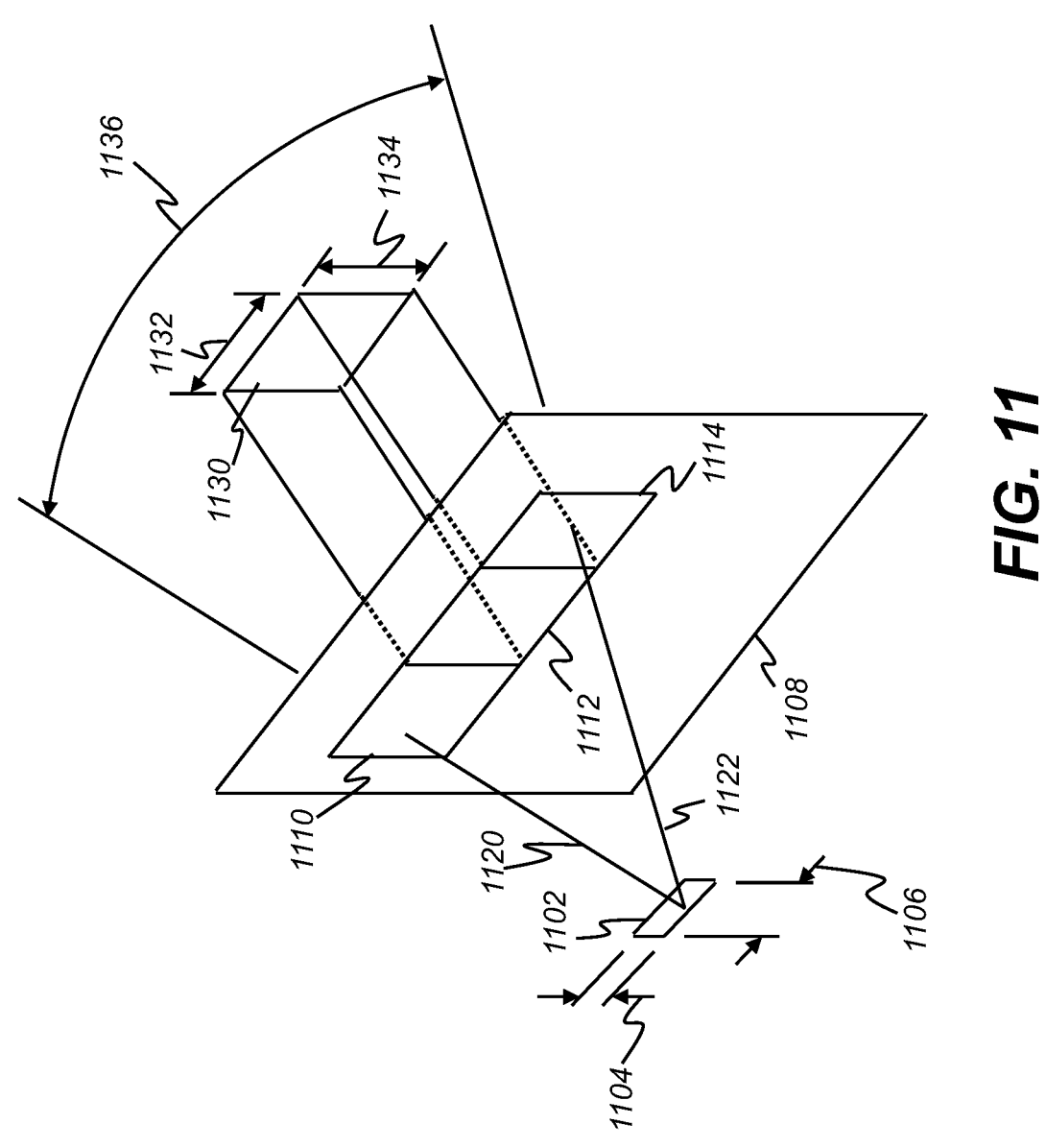

FIG. 11 illustrates a perspective view of an optical diagram showing the width of an eyebox being dependent on the width of an illumination beam according to an embodiment of the present disclosure.

Figure 12A:
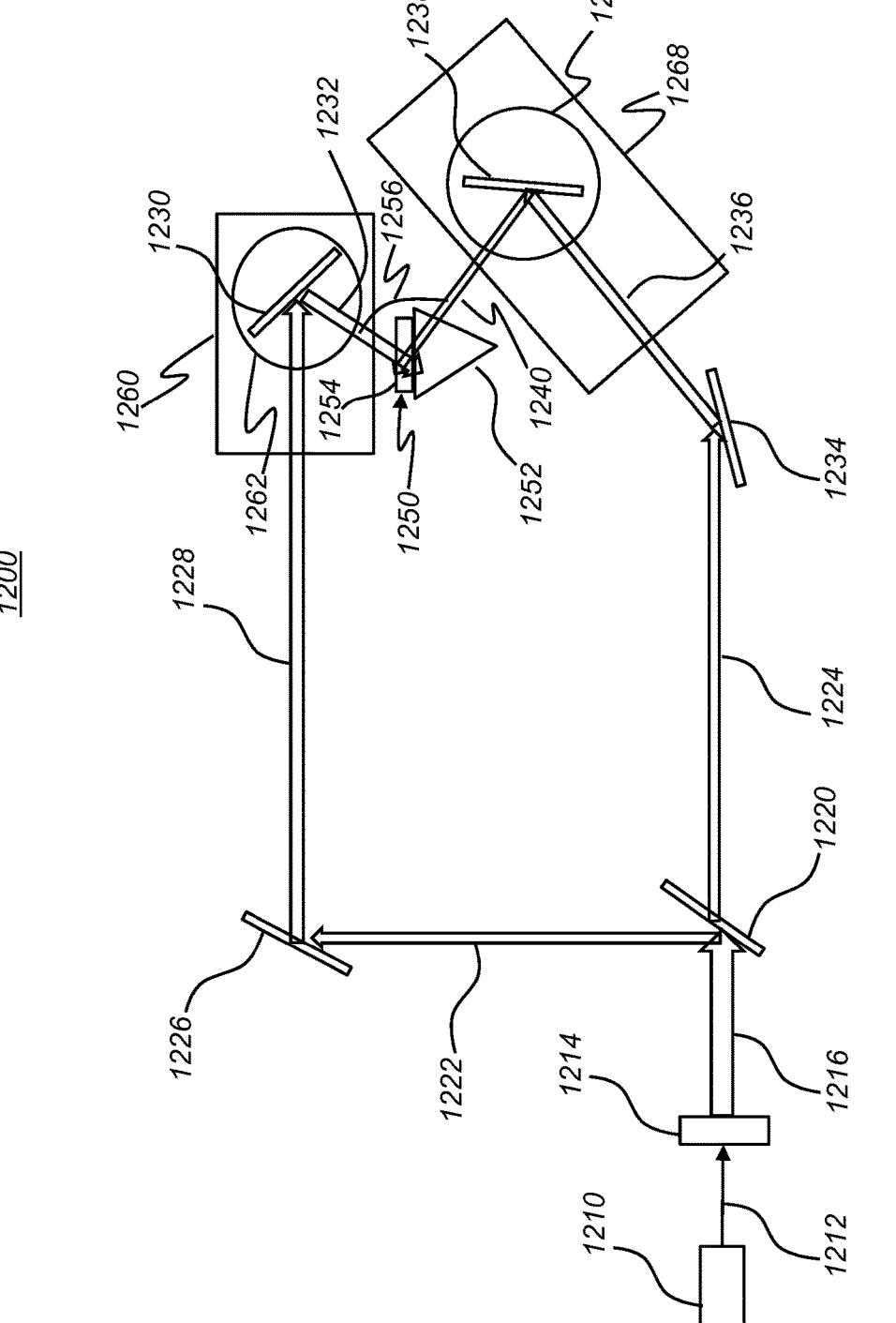
Figure 12B:
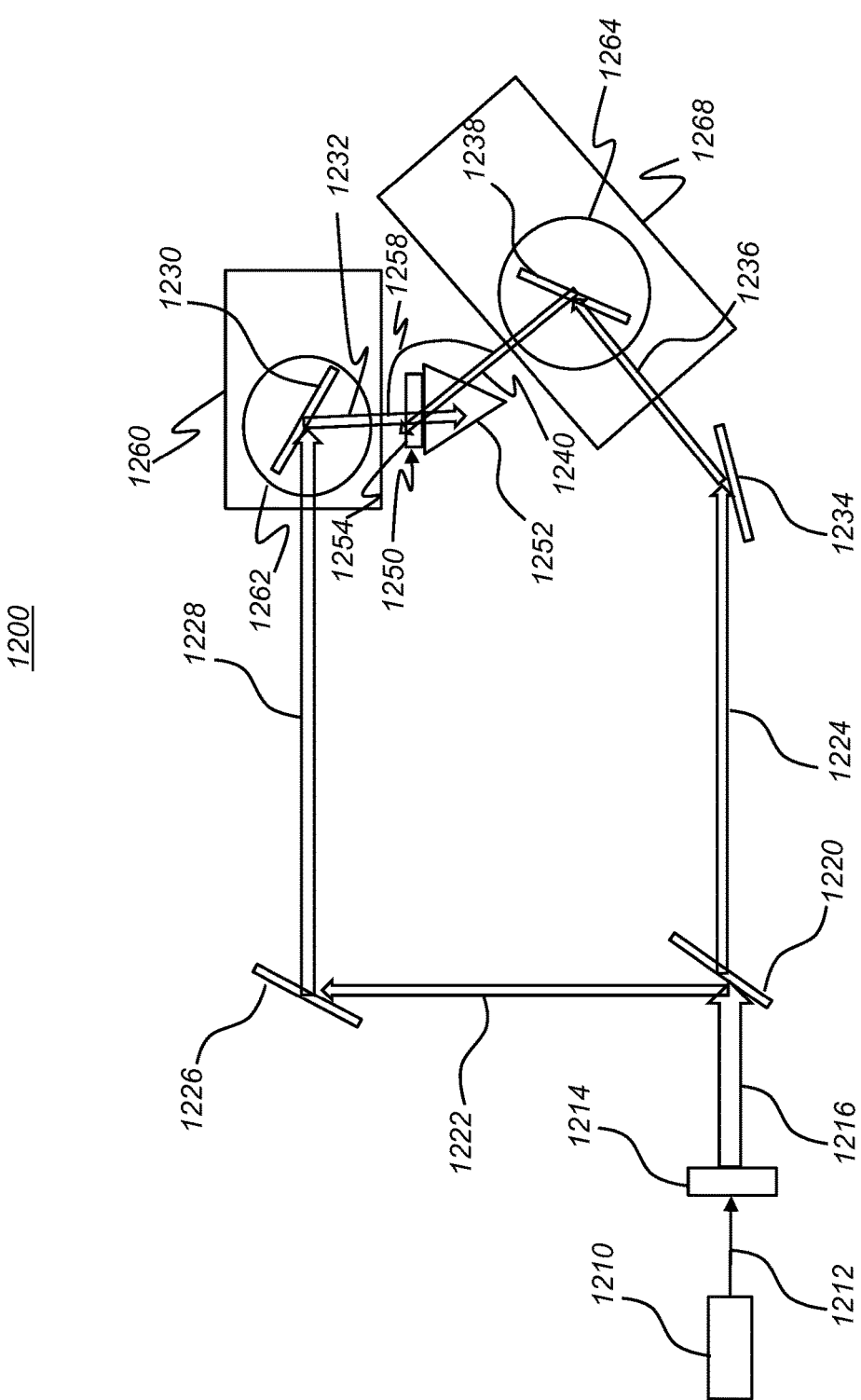

FIG. 12A and FIG. 12B illustrate schematics of a holographic recording system having adjustable optical components and a prism operable to recode TIR-reconstructable Bragg gratings according to an embodiment of the present disclosure.

Figure 13:
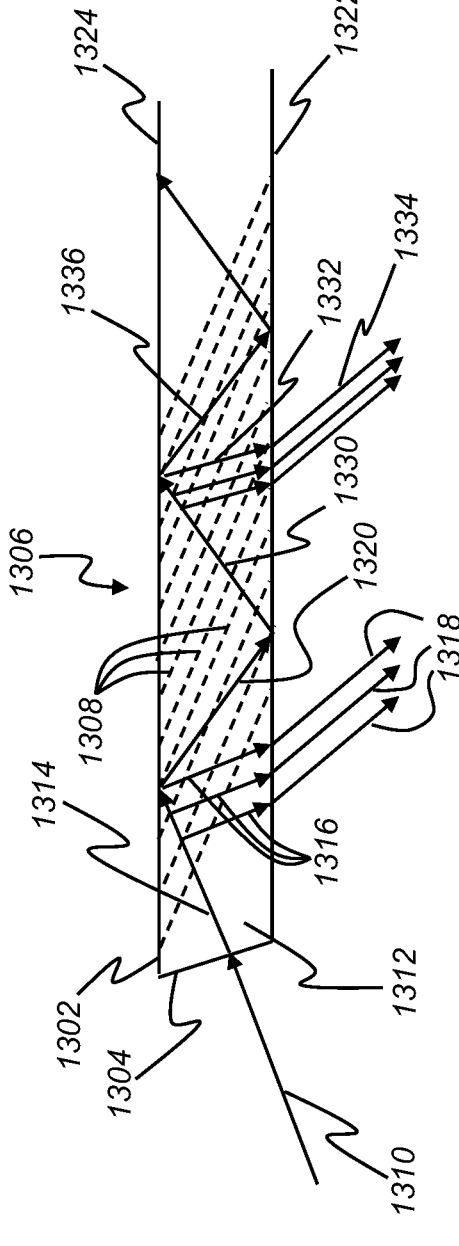

FIG. 13 illustrates an elevational view showing TIR injection of an illumination beam into a volume holographic grating, and diffraction of the illumination beam by Bragg planes in the volume holographic grating according to an embodiment of the present disclosure.

Figure 14:
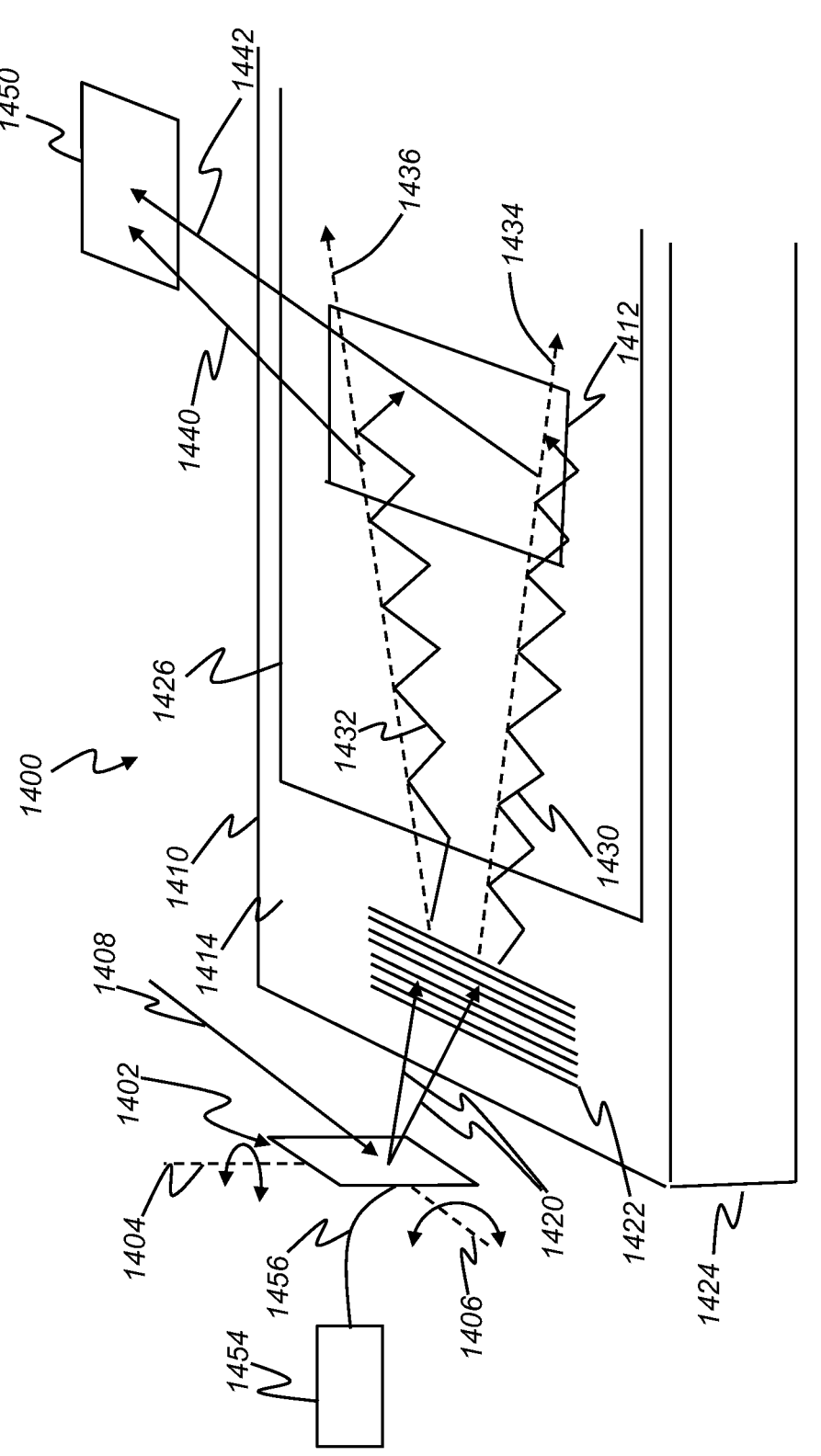

FIG. 14 illustrates a perspective view showing injection of illumination beams via a tiltable micromirror and an input coupler into a substrate having a volume hologram, and resultant diffraction into an eyebox according to an embodiment of the present disclosure.

Figure 15:
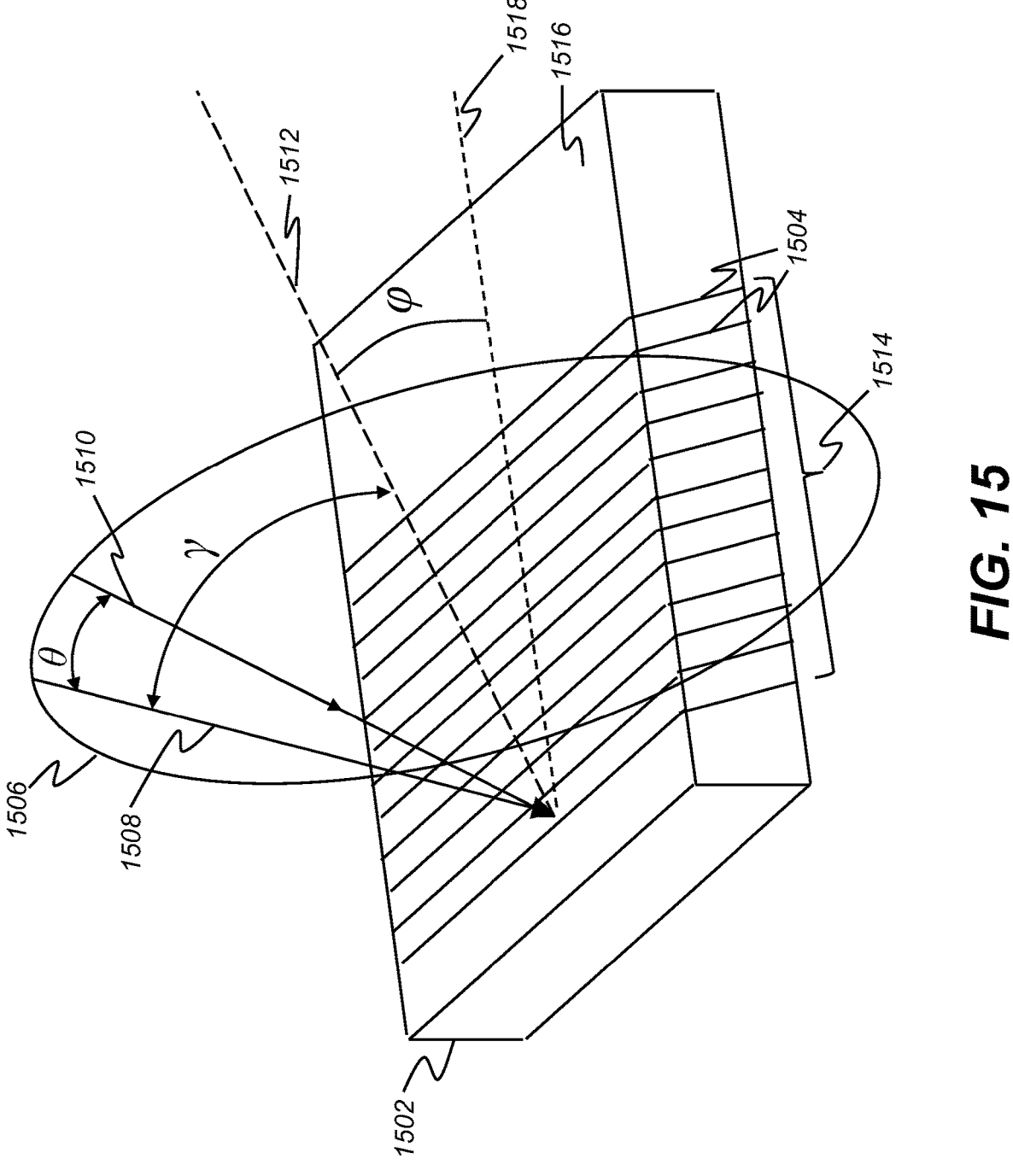

FIG. 15 illustrates a perspective view showing Bragg planes and their conical diffraction cones tilted relative to the surface of a recording medium according to an embodiment of the present disclosure.

Figure 16:
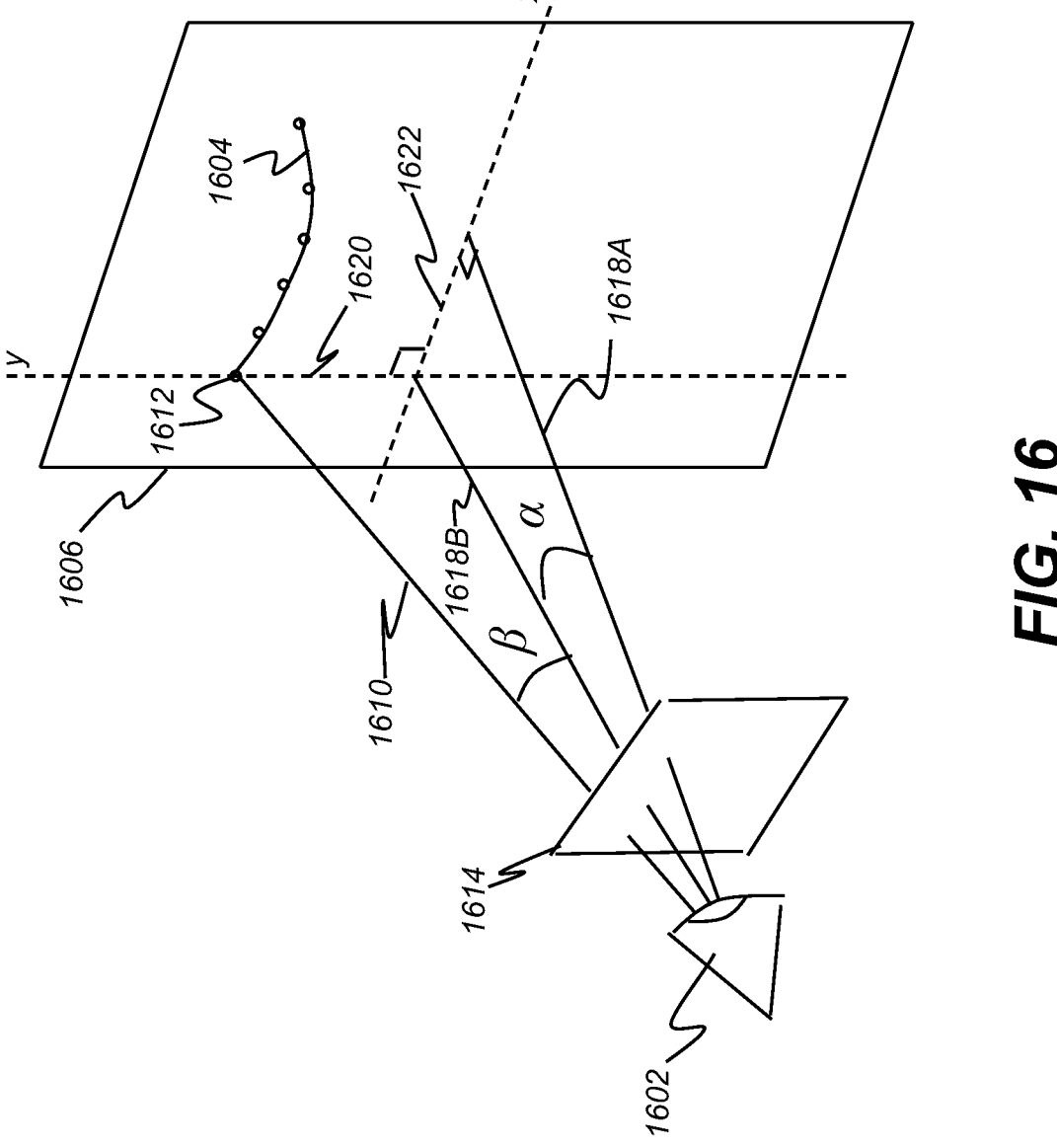

FIG. 16 illustrates a perspective view of an optical diagram showing a curved row of pixels at optical infinity addressed with Cartesian and angular coordinates according to an embodiment of the present disclosure.

Figure 17A:
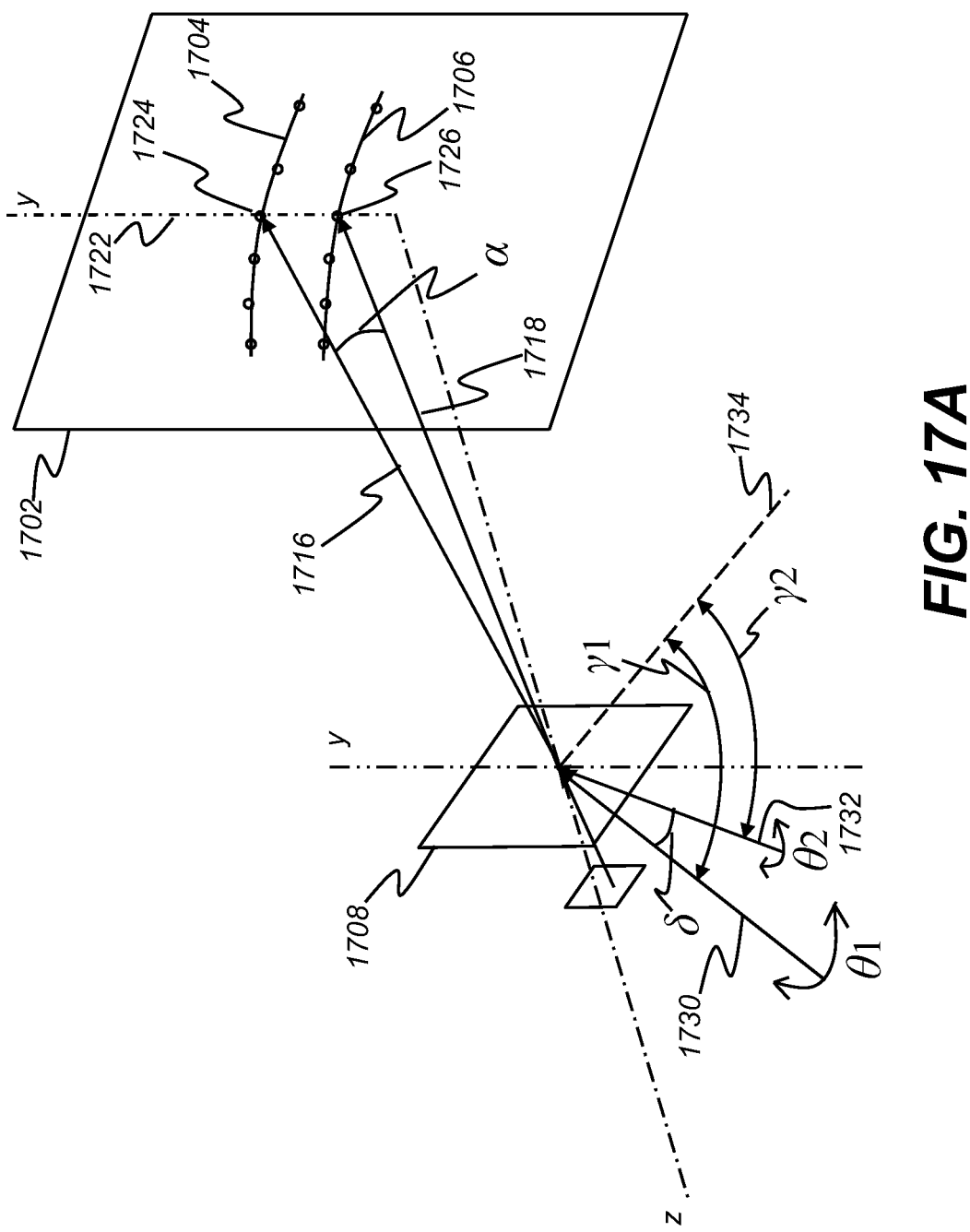
Figure 17B:
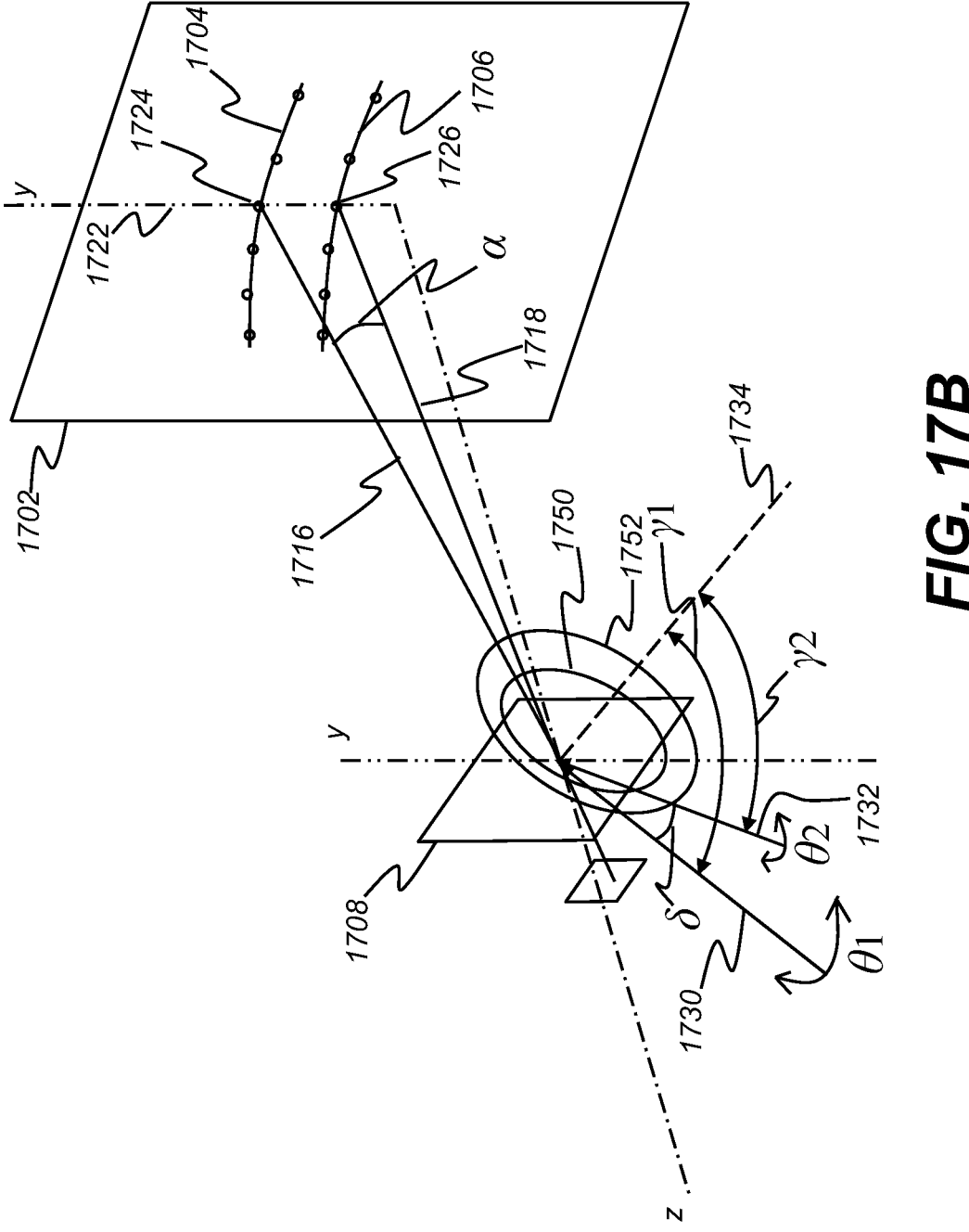

FIG. 17A and FIG. 17B illustrate perspective views of optical diagrams showing curved rows of pixels at optical infinity produced by illuminating one hoxel with multiple-wavelength illumination according to an embodiment of the present disclosure.

Figure 18:
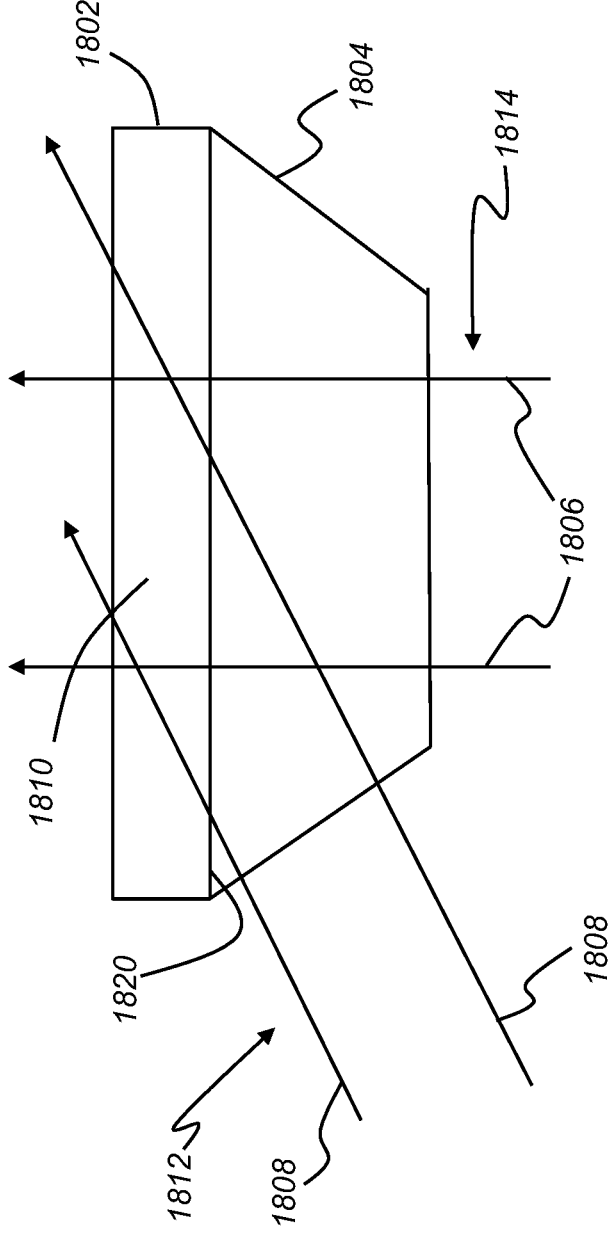

FIG. 18 illustrates an elevational view of object and reference beams incident onto a recording medium from the same side of a holographic recording medium, in the process of recording a transmission hologram according to an embodiment of the present disclosure.

Figure 19:
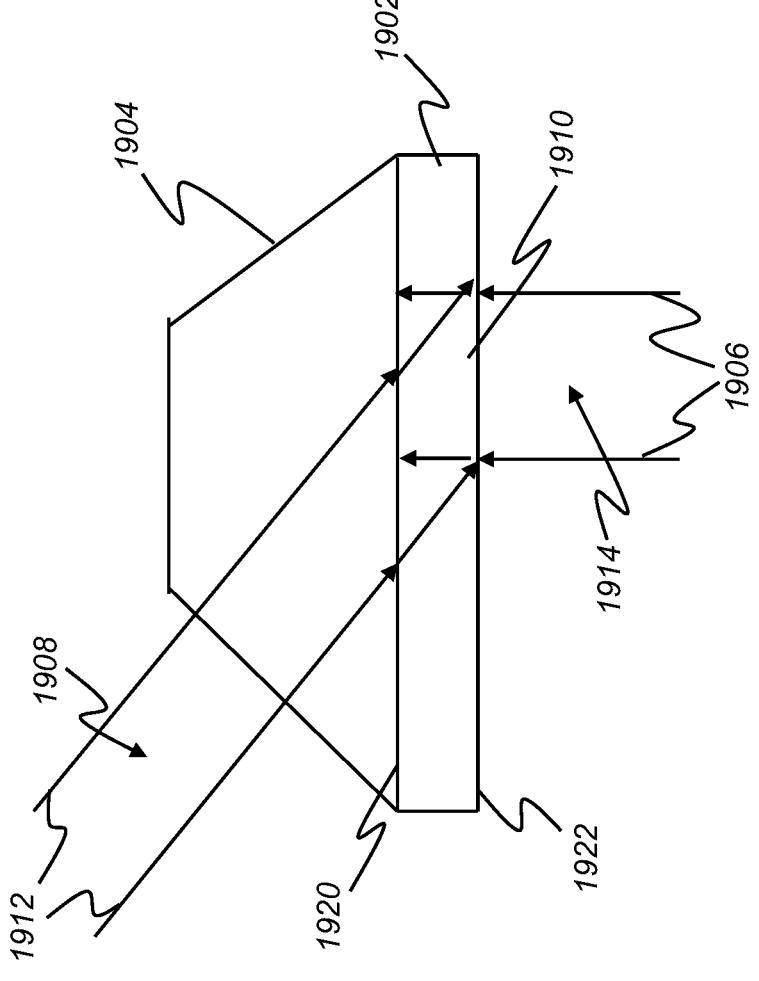

FIG. 19 illustrates an elevational view of object and reference beams incident onto a hologram recording medium from different sides of the holographic recording medium, in the process of recording a reflection hologram according to an embodiment of the present disclosure.

Figure 20A:
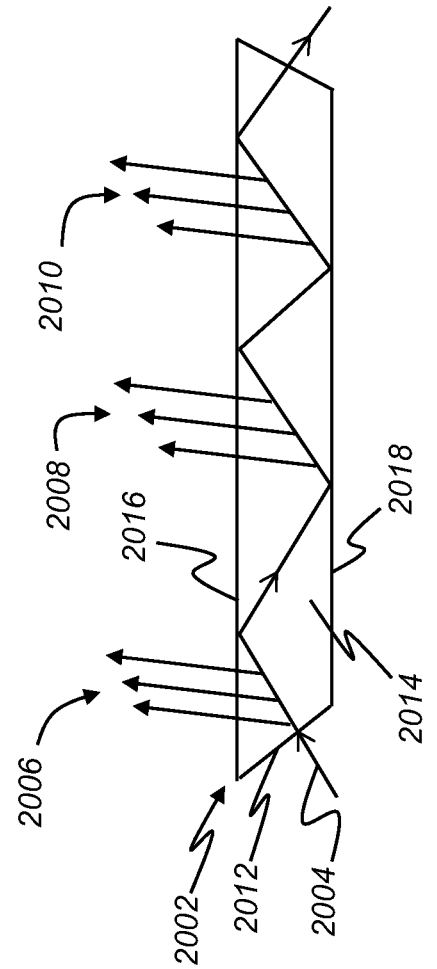
Figure 20B:
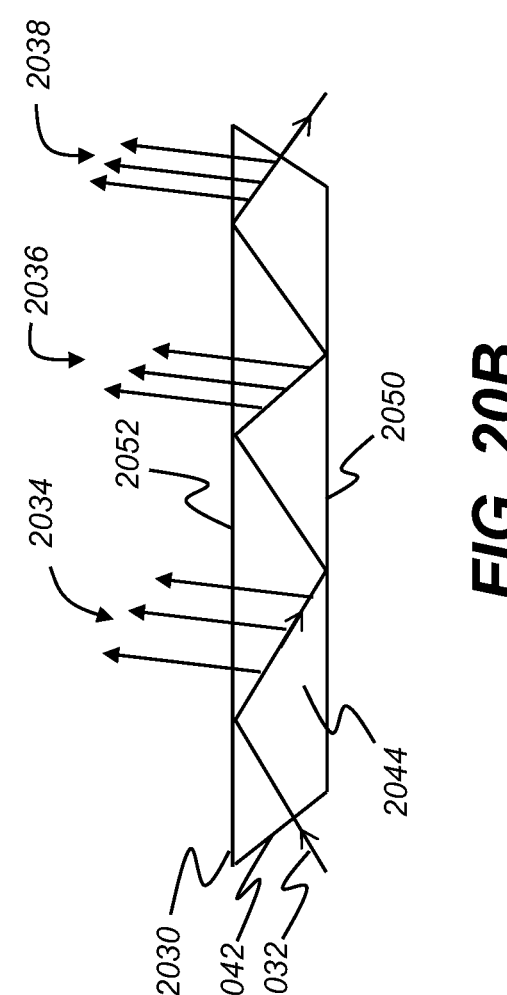

FIG. 20A and FIG. 20B illustrate elevational views showing the reference beam propagating through a volume hologram at a TIR angle and diffraction from transmission and reflection holograms according to an embodiment of the present disclosure.

Figures 21A, 21B:
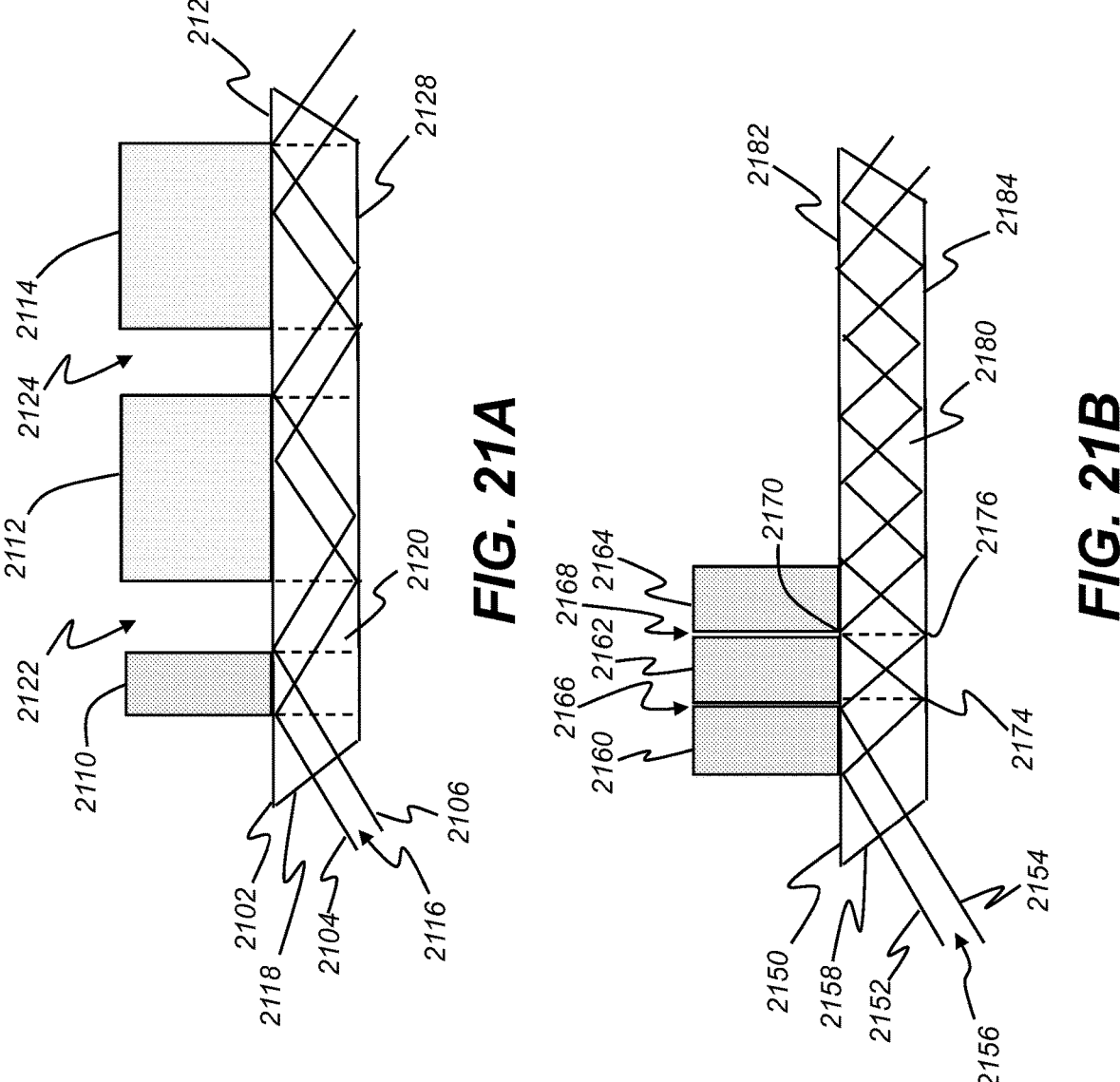

FIG. 21A and FIG. 21B illustrate elevational views showing illumination in TIR of the hologram and gaps between diffracted output beams according to an embodiment of the present disclosure.

Figure 22A:
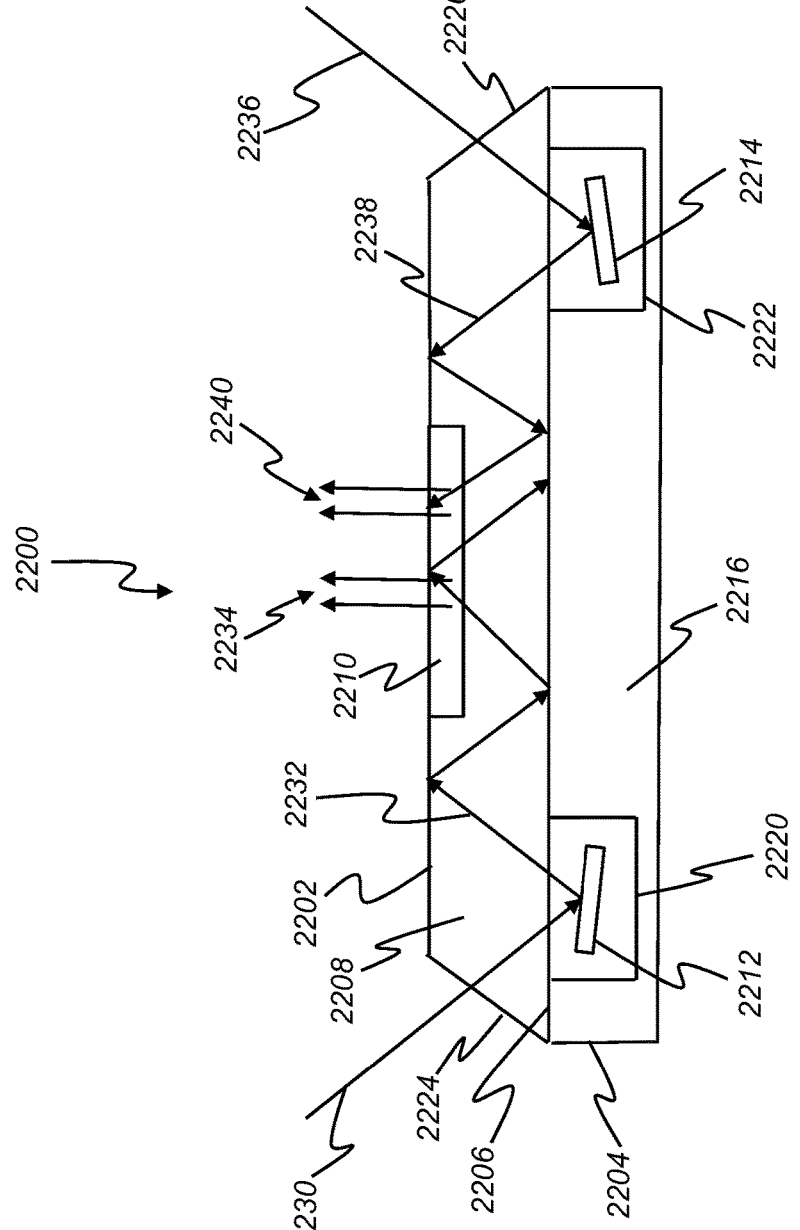
Figure 22B:
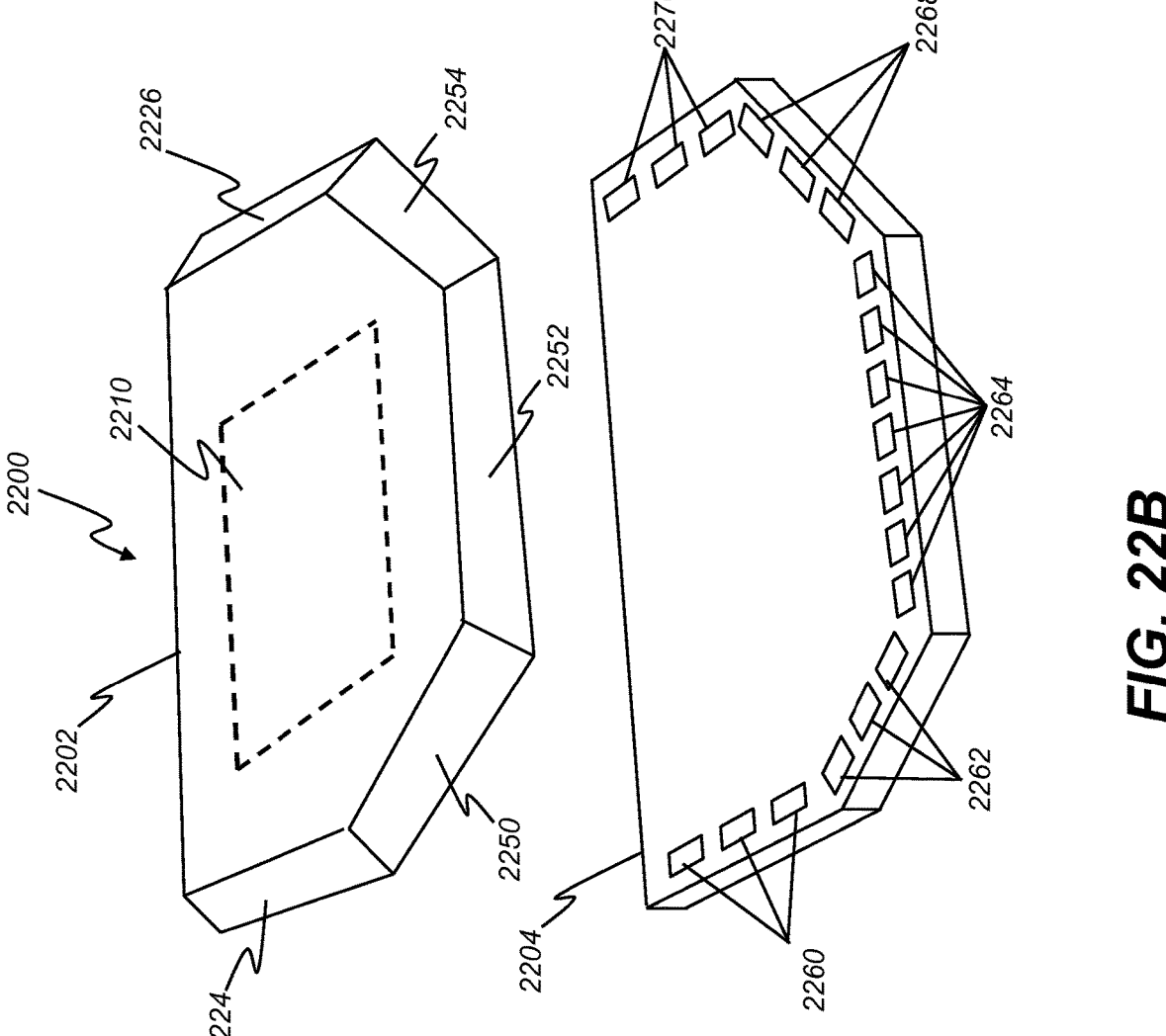

FIG. 22A and FIG. 22B illustrate an illumination system using two-axis tilt micromirrors and LED sources according to an embodiment of the present disclosure.

Figure 23:
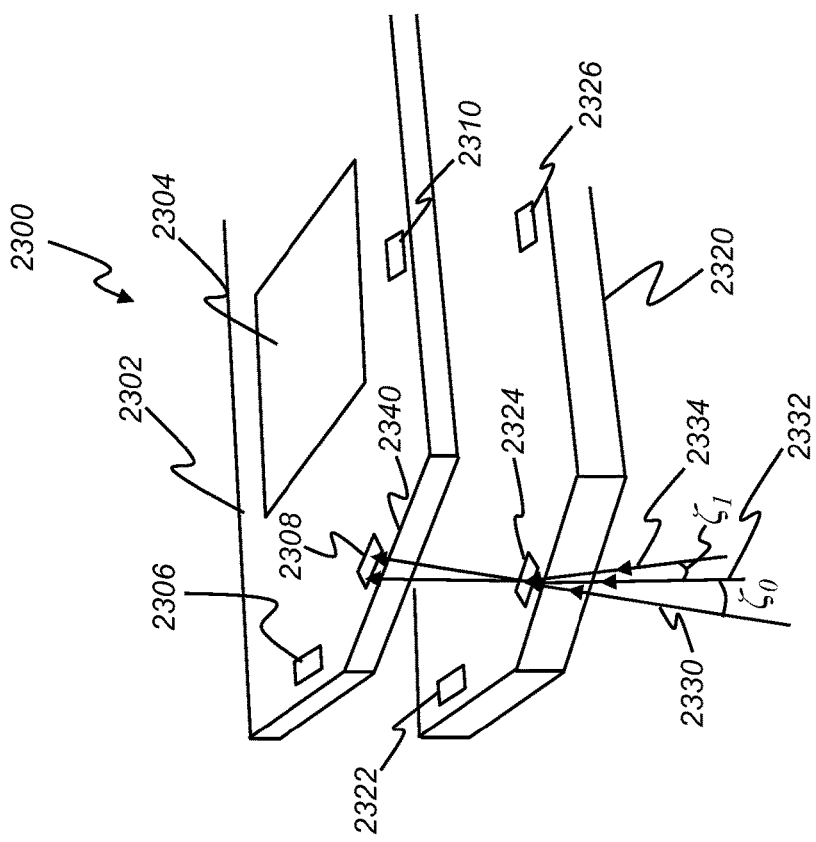

FIG. 23 illustrates micromirrors illuminated by multiple light sources having different wavelengths and at different angles according to an embodiment of the present disclosure.

Figure 24:
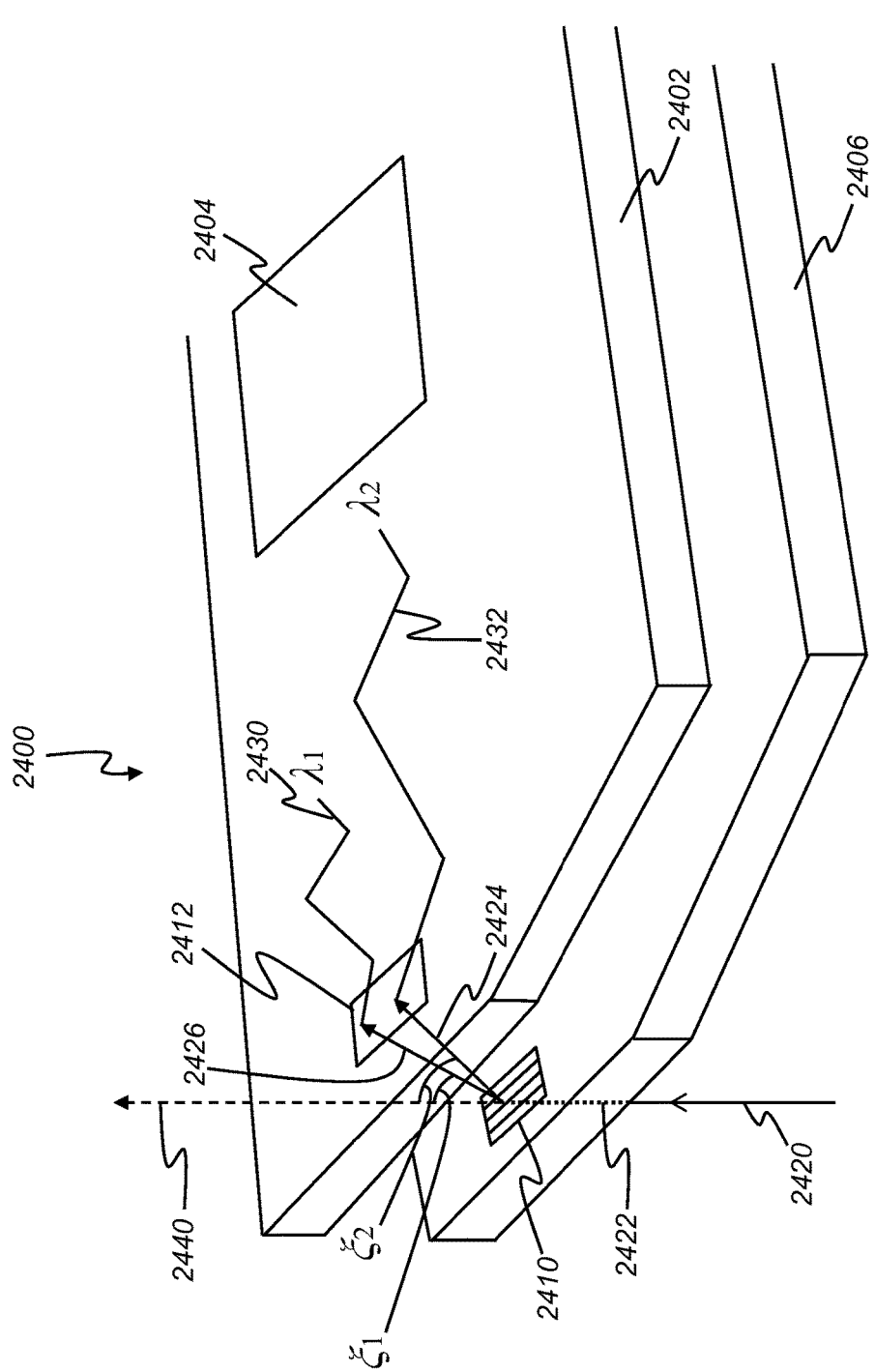

FIG. 24 illustrates illumination of a HOE utilizing micromirror and a non-monochromatic beam according to an embodiment of the present disclosure.

Figure 25:
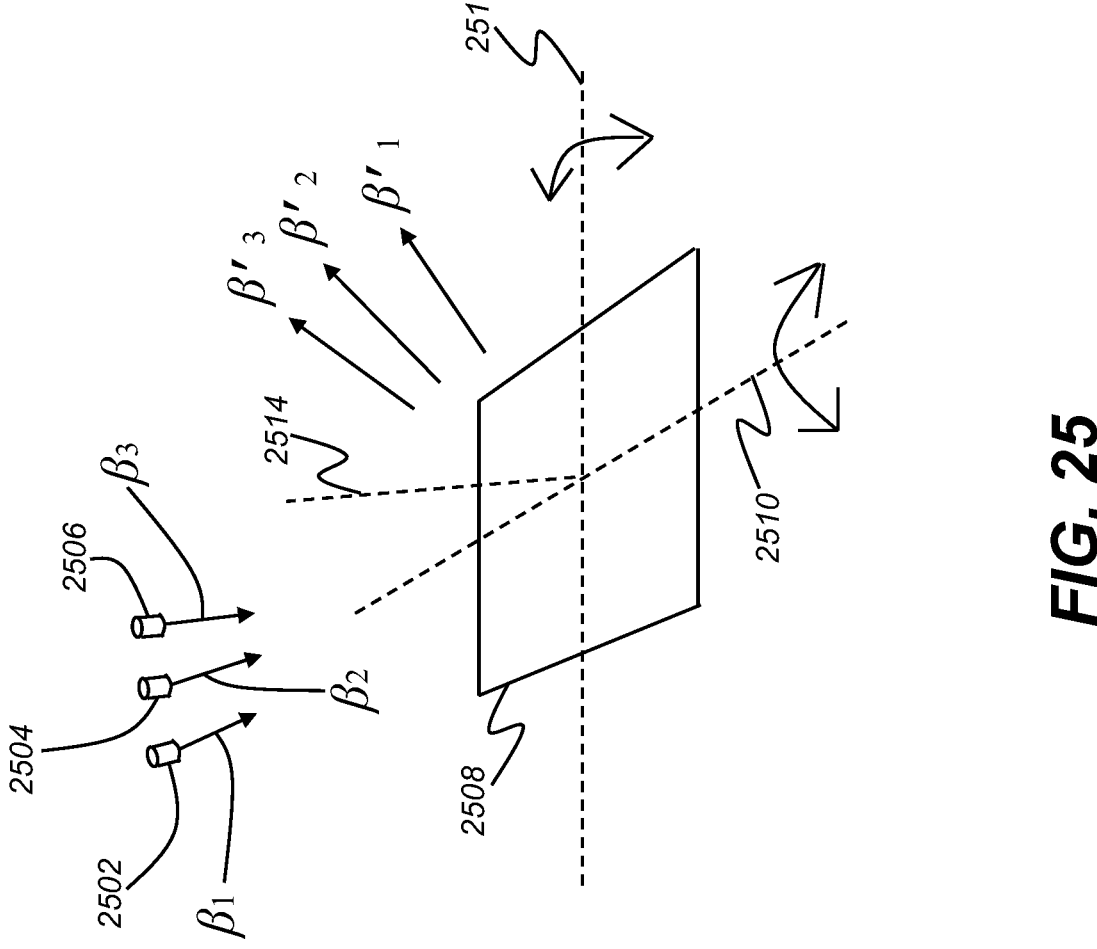

FIG. 25 illustrates independent laser diodes illuminating a tiltable micromirror according to an embodiment of the present disclosure.

Figure 26:
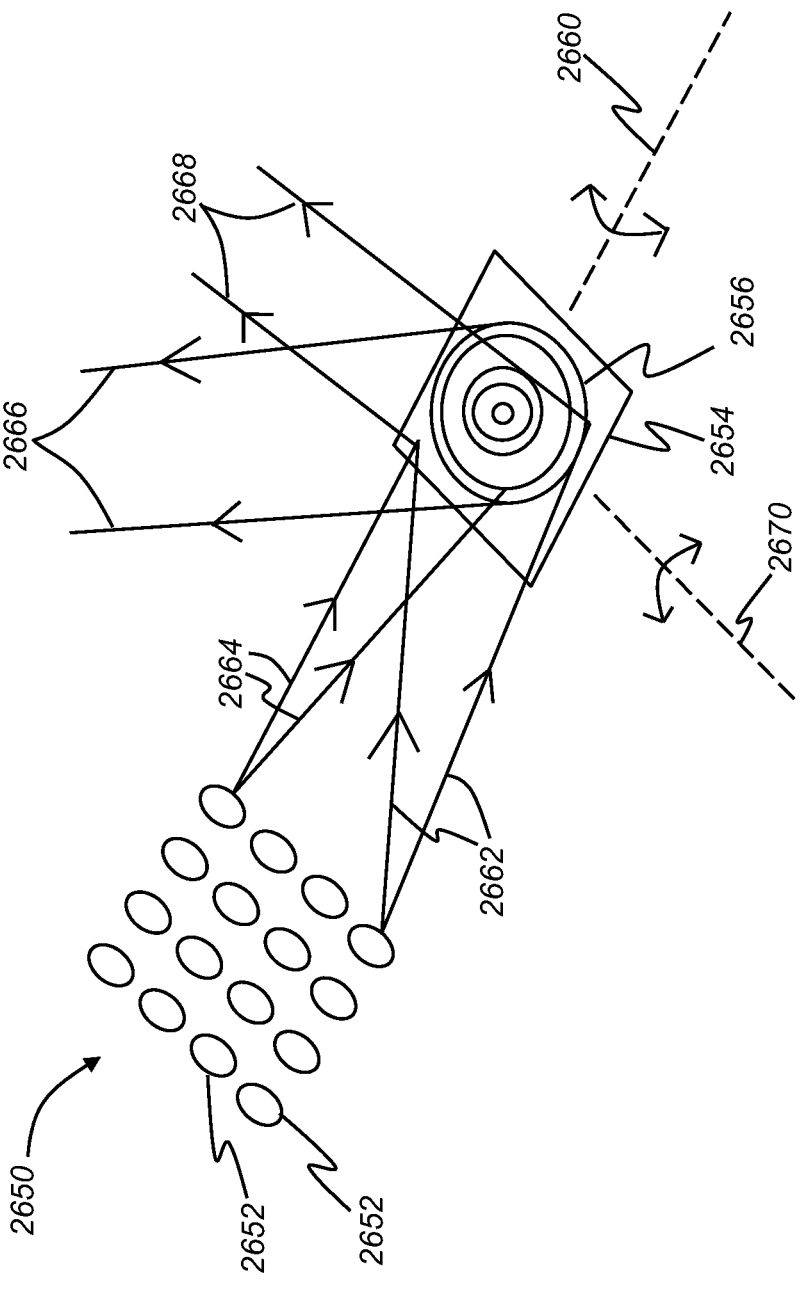

FIG. 26 illustrates illumination of a diffractive micromirror utilizing an array of illumination sources according to an embodiment of the present disclosure.

Figure 27:

FIG. 27 illustrates illumination of a micromirror simultaneously with a number of independently intensity-controlled beams according to an embodiment of the present disclosure.

Figure 28:
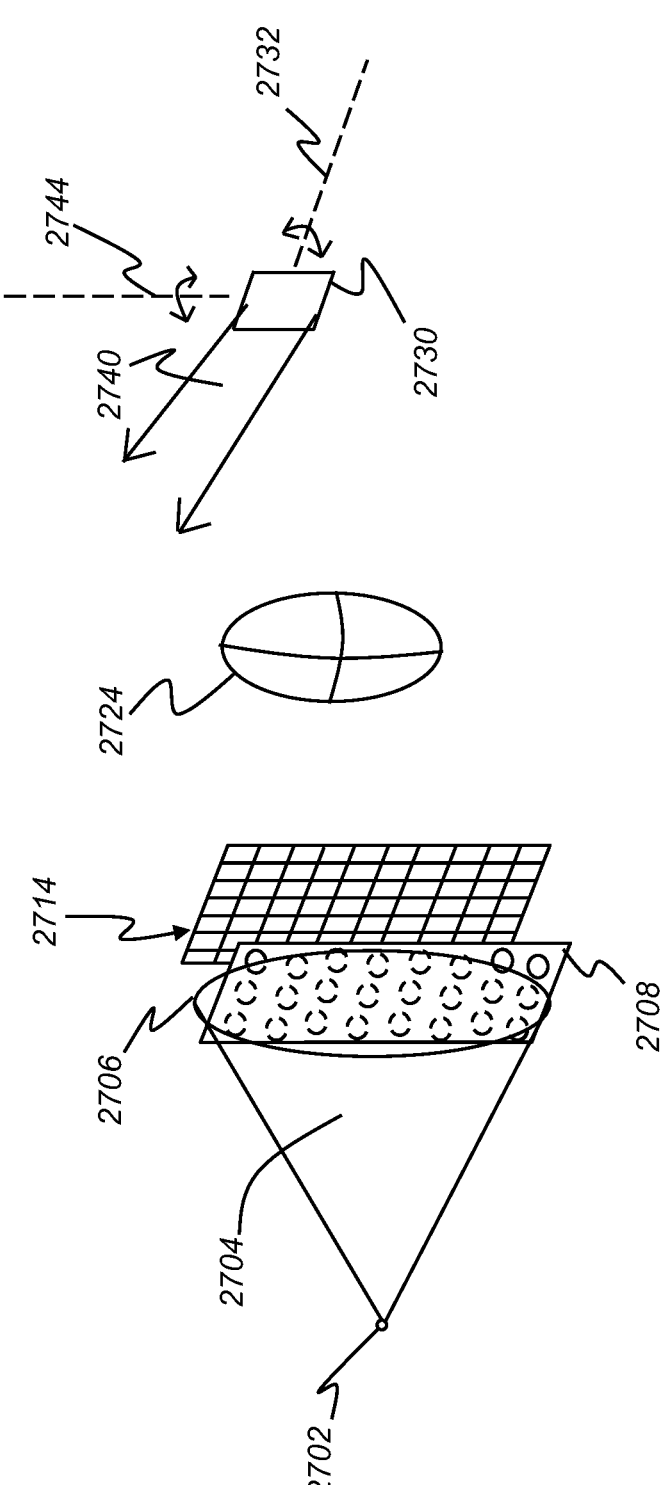

FIG. 28 illustrates an illumination system according to an embodiment of the present disclosure.

Figure 29:
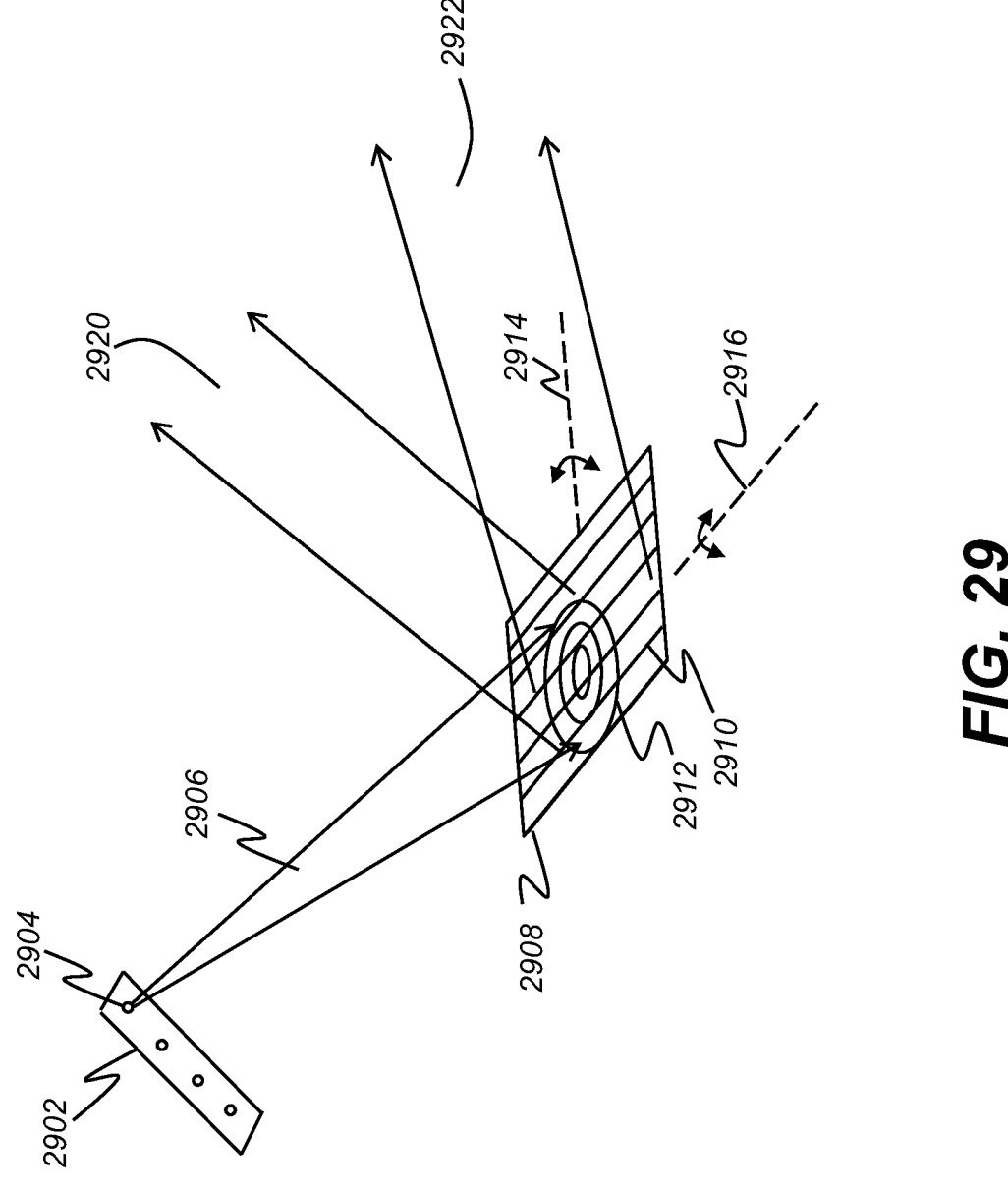

FIG. 29 illustrates illumination of a diffractive micromirror with a linear array of light sources according to an embodiment of the present disclosure.

Figure 30:
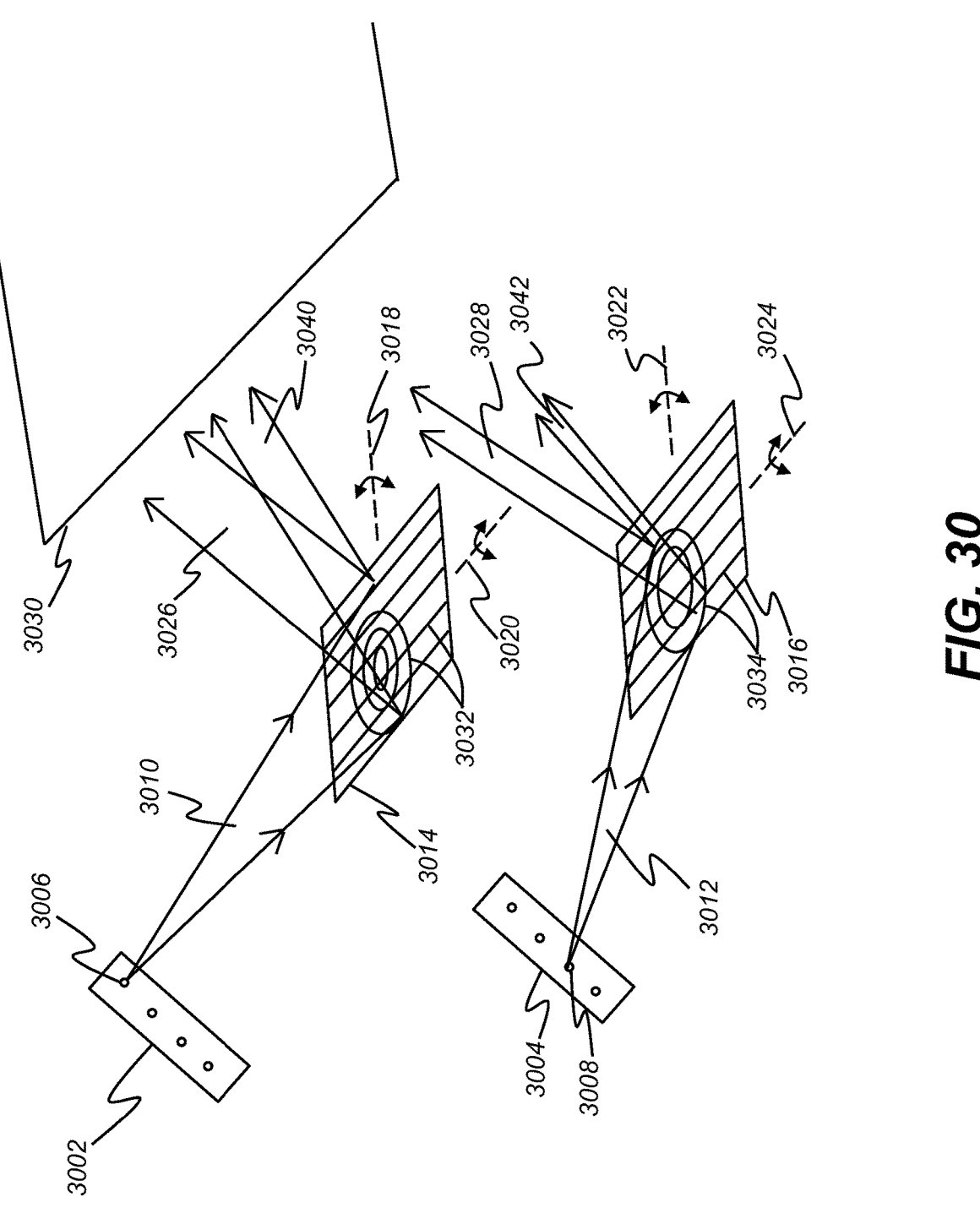

FIG. 30 illustrates an illumination system employing multiple micromirrors and multiple light sources according to an embodiment of the present disclosure.

Figure 31:
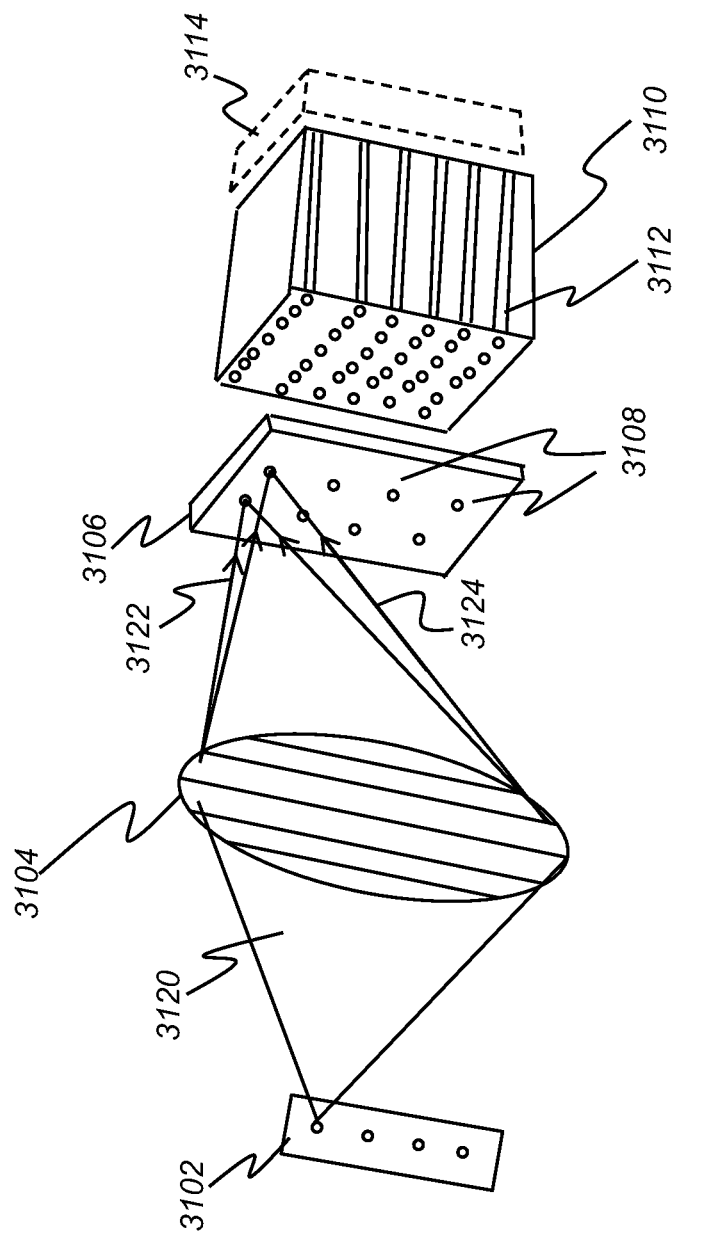

FIG. 31 illustrates an illumination system utilizing an optical fiber bundle, spectrum separating optics, and a spectral light modulator according to an embodiment of the present disclosure.

Figure 32:
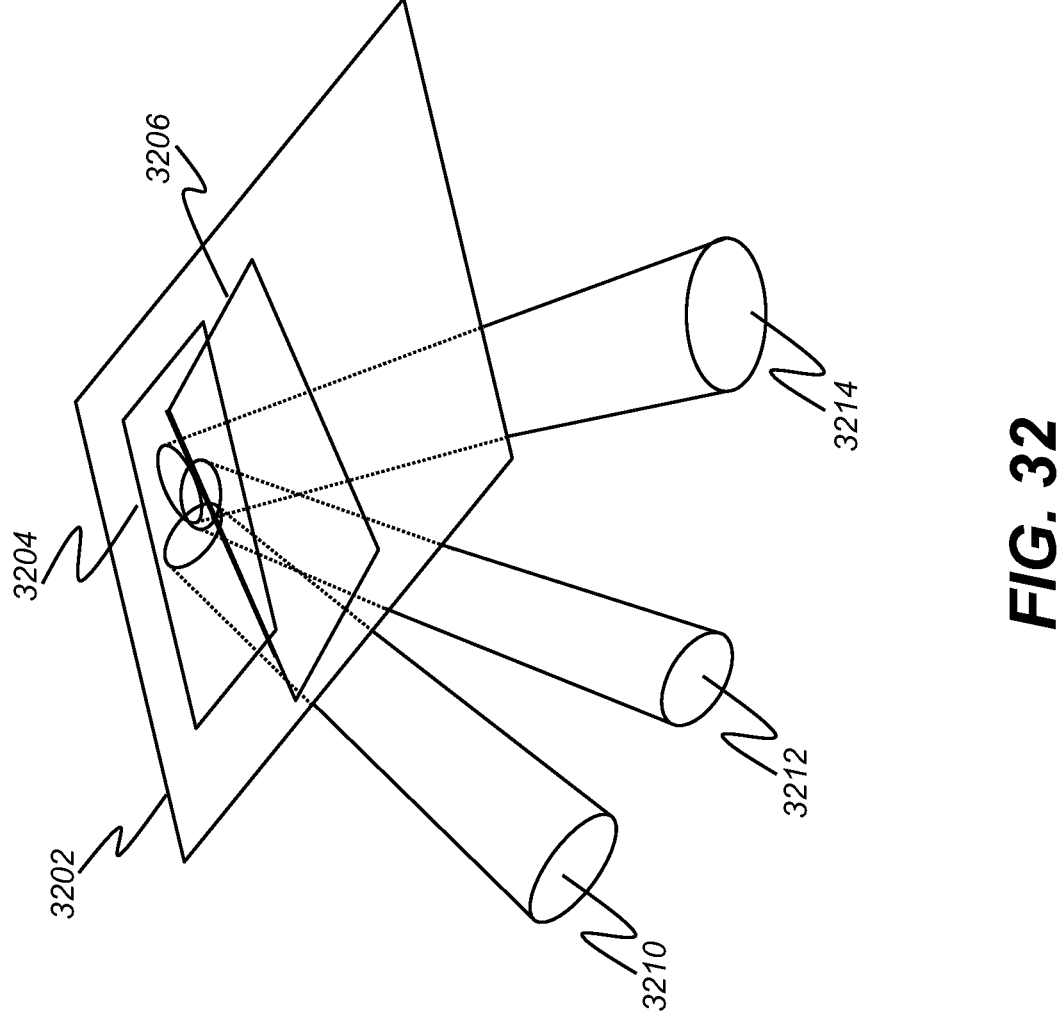

FIG. 32 illustrates an illumination system according to an embodiment of the present disclosure.

Figure 33:
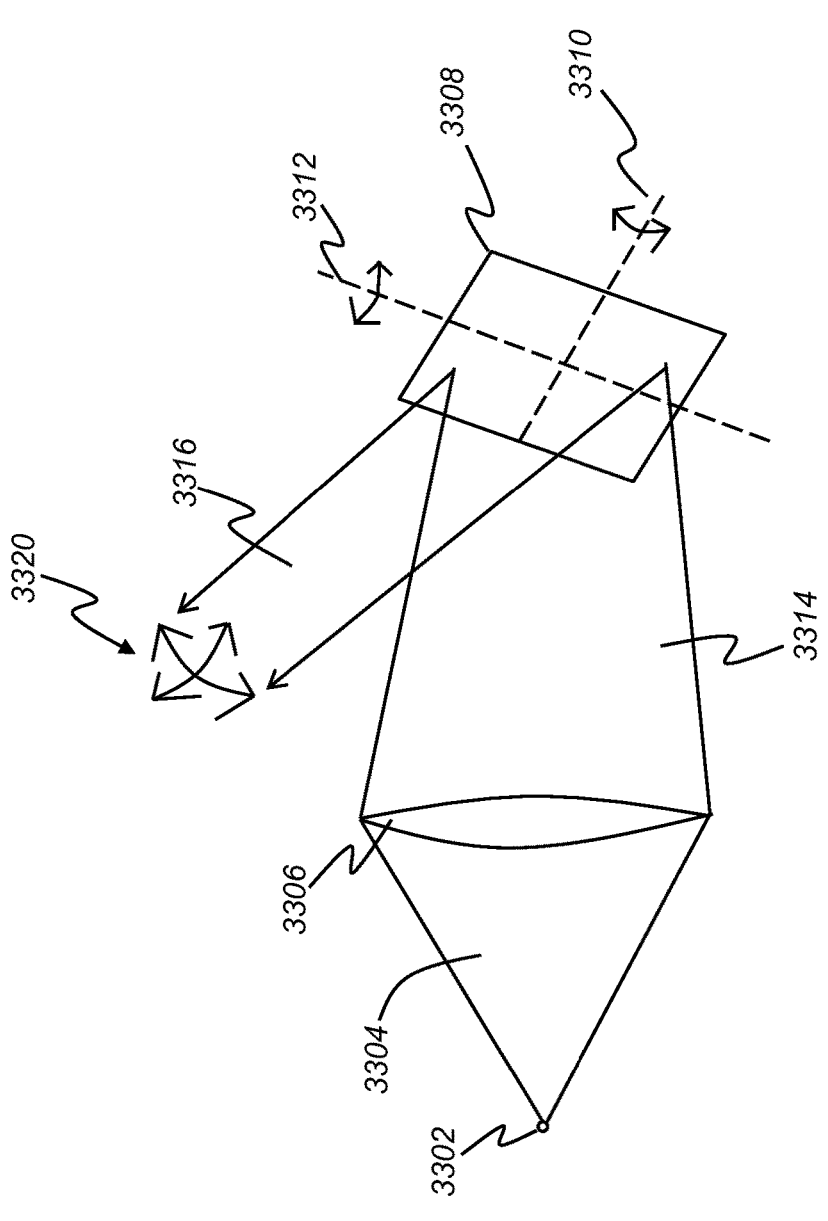
Figure 33:

FIG. 33 illustrates an illumination system according to an embodiment of the present disclosure.

Figure 34:
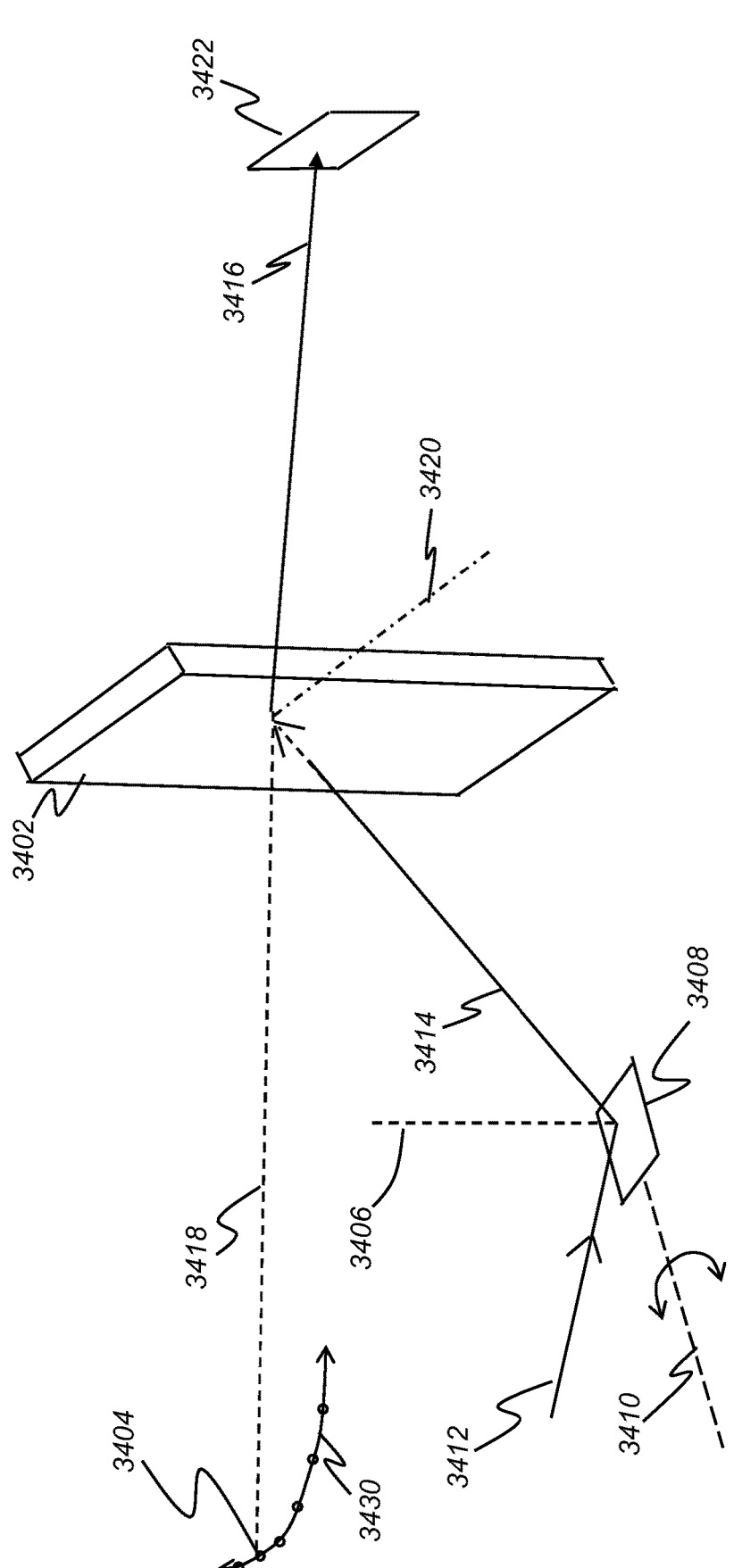

FIG. 34 illustrates an illumination system according to an embodiment of the present disclosure.

Figure 35B:
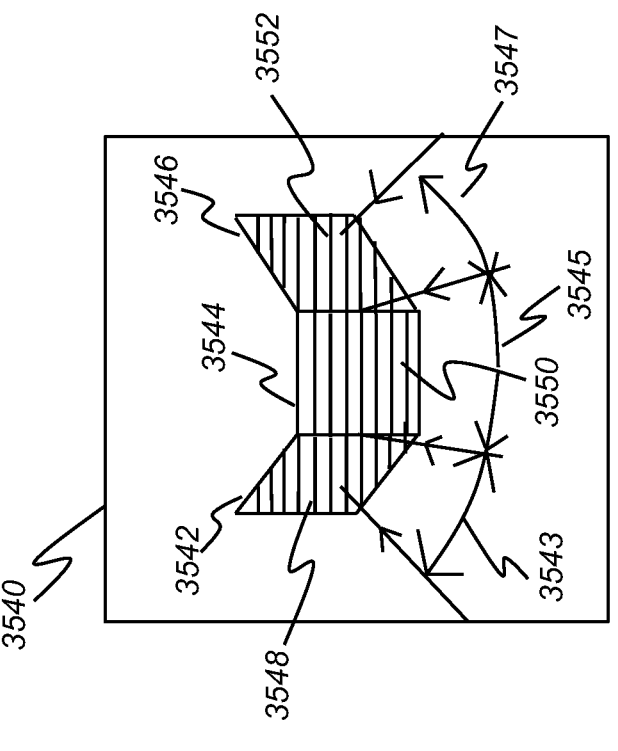
Figure 35A:
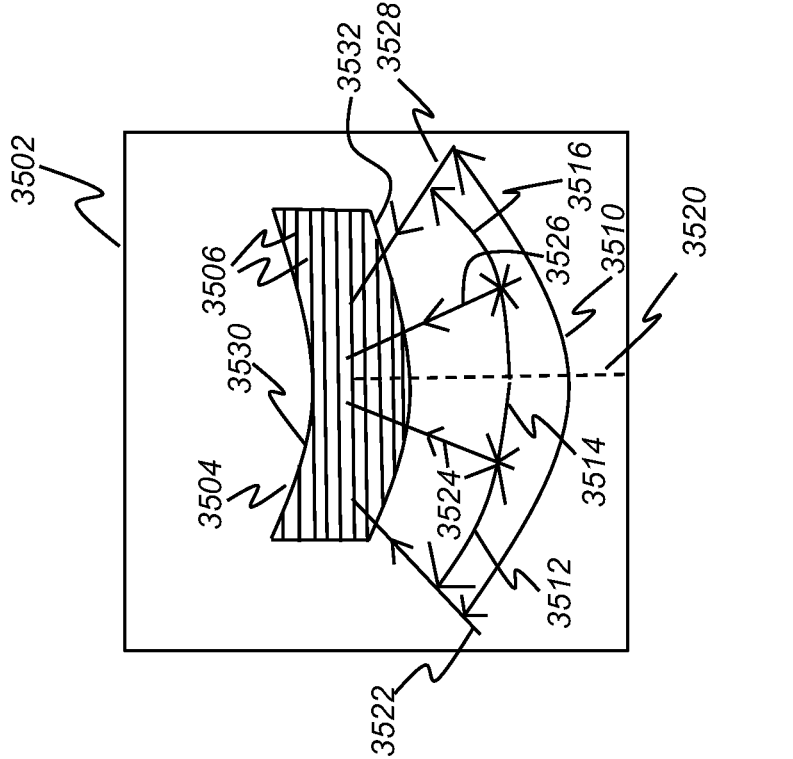
Figure 35C:
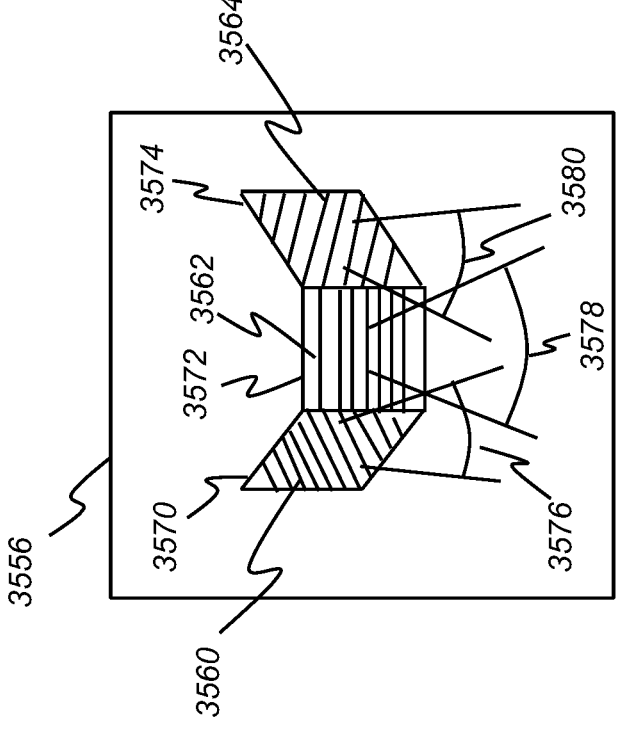

FIGS. 35A through 35C illustrate different Bragg plane orientations and locations according to embodiments of the present disclosure.

Figure 36:
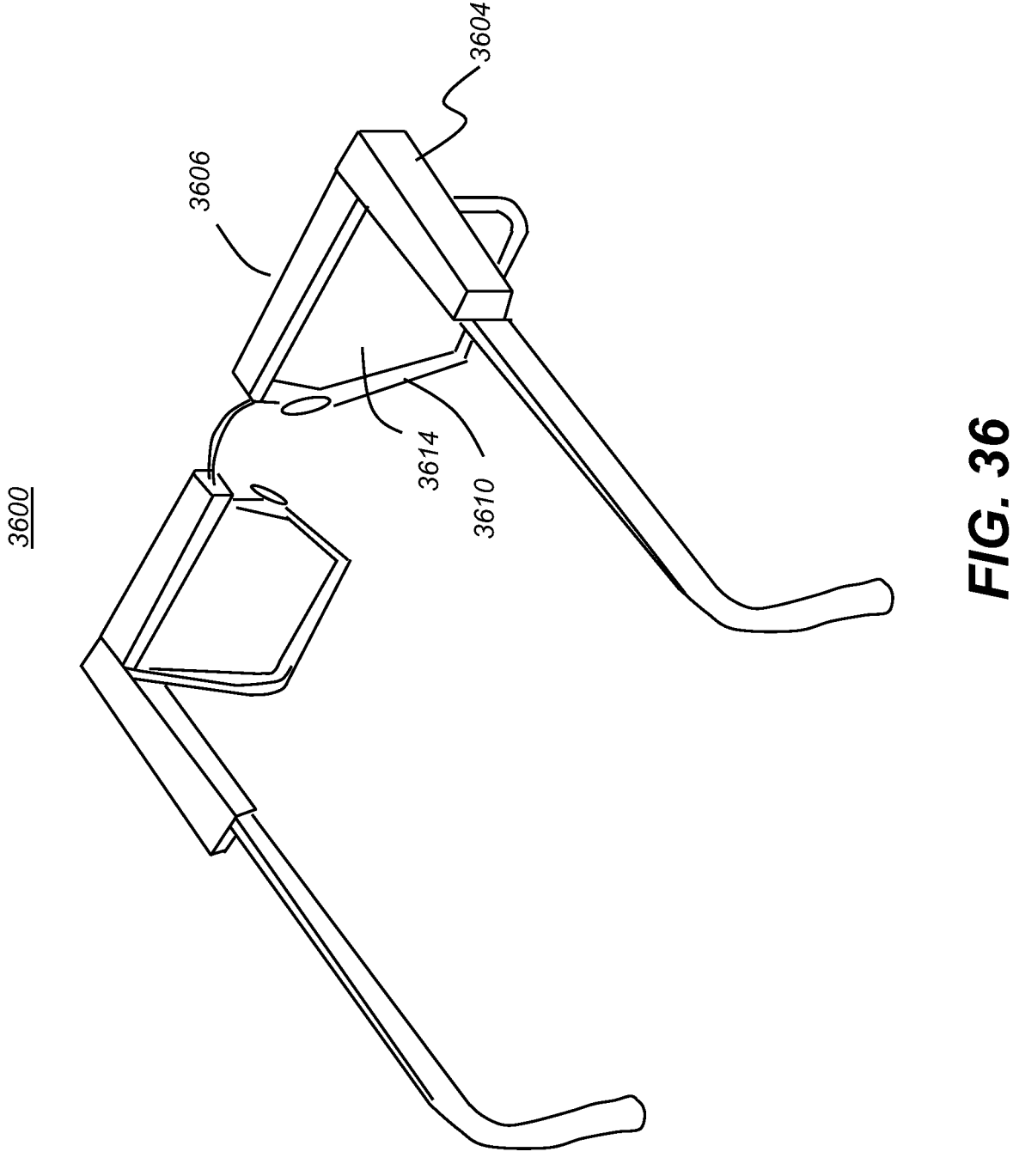

FIG. 36 illustrates glasses having a near-eye display system according to an embodiment of the present disclosure.

FIG. 37 illustrates a utilization of a spherical section image source and spherical sectional mirror according to an embodiment of the present disclosure.

Figure 38:
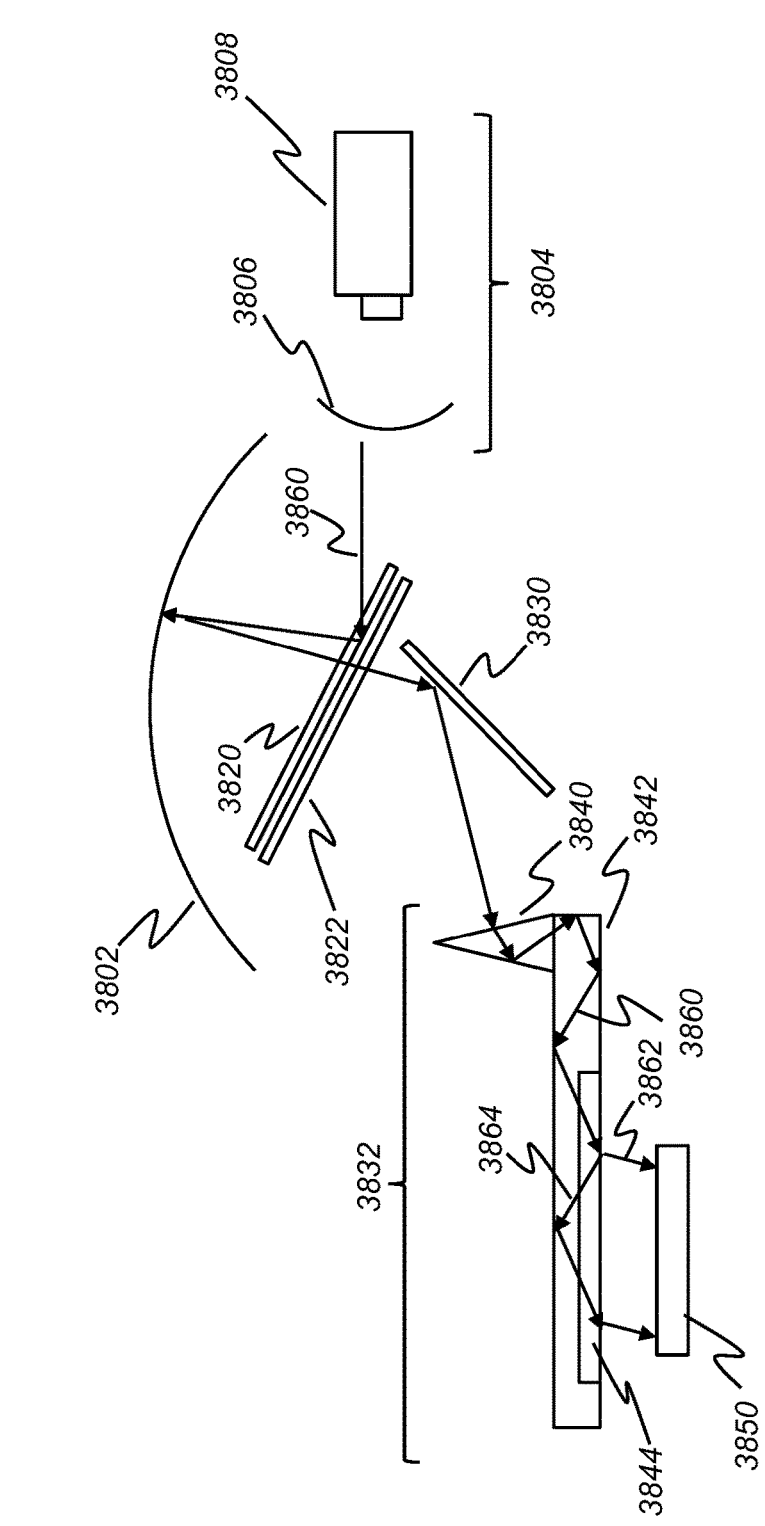

FIG. 38 illustrates an imaging system according to an embodiment of the present disclosure.

Figure 39A:
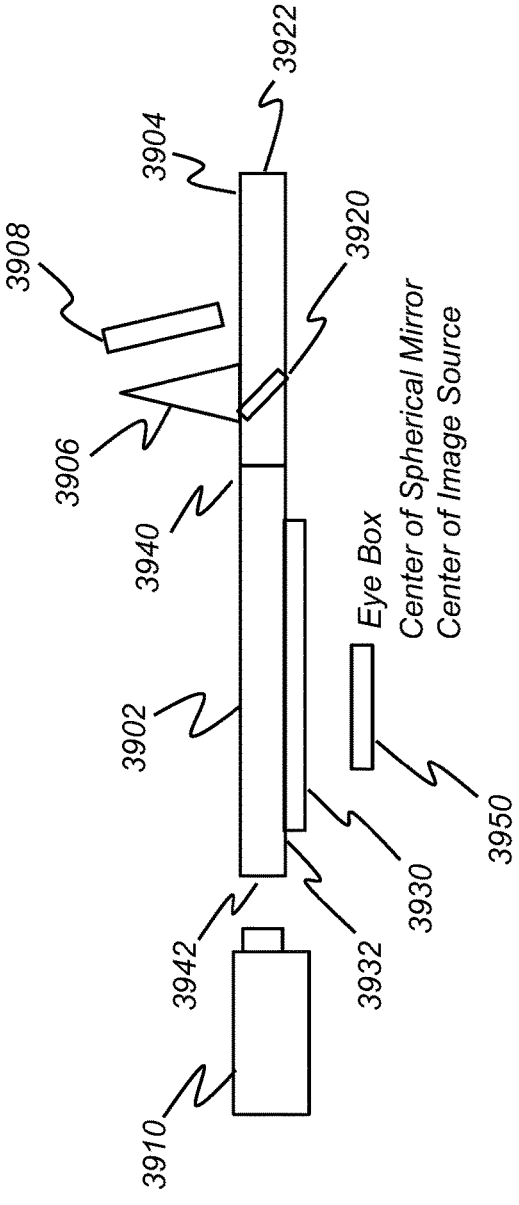
Figure 39B:
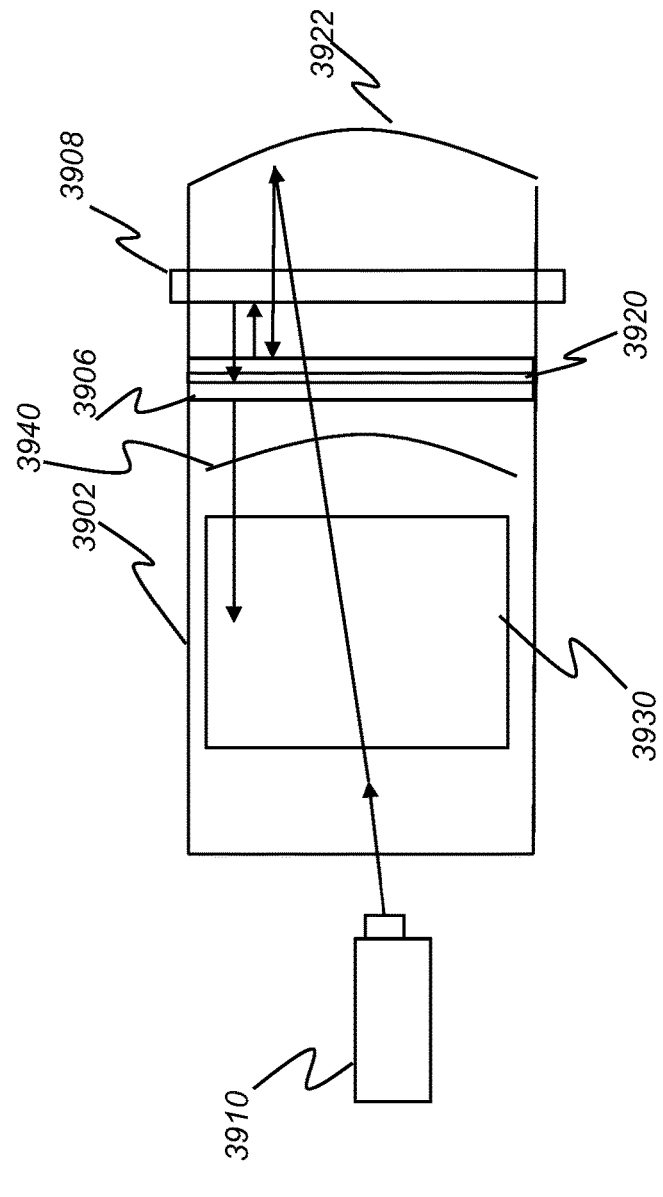
Figure 40:
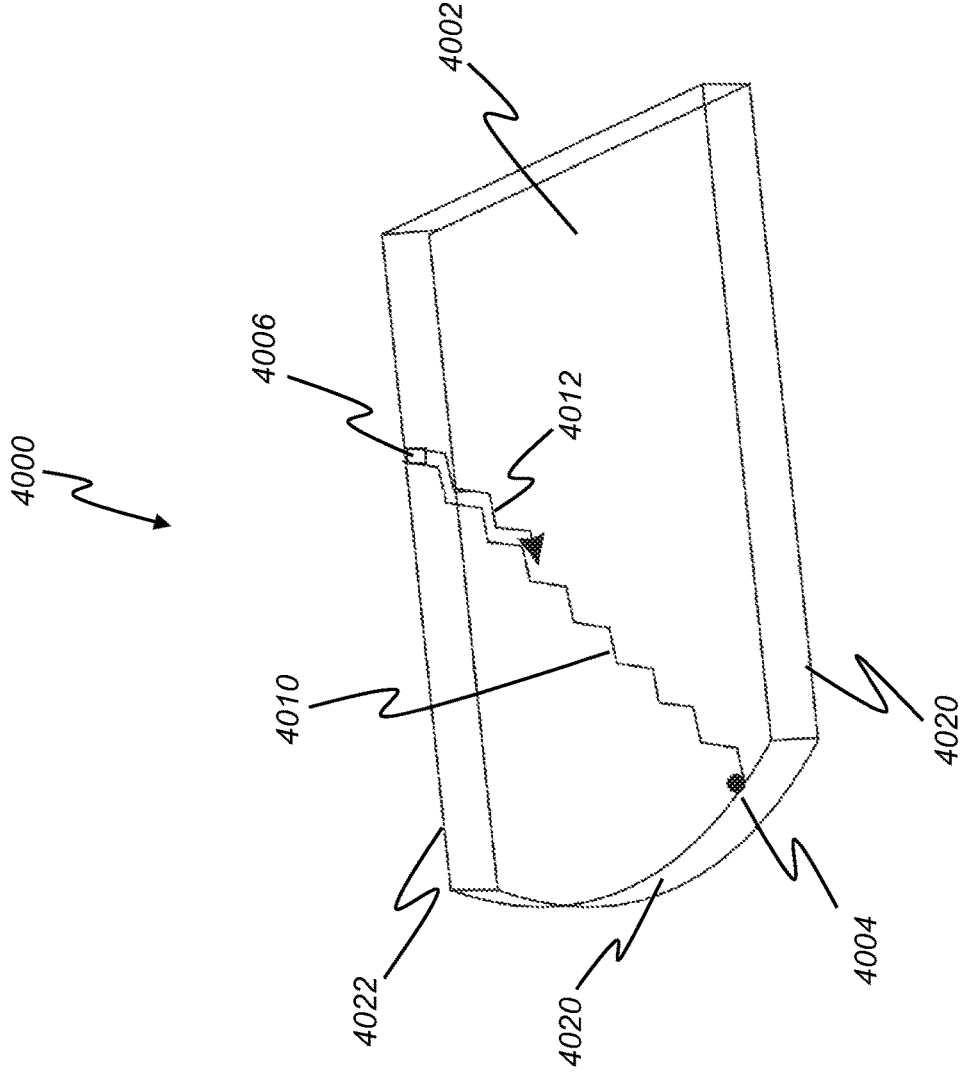

FIG. 39A and FIG. 39B illustrate an imaging system according to an embodiment of the present disclosure, FIG. 40 illustrates an illumination system according to an embodiment of the present disclosure.

Figure 41:
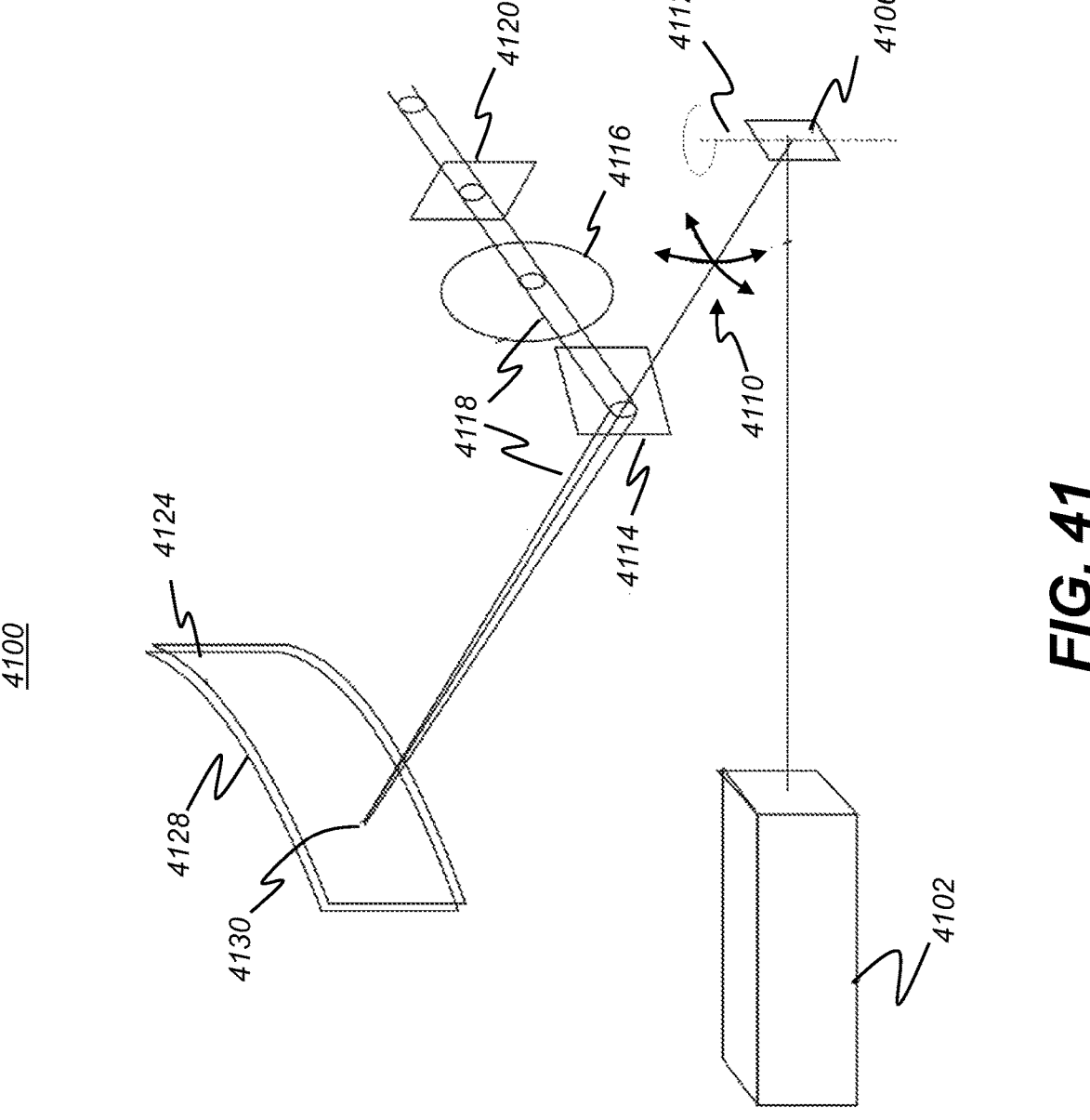

FIG. 41 illustrates an illumination system according to an embodiment of the present disclosure.

DETAILED DESCRIPTION

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
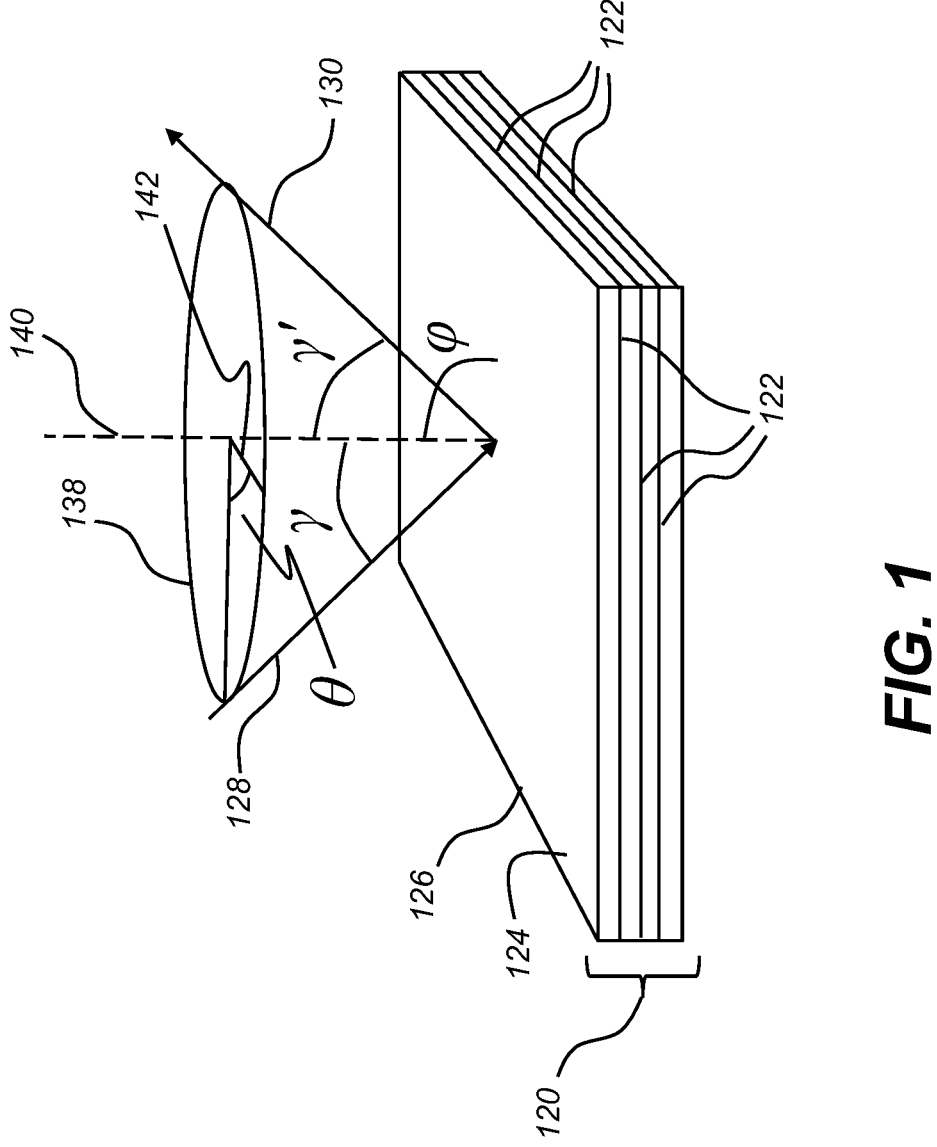
FIG. 1 illustrates a perspective view of a volume Bragg grating having a set of Bragg planes parallel to the surface of the volume Bragg grating with an optical diagram depicting conical diffraction performance of the volume Bragg grating in a reflective mode according to an embodiment of the present disclosure.

FIG. 1 shows a volume Bragg grating 120 having a set of Bragg planes 122 oriented parallel to a surface 124 of an optical substrate 126, which can be made, for example, of a holographic recording material. In an embodiment, the holographic recording material is of a quality operable to minimize optical losses due to absorption or scattering of light. In accordance with conditions for Bragg diffraction, an incident ray 128 of a particular wavelength λ and incidence angle γ is diffraction reflected as reflected ray 130 through an equal reflection angle γ' as measured with respect to a conical axis 140 that extends normal to the set of Bragg planes 122. As illustrated in FIG. 1, in an embodiment, the conical axis 140 is also oriented normal to the surface 124 at an elevation angle φ of 90 degrees measured from the surface 124 of the optical substrate 126. While the incident ray 128 is oriented at a particular rotational angle θ about the conical axis 140 in relation to reference line 142 extending normal to the conical axis 140 in a given direction, the conditions for Bragg diffraction are met by incident ray 128 at any rotational angle θ about the conical axis 140. As such, the incident ray 128 at incidence angle γ and diffraction reflected ray 130 at reflection angle γ' in the plane of incidence trace a common cone 138 about the conical axis 140. Thus, the conditions for Bragg diffraction are met for an incident ray 128 having a particular wavelength λ and incidence angle γ independently of the rotational angle θ of the incident ray 128 around the conical axis 140. When the Bragg diffraction conditions are so met, incident ray 128 is diffraction reflected through the reflection angle γ' equal to the incidence angle γ of the incident ray 128 in a manner resembling reflection from a mirror.

Under the conditions of conical diffraction, the volume Bragg grating 120 diffraction reflects the incident ray 128 efficiently at a given angle of incidence γ relative to the conical axis 140 only for a specific light wavelength λ, and does so independently of the rotational angle θ of the incident ray 128 around the conical axis 140. The particular wavelength λ and incidence angle γ pairs (λ, γ) at which the conical diffraction conditions are met for mirror-like reflections are governed largely by the periodic spacing (pitch) of the Bragg planes 122, which can involve a sinusoidal or other periodic variation in refractive index within the optical substrate 126 in the direction of the conical axis 140.

The Bragg condition for diffraction can be expressed by the following equation:

$$2\,d\,\sin(\gamma)=m\,\lambda$$

where "d" is the optical distance (i.e., physical distance times the average refractive index of the holographic recording material) between the Bragg planes 122 and "m" is an integer number, which is also considered as a diffraction order. The optical distance d is also referred to herein as the spacing or pitch of the Bragg planes. Given the limits of the cosine function from 1 to zero for incidence angles γ ranging from zero to 90 degrees, the conditions for satisfying the Bragg equation are largely limited to solutions of the first order, where m=1, when the value of optical distance d is less than or equal to the wavelength λ, i.e., d≤λ, with solutions ranging from γ=60 degrees for d=γ to γ=90 degrees for d=0.5γ. Optical distances greater than d=γ complete the range for values of incidence angles γ approaching zero degrees for diffraction order m=1. However solutions for the second order, m=2, begin at optical distances d equal to wavelength λ, d=γ, solutions for the third order, m=3, begin at optical distances d equal to 1.5 times the wavelength λ, d=1.5 γ, and solutions for the fourth order, m=4, begin at optical distances d equal to two times the wavelength λ, d=2 γ. For example, optical distances d equal to two times the wavelength, d=2 γ, satisfy the Bragg equation at incidence angle γ=0 degrees for m=4, at incidence angle γ=≈41.4 degrees for m=3, at incidence angle γ=60 degrees for m=2 and at incidence angle γ=≈75.5 degrees for m=1. For any given optical distance d, variations in the wavelength λ within these parameters include one or more solutions at intermediate values of the incidence angle γ.

Figure 2A:
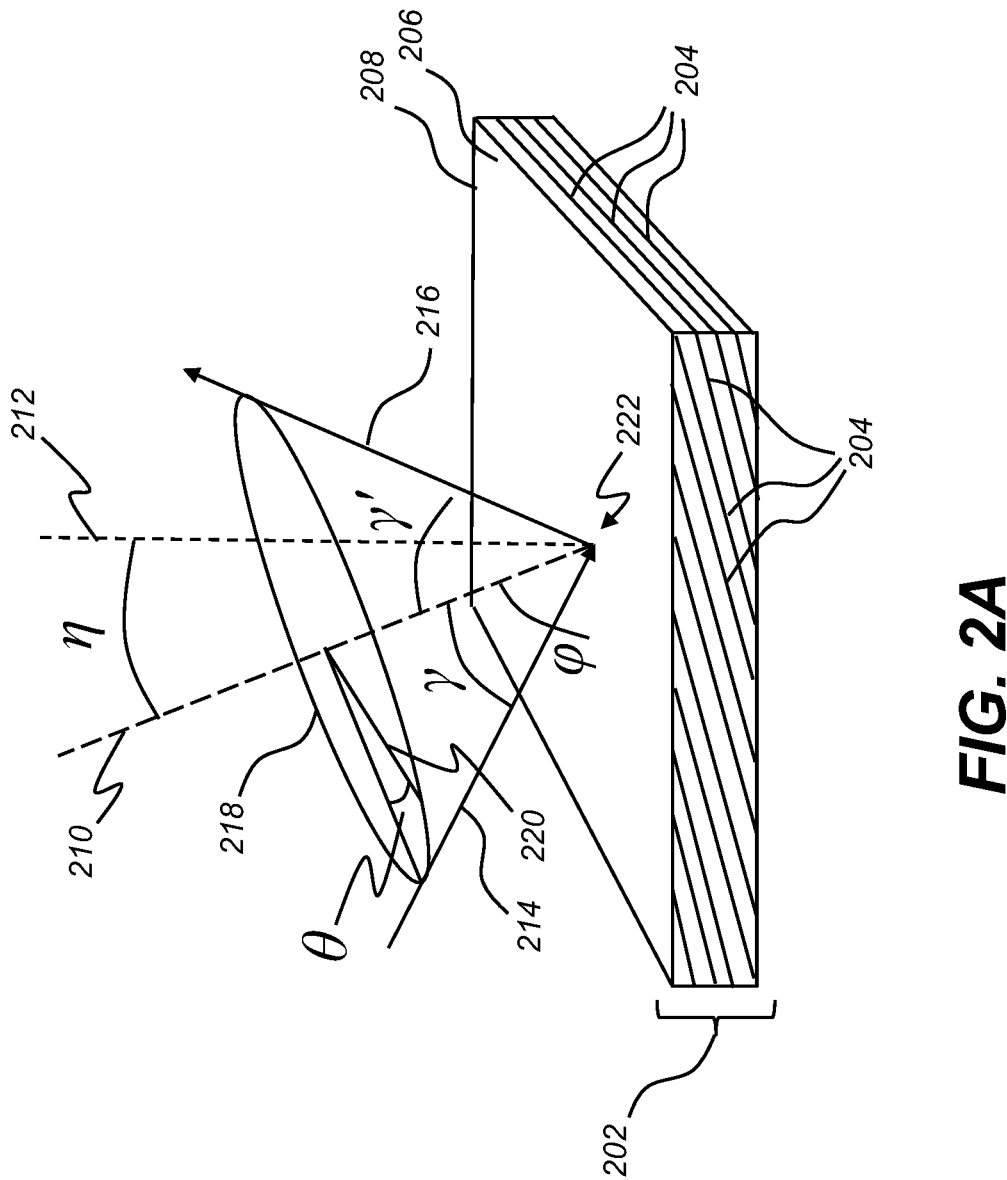
FIGS. 2A through 2C illustrate perspective views of a volume Bragg grating having a set of Bragg planes tilted relative to a surface of the volume Bragg grating with optical diagrams depicting the conical diffraction performance of the volume Bragg grating showing the area-wide performance of the volume Bragg grating in a reflective mode according to an embodiment of the present disclosure.

FIG. 2A shows a volume Bragg grating 202 with a set of mutually parallel Bragg planes 204 embedded in an optical substrate 208, which can be made, for example, of a holographic recording material. In the volume Bragg grating 202, the Bragg planes 204 are tilted relative to a planar surface 206 of the optical substrate 208. As such, conical axis 210, which extends normal to the set of Bragg planes 204, is similarly tilted through a polar angle η with respect to a surface normal 212 to the surface 206 of the optical substrate 208. Polar angle η is the complement of angle φ, which is measured between the conical axis 210 and the surface 206.

Like the volume Bragg grating 120 of FIG. 1, conical diffraction conditions are similarly defined for the volume Bragg grating 202 relative to the conical axis 210. For a given wavelength λ, incident ray 214, which is inclined with respect to the conical axis 210 through incidence angle γ, is diffraction reflected from intersection point 222 as reflected ray 216 through an equal reflection angle γ', which is similarly measured with respect to the conical axis 210. Notably, the incidence angle γ and the equal reflection angle γ' are measured with respect to the conical axis 210 rather than to the surface normal 212 because the orientation of the Bragg planes 204 is controlling. The same conditions hold for conical diffraction at different orientations of the incident ray 214 around the conical axis 210 through angles θ, which are shown measured with respect to a reference line 220 extending normal to the conical axis 210 in a given direction. As such, the incident ray 214 at incidence angle γ and diffraction reflected ray 216 at reflection angle γ' trace a common cone 218 about the conical axis 210 for all angles θ.

Figure 2B:
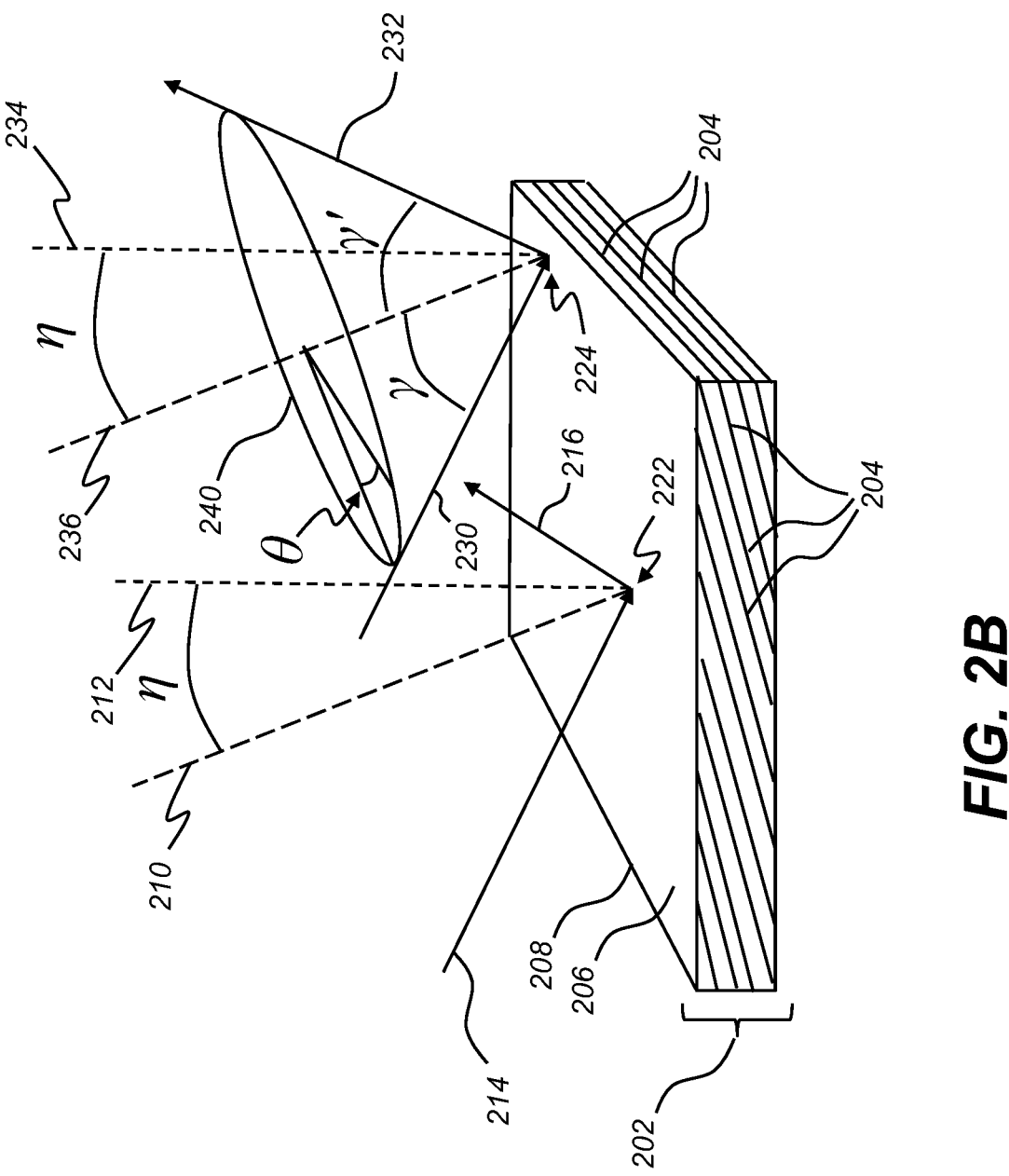

FIG. 2B shows the same volume Bragg grating 202 with an additional incident ray 230 intersecting the surface 206 of the optical substrate 208 at a different point 224 at which the same conical diffraction conditions apply. Surface normal 234 at point 224 remains parallel to the surface normal 212 at point 222, conical axis 236 remains parallel to the conical axis 210 through the same respective points, and incident ray 230 remains parallel to the incident ray 214. The incident ray 230, which has the same wavelength λ and is inclined through the same incidence angle γ as the incident ray 214, diffraction reflects as reflected ray 232 through the same reflection angle γ' as the reflected ray 216. Thus, the reflected rays 232 and 216 are also parallel.

The same conical diffraction conditions apply regardless of the rotation of the incident ray 230 around the conical axis through angles θ. As such, the incident ray 230 at incidence angle γ and diffraction reflected ray 232 at reflection angle γ' trace a common cone 240 about the conical axis 236 for all angles θ. The same conical diffraction conditions also apply at any other point on the surface 206 that overlies an adequate volume of the optical substrate 208 containing the set of Bragg planes 204. Any set of parallel incident rays of a common wavelength λ and incidence angle γ satisfying the conical diffraction conditions at a common rotational angle θ diffraction reflect as a set of parallel reflected rays through a common reflection angle γ', which is equal to the common incidence angle γ, and at a common rotational angle equal to θ plus 180 degrees.

Figure 2C:
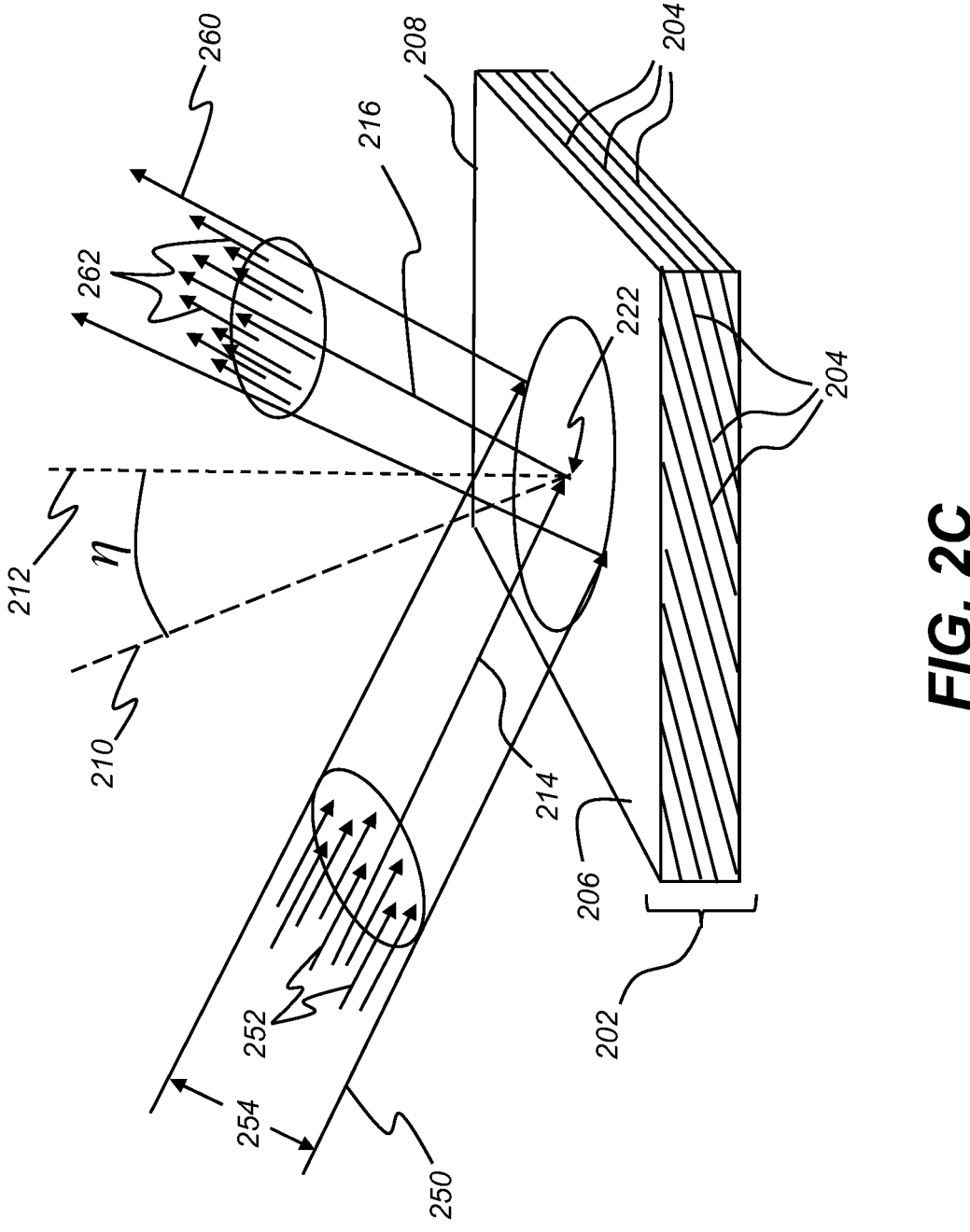

FIG. 2C shows the same volume Bragg grating 202 with a set of parallel incident rays 252 forming a collimated incident beam 250. The incident rays 252 are presumed to share a common wavelength λ, and a common incidence angle γ satisfying the conical diffraction conditions. As parallel rays, the incident rays 252 also all share the same rotational angle θ about their respective conical axes, with only the conical axis 210 being shown in FIG. 2C for the centermost of the incident rays 252 corresponding to the incident ray 214 of FIGS. 2A and 2B. The collimated incident beam 250 has a beam width 254 with a circular cross-sectional shape but can also be formed with non-circular cross-sectional shapes of different sizes in accordance with its intended use.

As explained above, each of the parallel incident rays 252 undergoes diffraction reflection in a similar mirror-like manner as a corresponding set of reflected rays 262 forming a collimated reflected beam 260 having a cross-sectional shape similar to the cross-sectional shape of the collimated incident beam 250. Each of the reflected rays 262, including the centermost of the reflected rays 262 corresponding to the reflected ray 216 of FIGS. 2A and 2B, shares the same reflection angle γ', which is equal to the common incidence angle γ of the incident rays 252. As parallel rays, all of the reflected rays 262 also share the same rotational angle θ plus 180 degrees about their respective conical axes. At the given wavelength λ and incidence angle γ satisfying the conical diffraction conditions, collimated incident beams oriented at different rotational angles θ around the conical axis 210 are similarly diffraction reflected in a mirror-like manner as collimated reflected beams. The incident rays of the rotated incident beams all share the same incidence angle γ and rotational angle θ with respect to their respective parallel conical axes. The diffraction reflected rays of the resulting reflected beams all share the same reflection angle γ' and rotation angle θ plus 180 degrees with respect to their respective parallel conical axes.

The volume Bragg grating 120 of FIG. 1 and the volume Bragg grating 202 of FIGS. 2A through 2C both operate in an overall reflective mode where incident rays 128, 214 and diffraction reflected rays 130, 216 enter and exit their respective volume Bragg gratings 120 and 202 through the same respective surfaces 124 and 206. That is, in the referenced reflective mode, the light beams satisfying conical diffraction conditions remain on the same side of their respective volume Bragg gratings. However, similar volume Bragg gratings can be arranged with differing orientations of Bragg planes to operate in an overall transmissive mode.

Figure 3:
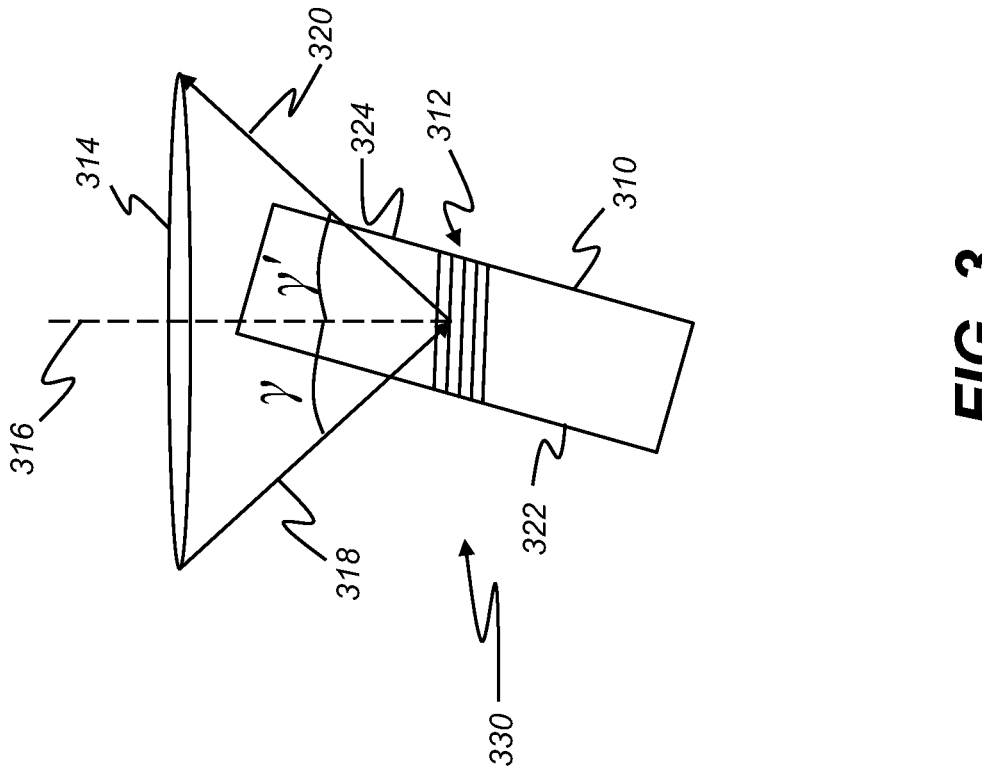
FIG. 3 illustrates an elevational view of a volume Bragg grating having a set of Bragg planes that are tilted relative to the incidence surface of the volume Bragg grating with an optical diagram depicting the conical diffraction performance of the volume Bragg grating in a transmissive mode according to an embodiment of the present disclosure.

FIG. 3, for example, depicts a volume Bragg grating 330 operating in an overall transmissive mode under conical diffraction conditions. Optical substrate 310, which can be made of a holographic recording material, contains a set of Bragg planes 312. The Bragg planes 312 can be formed throughout any portion, or all of, the optical substrate 310 in accordance with the desired application. Similar to the conical axes 140 and 210 of the volume Bragg gratings 120 and 202, conical axis 316 of the volume Bragg grating 330 extends normal to the set of Bragg planes 312. Incident ray 318 of a given wavelength λ impinges onto the Bragg planes 312 and is diffracted into diffraction reflected ray 320 at an equal angle of reflection γ' with respect to the conical axis 316. However, the incident ray 318 enters the volume Bragg grating 330 through surface 322 on one side of the optical element 310 and the reflected ray 320 exits the holographical optical element 310 through surface 324 on an opposite side of the optical element 310. Thus, even though the incident light is diffraction reflected, the volume Bragg grating 330 operates under an overall condition of transmission through the holographical optical element 310 from one side 322 to the other side 324.

In addition to operating under overall conditions of reflection or transmission, similar volume Bragg gratings can also be arranged to diffraction reflect light within the optical substrate under conditions of total internal reflection. That is, the incident light can be reflected toward a surface of the optical substrate at a grazing angle such that a refractive index difference at the interface between the optical substrate and its surrounding medium (e.g., air) supports total internal reflection, where the reflected light remains within the optical substrate until the conditions for internal reflection are no longer met, or until the reflected light is coupled out of the substrate by, e.g. a surface grating, prism, or Bragg grating.

While depicting fundamental principles of conical diffraction from a set of Bragg planes, the optical diagrams of FIGS. 1 through 3 have been oversimplified in two major ways. First, the incident rays of a particular wavelength λ and incidence angle γ with respect to a conical axis normal to the Bragg planes interact with these planes, whether in a reflective or a transmissive mode, within the volume of the volume Bragg grating and are coupled within this volume into a diffraction order at which the incident rays reflect through an equal angle of reflection γ' respect to the same conical axis. Second, taking into consideration an expected difference between the average refractive index of the volume Bragg grating and the refractive index of the surrounding medium (e.g., air), the incident and reflected rays are subject to refraction at the interface between the volume Bragg grating and the surrounding medium. The overall angular effects from such refractions on the incident and reflected rays can be readily determined according to Snell's law.

These refractive effects generally result in compression of the range of propagation angles within a medium relative to the range of propagation angles external to the medium when the medium has a refractive index higher than that of air.

Figure 4:
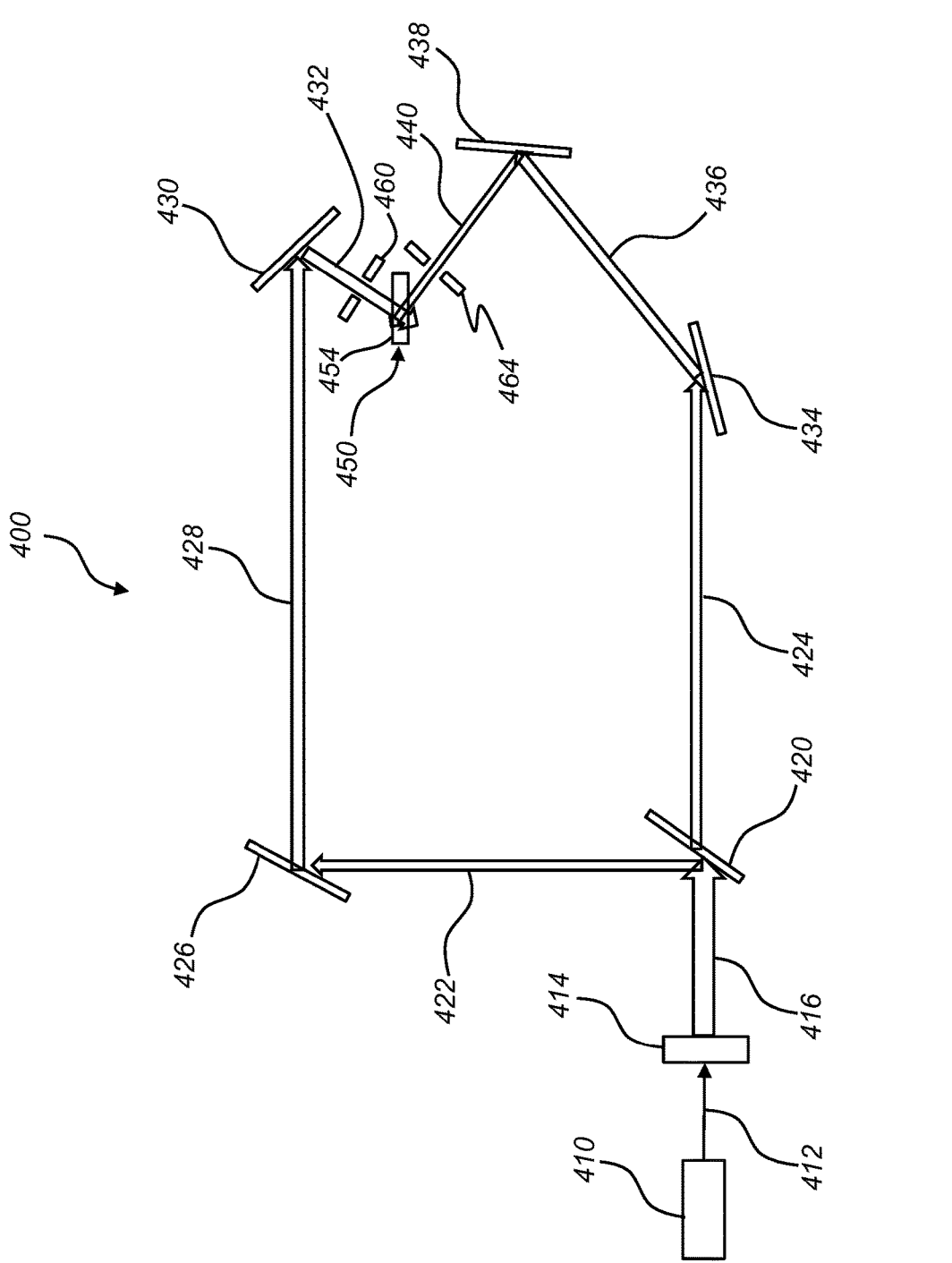
FIG. 4 illustrates a schematic of an optical system operable to write tilted Bragg planes in a holographic recording medium according to an embodiment of the present disclosure.

FIG. 4 depicts an optical system 400 for writing Bragg planes, such as the tilted Bragg planes 204 of FIG. 2A, within a holographic recording medium 454 fashioned as an optical substrate, such as the optical substrate 208, for creating a reflective type volume Bragg grating 450, such as the volume Bragg grating 202, in the form of a holographic optical element. The holographic recording medium 454 may comprise, for example, a photopolymer or other photorefractive material. A laser 410 generates an optically coherent light beam 412 that is expanded into a collimated beam 416 by beam expander/collimator 414. A portion of the expanded collimated beam 416 reflects from a beamsplitter 420 as collimated beam 422 while another portion of the expanded collimated beam 416 transmits through the beamsplitter 420 as collimated beam 424. In an embodiment, the beamsplitter 420 is fashioned as a half-mirror 420 that includes one or more areas that are highly reflective and one or more other areas that are highly transmissive. The collimated beam 422 that reflects from the beamsplitter 420 is reflected by a mirror 426 as a reoriented collimated beam 428, and the reoriented collimated beam 428 is reflected by a mirror 430 as a further reoriented collimated beam 432. The collimated beam 424 that transmits through the beamsplitter 420 is reflected by a mirror 434 as a reoriented collimated beam 424, and the reoriented collimated beam 424 is reflected by a mirror 438 as a further reoriented collimated beam 440. The reoriented collimated beams 432 and 440 pass through opposite sides of the holographic recording medium 454 as respective plane waves and interfere within the volume of the holographic recording medium 454 as a set of equally spaced planar interference fringes at a given tilt angle of the desired Bragg planes. In a direction normal to the fringes corresponding to the desired conical axis, intensity variations of the fringe pattern within the holographic recording medium 454 produce corresponding sinusoidal variations in the refractive index of the holographic recording medium 454, thereby recording the desired set of Bragg planes.

Decreasing the wavelength of the actinic radiation or increasing the angular separation between reoriented collimated beams 432 and 440 have similar effects of reducing the spacing (pitch) between the Bragg planes. The holographic recording medium 454 can be relatively rotated about two orthogonal axes with respect to the reoriented collimated beams 432 and 440 for changing the orientation (tilt) of the Bragg planes with respect to the surfaces of the holographic recording medium 454. Any undesirable refractive effects associated with directing the reoriented collimated beams 432 and 440 through the opposite surfaces of the holographic recording medium 454 can be mitigated in a variety of ways similar to directing incident beams into finished holographic elements as described above such as by appending one or more index-matching prisms.

With the further reoriented collimated beam 432 considered as the object beam and the further reoriented collimated beam 440 considered as the reference beam, an incident beam matching the wavelength and incidence angle of the reference beam is diffraction reflected from the finished holographic element as a reflected beam that emerges from the same side of the finished volume Bragg grating as a continuation of the object beam. Other combinations of wavelength and incidence angle satisfying the Bragg conditions for constructive interference are similarly diffraction reflected at equal angles of incidence and reflection. For example, the actinic radiation for writing the Bragg gratings may be in the ultraviolet range and the radiation intended for diffraction reflection from the Bragg gratings may be in the visible range.

Volume Bragg gratings of a transmissive type such as shown in FIG. 3 can be formed in similar ways by reorienting the two angularly related collimated beams of actinic radiation to enter the same side of the holographic recording medium as interfering object and reference beams. Either or both the common wavelength and the relative angular orientation of the object and reference beams can be changed to adjust the spacing (pitch) of the Bragg planes, and the relative orientation of the holographic recording medium with respect to the object and reference beams can be changed to orient (tilt) the Bragg planes as desired.

While the Bragg planes of volume Bragg gratings are efficiently producible by such holographic means as holographic optical elements, the Bragg planes of volume Bragg gratings can also be written using a direct laser writing technique with focused ultrashort pulses of high intensity or constructed with anisotropic materials such as two materials with different refractive indices that are assembled in layers. Such layered constructions can have an index modulation approaching a square wave, which tends to produce a more polarization dependent response.

Within the holographic recording medium of a holographic optical element fashioned as a volume Bragg grating, more than one set of Bragg planes can be written in overlapping positions and distinguished by one or both of the spacing (pitch) between Bragg planes or the orientation (tilt) of the planes within the medium. Each such set of Bragg planes can be referred to as a "hoxel" for conveying a portion of an image en route to a viewer's eye. The overlapping hoxels, which do not necessarily overlap every other hoxel written into a holographic recording medium, can also differ from one another in position, size, or shape as well as in refractive index modulation for such purposes as controlling relative diffraction efficiencies.

Figure 5B:
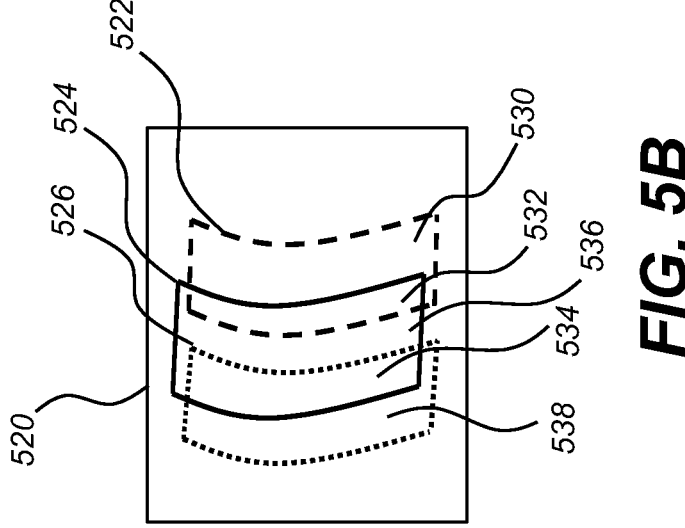
FIG. 5A and FIG. 5B illustrate plan views of two volume Bragg gratings each comprising a different layout of three overlapping hoxels showing variations in hoxel shape and overlap within respective recording media according to an embodiment of the present disclosure.
Figure 5A:
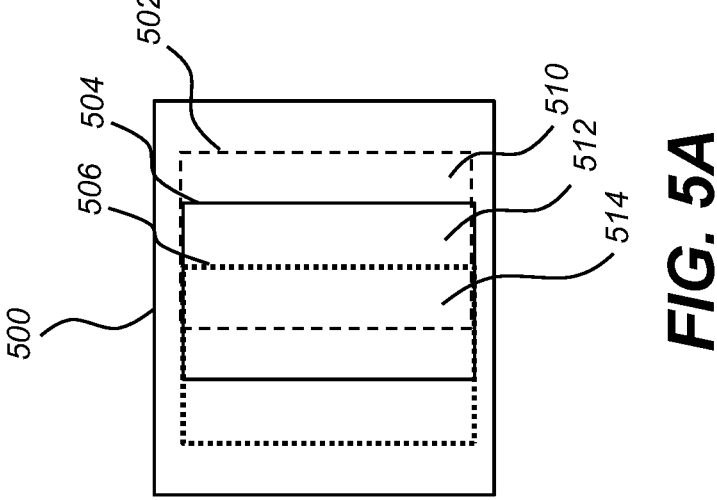

FIG. 5A depicts an optical substrate 500 of a volume Bragg grating containing three overlapping hoxels 502, 504, 506. The three hoxels 502, 504, 506, which can be written into the optical substrate 500 in the form of a holographic recording medium using appropriate pairings of uniquely coherent collimated object and reference beams sequentially or simultaneously, are relatively offset with respect to each other such that each of the three hoxels 502, 504, 506 overlaps a limited portion of each of the other hoxels 502, 504, 506. In addition, the three hoxels 502, 504, 506 may be arranged for reflecting incident beams within different ranges of angles for displaying different portions of an image as determined by the orientations (tilts) and Bragg plane spacings (pitches) of the respective hoxels together with the rotational angles $\theta$ and the incidence angle $\gamma$ and wavelength $\lambda$ pairings of the incident beams with respect to the conical axes of the hoxels.

While shown relatively shifted right to left (horizontally) in FIG. 5A, the three hoxels 502, 504, 506 could also be relatively shifted top to bottom (vertically) or through various combinations of horizontal and vertical shifts within the optical substrate 500. Various conditions of overlap are also represented in FIG. 5A with only a portion of the hoxel 502 occupying a sub-volume 510 of the optical substrate 500, with portions of hoxels 502 and 504 overlapping within a sub-volume 512 of the optical substrate 500, and with portions of all three hoxels 502, 504, and 506 overlapping within a sub-volume 514 of the optical substrate 500. Different hoxels in various numbers, conditions of overlap, and relatively shifted positions can be written into the optical substrate 500 for decoding different portions of an image.

In FIG. 5B, three hoxels 522, 524, and 526 of a different shape overlap to varying degrees within an optical substrate 520 of a volume Bragg grating. The shape of the three hoxels 522, 524, and 526 can be imparted or otherwise influenced by directing one or both of the actinic object and reference beams through masks 460, 464 or other beam-shaping optics of an optical system, such as shown in FIG. 4, for writing holograms. The three hoxels 522, 524, and 526, which are representative of three or more hoxels in various conditions of overlap and relatively shifted positions, can be shaped individually or collectively in any desired geometric form. For example, the size, shape, and position of each hoxel can be limited in accordance with its desired function within a display system to limit the number of hoxels that occupy any given sub-volume of the optical substrate 520 to preserve adequate diffraction efficiencies of the individual hoxels.

For example, as illustrated in FIG. 5B, the three depicted hoxels 522, 524, and 526 all occupy sub-volumes in which the individual hoxels 522, 524, 526 overlap with another one of the three hoxels 522, 524, 526 and sub-volumes in which the individual hoxels do not overlap with another one of the three hoxels. As depicted, sub-volumes 530, 536, and 538 are occupied by respective portions of the hoxels 522, 524, and 526 alone, while sub-volume 532 is occupied by overlapping portions of the hoxels 522 and 524 and sub-volume 534 is occupied by overlapping portions of hoxels 524 and 526. Similar to the hoxels 502, 504, and 506 of FIG. 5A, the hoxels 522, 524, and 526 can also differ in the spacing (pitch) and orientation (tilt) of their Bragg planes as well as in the form and magnitude of their refractive index modulation and overall depth corresponding to the number of Bragg planes.

Figure 6:
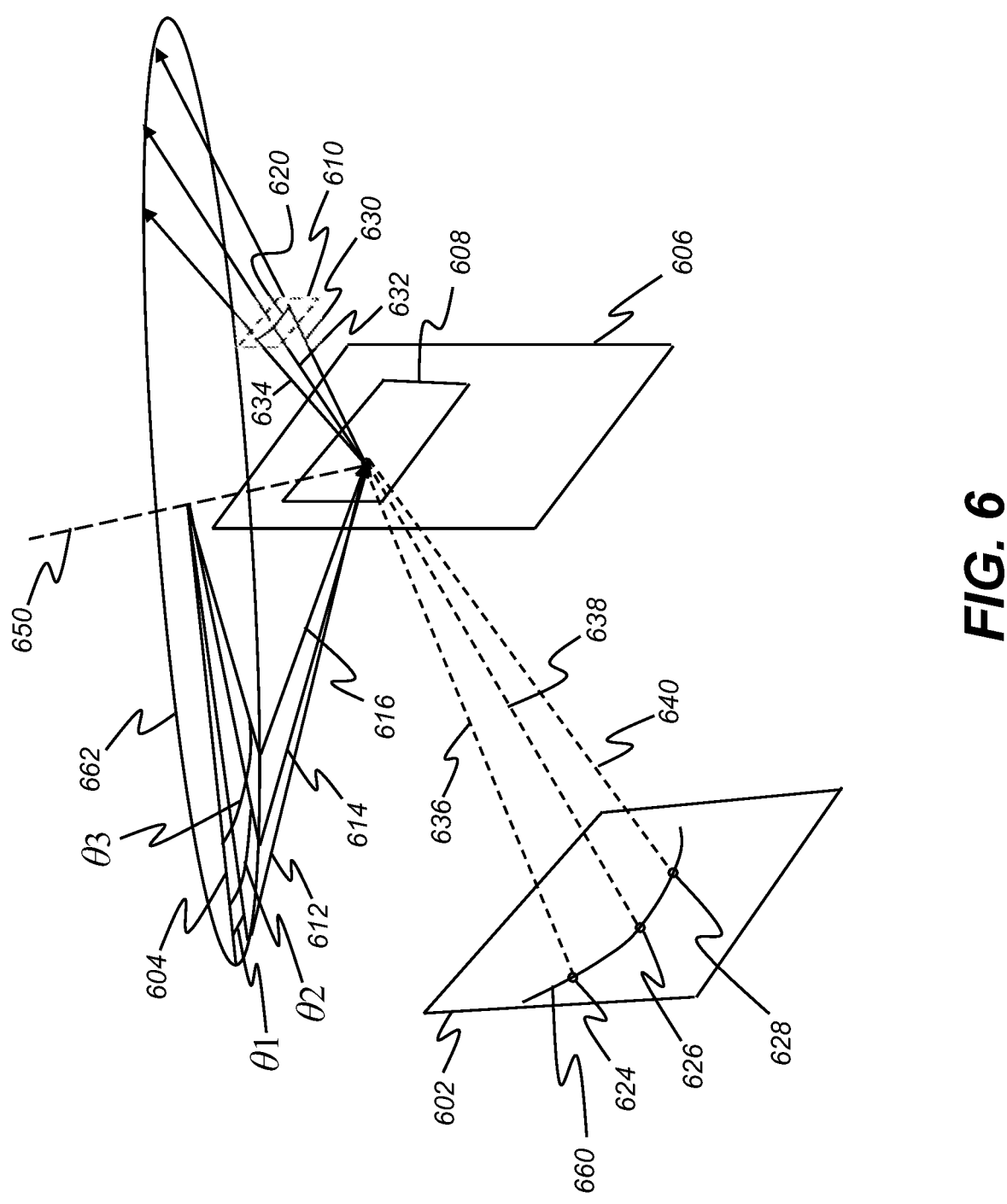
FIG. 6 illustrates a perspective view of an optical diagram of a transmissive volume Bragg grating having a single hoxel arranged for use in a near-eye display showing incident and diffraction reflected beams varying in rotational angle around a conical axis for displaying pixels lying along a common arc in a plane at optical infinity according to an embodiment of the present disclosure.

FIG. 6 depicts a portion of a near-eye display system in which a volume Bragg grating 606 having a single hoxel 608 within an optical substrate displays a portion of an image. The hoxel 608 operating in a transmissive mode displays a curved row of pixels 620 that appear to viewer's eye at eyebox 610 as if the curved row of pixels 620 is a curved row of pixels 660 in a plane 602 at optical infinity.

Similar to the transmissive volume Bragg grating 310 of FIG. 3, the hoxel 608 comprises a set of Bragg planes (not shown) formed within the optical substrate of the volume Bragg grating 606. Conical axis 650 extends normal to the Bragg planes. Incident beams 612, 614, 616 represented by like-numbered central rays of a given wavelength illuminate the hoxel 608 through equal angles of incidence γ (not shown) but at different respective rotational angles $\theta_1$, $\theta_2$, and $\theta_3$ around the conical axis 650 of cone 662. The rotational angles $\theta_1$, $\theta_2$, and $\theta_3$ of the respective incident beams 612, 614, 616 are distributed around an edge of the cone 662 as angular measures from a common reference line 604 that extends in a direction perpendicular to the conical axis 650.

Incident beam 612 is diffraction reflected by hoxel 608 through an equal angle γ' (not shown) as reflected beam 630 that travels to the eyebox 610. As viewed from within the eyebox 610, the reflected beam 630 appears as if originating from the pixel 624 in the plane 602 at optical infinity via the virtual beam 636. Similarly, incident beams 614 and 616 are diffraction reflected by hoxel 608 through equal angles γ' (not shown) as reflected beams 632 and 634 that also travel to the eyebox 610. As viewed from within the eyebox 610, the reflected beams 632 and 634 appear as if originating from respective pixels 626 and 628 in the plane 602 at optical infinity via respective virtual beams 638 and 640. The three pixels 624, 626, and 628 lie along the common arc 660 representing a locus of pixels defined by a wider range of rotational angles θ for other diffraction reflected beams through the same equal angles γ and γ' of incidence and reflection.

FIG. 7 depicts a portion of a near-eye display system in which a volume HOE 704 operating in a transmissive mode and having three hoxels 750, 752, and 754 within an optical substrate displays vertically displaced portions of an image. Each of the hoxels 750, 752, and 754 includes a set of Bragg planes (not shown) with respective conical axes 720, 722, and 724 extending normal to the Bragg planes. The conical axes 720, 722, and 724 are relatively inclined in a vertical direction coinciding with the respective planes of incidence and reflection for the incident rays 710, 712, and 714 and the reflected rays 730, 732, and 734 respectively as the central rays of collimated incident and reflected beams.

Assuming, for sake of discussion, that the Bragg planes of all three hoxels 750, 752, and 754 share the same pitch (i.e., the same Bragg conditions for reflection), any relative change in the inclinations of the conical axes 720, 722, and 724 should be accompanied by a corresponding change in the relative inclinations of the incident rays 710, 712, and 714 to preserve the same incidence angles γ of the incident rays 710, 712, and 714 at a common wavelength λ with respect to their conical axes 720, 722, and 724. In this circumstance, the relative inclinations of the reflected rays 730, 732, and 734 are changed by corresponding amounts. However, the pitches of the Bragg gratings could be varied among the three hoxels 750, 752, and 754 such that the relative inclinations among the incident rays 710, 712, and 714 differ from the relative inclinations among the conical axes 720, 722, and 724. For example, the relative inclinations of the conical axes 720 and 722 could differ by four degrees and the relative inclinations of the incident rays 710 and 712 could differ by two degrees. However, the relative inclinations of the reflected rays 730 and 732 would differ by six degrees. Thus, the average of the relative inclinations of the incident rays 710 and 712 and the reflected rays 730 and 732 would remain equal to the relative inclinations of the conical axes 720 and 722 but the magnitudes of the relative inclinations of the incident rays 710 and 712 and the reflected rays 730 and 732 can differ. In this way, the relative inclinations of the reflected rays 730, 732, and 734 can be magnified in relation to the relative inclinations of the incident rays 710, 712, and 714 so that a narrower range of incident rays can be converted into a wider range of reflected rays while maintaining any desired angular separation among the incident rays reflected from individual hoxels.

The reflected rays 730, 732, and 734 are directed to an eyebox 702 from which the reflected rays 730, 732, and 734 representing respective collimated beams appear as if originating from respective pixels 770, 772, and 774 in a plane 768 at optical infinity via respective virtual beams 740, 742, and 744. The three pixels 770, 772, and 774 are centered along respective arcs 756, 758, and 760 representing loci of pixels defined by fuller ranges of rotational angles θ about the conical axes 720, 722, and 724. Similar to the operation of the hoxel 608 of FIG. 6, each of the three hoxels 750, 752, and 754 can display additional pixels along different quasi-parallel arcs for other incidence angle γ and wavelength λ pairings that also satisfy the Bragg diffraction conditions of the hoxels 750, 752, and 754 for equal angles of reflection γ' over similar ranges of rotational angles θ. In this way, each of the three hoxels 750, 752, and 754 can display different two-dimensional areas of an image.

The three hoxels 750, 752, and 754 can be representative of a larger array of hoxels in two orthogonal spatial dimensions having conical axes that vary in inclination angle and/or pitch with displacement in either or both spatial dimensions. In addition, the inclination angles of the respective hoxel's conical axes can vary in two orthogonal angular dimensions in coordination with both the relative displacement of the hoxels in two spatial dimensions and variations in the respective pitches of the hoxels. The conical axis inclinations of the respective sets of Bragg planes comprising the hoxels together with the pitches of the Bragg planes within the sets can provide for controlling the relative angular orientation of the reflected beams overlapping within an eyebox for displaying imaging information encoded by incident beams in paired combinations of incidence angle and otherwise incidental variations in wavelength satisfying Bragg conditions of diffraction reflection from the hoxels. The spatial displacements of the hoxels together with limitations on the sizes and shapes of the hoxels provide for more efficiently directing light into the intended eyebox while limiting the number of hoxels that overlap within any given volume of the optical substrate.

While in a first instance, the hoxels are generally arranged for displaying different portions of an image, additional hoxels can be arranged for displaying the image portions in color using light in combinations that more significantly depart in wavelength such as light centered about different additive primary colors (e.g., red, green, and blue). The incidental variations in the wavelength of incident beams that provide for expanding the incidence angles subject to diffraction reflection from a given hoxel are in most cases limited to variations that remain recognizable as one of the additive primary colors. Similar incidental variations in wavelength associated with each of the additive primary colors can be used by additional overlapping hoxels to display the pixels of images in a full range colors.

For example, transmissive volume HOE 820 of FIG. 8 contains overlapping of hoxels 822, 824, and 826 in a multiplexed arrangement for displaying at least a portion of an image in full color. The x, y, z coordinate axes of a Cartesian coordinate system are oriented such that that the referenced z axis extends normal to a surface 804 of HOE 820. The hoxels 822, 824, and 826 are arranged for diffraction reflecting different color incident rays 810, 812, and 814 as a common reflected ray 840 that is directed to eyebox 802. For this purpose, the hoxels 822, 824, and 826 can be defined by respective Bragg planes 832, 834, and 836 that vary in combinations of tilt and pitch within a common volume of an optical substrate.

For example, the incident ray 810 representing the central ray of a collimated coherent beam of a given intensity can have a wavelength recognizable as the color red, the incident ray 812 representing the central ray of a collimated coherent beam of a given intensity can have a wavelength recognizable as the color green, and the incident ray 814 representing the central ray of a collimated coherent beam of a given intensity can have a wavelength recognizable as the color blue. The three incident rays 810, 812, and 814 representing collimated beams of different primary colors can be collectively diffraction reflected by the volume HOE 820 as the common reflected ray 840 representing the central ray of a collimated beam recognizable as given color in accordance with the relative intensities of the different primary color incident beams. Of course, in accordance with additive color theory one or more of the incident beams can have an intensity of zero and not be present to produce particular colors. The diffraction reflected beam represented by the ray 840 as seen within the eyebox 802 appears as a pixel of the given color within a plane (not shown) at optical infinity.

With variations in both the rotational angles θ and the incident angle γ and wavelength λ pairings of the incident beams, the respective hoxels 822, 824, and 826 can display additional pixels within at least partially overlapping areas of images within which a range of colors can be viewed. The amount of image overlap between the hoxels 822, 824, and 826 can be increased by reducing tilt angle differences between the respective sets of Bragg planes of the hoxels 832, 834 and 836 accompanied by correspondingly differing pitch differences between the same sets of Bragg planes. In this way, the incidence and rotational angles of the different color incident beams for illuminating individual pixels of the images also more closely match. The incidental variations in the wavelength λ of each of the different color beams that are diffraction reflected by the different hoxels 822, 824, and 826 can be limited or otherwise compensated to avoid substantial departures from the desired display of colors.

In FIG. 9, three separate volume Bragg gratings 922, 924, and 926 having respective sets of Bragg planes 932, 934, and 936 are assembled together in in layers forming a compound volume Bragg grating 920 operating in a transmissive mode. As shown, the Bragg planes 932, 934, 936 can be formed in respective optical substrates of the same or different materials, or alternatively can be formed at different depths in the same optical substrate.

Similar to the volume Bragg grating 820 of FIG. 8, the respective sets of Bragg planes 932, 934, and 936 of the compound volume Bragg grating 920 can vary in relative tilt and pitch. Also similar to the volume Bragg grating 820 of FIG. 8, the respective sets of Bragg planes 932, 934, and 936 as separate hoxels are arranged for diffraction reflecting different color incident rays 912, 914, and 916 representing the central rays of collimated incident beams as a common reflected ray 910 representing the central ray of a collimated reflected beam that is directed to eyebox 902. As seen within the eyebox, the reflected beam appears as if originating from a colored pixel within a plane (not shown) at optical infinity. The color of the pixel is determined in accordance with additive color theory as described above.

As a counterpart to the near-eye display system of FIG. 7 featuring a transmissive volume Bragg grating 704 for displaying different portions of an image, the near-eye display of FIG. 10 features a reflective volume Bragg grating 1004. Three incident light beams 1014, 1016, 1018 from light beam source 1012 are diffraction reflected as beams 1020, 1022, 1024 propagating toward eyebox 1002. The incident light beams 1014, 1016, 1018 have characteristics of wavelength and incident angle with respect to Bragg plane sets 1006, 1008, 1010 to match the corresponding conical diffraction condition and are diffraction reflected from different Bragg plane sets, 1006, 1008, 1010 of a volume hologram 1004. The characteristics of the Brag planes 1006, 1008, 1010, including their tilt with respect to the hologram's plane surface 1026 and their Bragg plane spacing are selected to direct the incident light beams 1014, 1016, 1018 to the eyebox 1002.

FIG. 11 illustrates an eyebox 1102, hoxels 1110, 1112, 1114 of hologram 1108, where hoxel 1112 is illuminated with illumination beam 1130. The hoxel 1112 height for example can be set between 3 and 12 millimeters, and the width can be set between 30 and 70 millimeters. The eye relief, the space between hologram 1108 plane and the eyebox 1102 can be set for example between 20 and 35 millimeters. The field of view (FOV) 1136 in the horizontal direction can be approximately 100 degrees or more. The width 1106 of the eyebox 1102 depends on the width 1132 of the beam 1130 used to illuminate the hoxel 1112. The beam 1130 can be for example at least 5 millimeters wide and less than 30 millimeters wide. The height 1104 of the eyebox 1102 depends on the height 1134 of the illuminating beam 1130 and on other parameters such as multiple total internal reflections.

In an embodiment, a plurality of overlapping hoxels are recorded in a photopolymer medium such as Bayfol™, made by Covestro, to form an HOE (e.g., see hologram 1108). In another embodiment, a plurality of overlapping hoxels are recorded in a photopolymer medium such as photo-thermo refractive (PTR) glass to form an HOE (e.g., see hologram 1108). Each hoxel of the HOE is a planar grating having Bragg planes, formed by interfering two mutually coherent collimated laser beams. The exposed area corresponding to each hoxel can be a curved region, which may correspond to the height of the eyebox. In order to obtain different tilts for the Bragg planes of the different hoxels, and to ensure that conical diffraction can direct illuminating beams toward the eyebox, the angles between the object and reference beams and between the beams and the recording medium can be different for each hoxel.

FIG. 12A illustrates one way to manufacture an HOE having multiple hoxels. The spacing and tilt angle of the Bragg planes is different for the different hoxels due to the different angles between a coherent object beam 1232 and a similarly coherent reference 1240 beam. Holographic recording setup 1200 includes a laser 1210 that generates a coherent light beam 1212 that is expanded into expanded beam 1216 by beam expander 1214. A portion of expanded beam 1216 is reflected by beamsplitter 1220 to become beam 1222 while another portion of expanded beam 1216 continues beyond beamsplitter 1220 to become beam 1224. Beamsplitter 1220 can be a highly reflective mirror that intercepts only a portion of beam 1216, allowing another portion of beam 1216 to pass by, or it can be a partially transmissive mirror. Beam 1222 is reflected by mirror 1226 to become beam 1228. Beam 1228 is reflected by mirror 1230 to become beam 1232. At least a portion of beam 1232 intersects and passes through volume hologram recording medium 1250.

Beam 1224 is reflected by mirror 1234 to become beam 1236. Beam 1236 reflects off of mirror 1238 to become beam 1240. At least a portion of beam 1240 passes through prism 1252 and intersects and passes through recording medium 1250. Interference at the intersection volume of the beam 1232 and the beam 1240 within a portion 1254 of recording medium 1250 creates the Bragg planes (not shown). Continuing with FIG. 12A, the mirror 1230 is mounted onto a rotary stage 1262 that is mounted onto linear translation stage 1260. The mirror 1238 is mounted onto a rotary stage 1264 that is mounted onto linear translation stage 1268.

FIG. 12B illustrates the holographic recording setup 1200 in which the linear stage 1260, the rotary stage 1262, the linear stage 1268 and the rotary stage 1264 have been adjusted to produce an angle 1258 between beam 1232 and beam 1240 wherein angle 1258 is different from angle 1256 of FIG. 12A. The resulting interference pattern (not shown) within the recording medium 1250 will be Bragg planes at a different orientation angle and spacing compared to the Bragg planes produced with angle 1256 of FIG. 12A.

FIG. 13 illustrates illuminating hoxel 1306 from an edge 1304 of a display 1302 using monochromatic light 1310 injected into display substrate 1312 approximately perpendicular to edge 1304 and at a total internal reflection (TIR) angle for surface 1324. The display substrate 1312 takes the form of a plane parallel waveguide. A portion of monochromatic light 1310 enters the display substrate 1312 to become ray 1314. Ray 1314 is diffracted by the Bragg planes 1308 of hoxel 1306 to become in part diffraction reflected ray 1316 that propagates through the display substrate 1312 to substrate surface 1322 where, failing to meet TIR condition for substrate 1312 at substrate surface 1322, it refracts out of the display substrate 1312 to become ray 1318. Another portion of ray 1314 propagates to surface 1324 of display 1302 where it reflects due to TIR to become ray 1320 that continues to propagate through the display substrate 1312 without diffraction because the ray 1320 does not meet the conical diffraction conditions of hoxel 1306. A portion of ray 1320 propagates to surface 1322 of display 1302 where it reflects due to TIR to become ray 1330 that continues to propagate through the display substrate 1312 and through the Bragg planes 1308. The Bragg planes cause ray 1330 to diffract creating diffraction reflected ray 1332 that refracts out of display substrate 1312 to become ray 1334. Another portion of ray 1330 is reflected by TIR at surface 1324 to become ray 1336 that continues to propagate through substrate 1312. This sequence of diffraction and TIR continues through the volume of the hoxel 1306. The rays 1318 and 1334 propagate in parallel to fill an enlarged eyebox (not shown).

FIG. 14 shows a portion of a display system 1400 in a perspective view. A two-axis tilt micromirror 1402 that can rotate about two orthogonal axes 1404, 1406 directs incident collimated light beams 1408 in selected directions as light beams 1420 that impinge onto an in-coupling optic 1422. In-coupling optic 1422 can be, for example, a diffraction grating (as shown), a prism, a beveled edge, or an HOE. IAs shown, the in-coupling optic 1422 is located on a surface 1414 of display 1410. Display 1410, which can take the form of a plane-parallel waveguide, has thickness 1424. The display 1410 has at least one HOE 1426 that is composed of at least one hoxel 1412. HOE 1426 can be a volume hologram. The light beams 1420 become light rays 1432 and 1430 within the display 1410 and propagate via TIR within the display 1410. Because of the high angular selectivity of volume holograms, the light rays 1430, 1432 are not significantly affected until they encounter a hoxel 1412 of HOE 1426 whose conical diffraction conditions are matched by the direction and wavelength of the light rays 1430, 1432. Lines 1436, 1434 illustrate the effective propagation direction of the light rays 1430, 1432 through the display 1410. A portion of the light ray 1432, whose parameters of wavelength and angle of incidence match the conic diffraction condition of hoxel 1412, is then diffracted by hoxel 1412 to become light ray 1440 directed toward the eyebox 1450. Similarly, portion of the light 1430 is diffraction reflected to become light ray 1442 directed toward the eyebox 1450. Each light beam having a distinct angle of incidence that matches the conical diffraction conditions of a given hoxel corresponds to a distinct pixel at infinity as viewed from the eyebox 1450.

The range of vertical pixel angles addressable by a given hoxel associated with different incidence angle and wavelength pairings can overlap the range of vertical pixel angles addressable by an adjacent hoxel, in which case a given pixel can be addressed by two adjacent hoxels. In this case, the single given pixel may be displayed with two different wavelengths sequentially or simultaneously.

Controller 1454 is connected to two-axis tilt micromirror 1402 via connection 1456. Controller 1454 may be used to control the orientation of the two-axis tilt micromirror 1402 with respect to the two orthogonal axes 1404, 1406. Controller 1454 may be comprised of at least a computer processor (not shown) suitable for executing stored instructions, at least one memory module (not shown) suitable for storing programable instructions, communications means (not shown) suitable for communicating with external devices, an electrical power source (not shown), a clock (not shown) suitable for determining the timing of control instructions. Communications means (not shown) may include physically connecting devices to the controller, and/or wirelessly connecting to external devices through a Bluetooth and/or Wi-Fi connection.

Connection 1456 may be used to activate transducers (not shown) for tilting and/or translating the two-axis tilt micromirror 1402. Connection 1456 may be used to provide electrical power to transducers (not shown) for tilting the two-axis tilt micromirror 1402.

FIG. 15 illustrates a hoxel 1514 and conical diffraction cone 1506. For each hoxel 1514 in an HOE 1502 containing multiple hoxels (not shown), there is a range of angles γ of the incident light beam 1508 with respect to the cone axis 1512, at which light beam 1508 of a given wavelength will be reflected with maximum efficiency (that is, at which light beam 1508 meets the conical diffraction conditions for a hoxel). The angle γ must match the conical diffraction condition in order to obtain maximum diffraction efficiency. Every angle θ around the surface of the cone 1506 for any other incident light beam 1510, having the same wavelength as light beam 1508, along the surface of the cone 1506 is consistent with the conical diffraction condition. The cone axis 1512 is perpendicular to the Bragg planes 1504 of the hoxel 1514. The line 1518 is in the plane 1516 of the surface of the HOE 1502. The angle φ is the angle that the Bragg planes 1504 are tilted and is the angle between the cone axis 1512 and the line 1518.

FIG. 16 illustrates a person's eye 1602 viewing a curved row of pixels 1604 in a plane 1606 at optical infinity. A line 1610 from a pixel 1612 is drawn to the eye 1602 through the system's eyebox 1614. The pixel 1612 is one of several pixels along the curved row of pixels 1604. The lines 1618A, 1618B extend from the plane 1606 at optical infinity to the eye 1602 and are perpendicular to the plane 1606 at optical infinity and at the center of the FOV. The lines 1620 and 1622 are in the plane 1606 at optical infinity and provide a Cartesian x- and y-coordinate representation of the position of the pixel 1612. Lines 1620 and 1622 are orthogonal to one another. Alternatively, the pixel 1612 position can be specified as angular coordinates α and β.

As illustrated in FIG. 16, when angle θ is continuously changed while keeping angle γ (see FIG. 15) constant, a virtual pixel appears at infinity and follows the curved row 1604 path in α, β coordinates. Although it is customary for displays to decompose images into straight-line rows and columns, there is no necessity to do so. Therefore, as is disclosed herein, it is advantageous to decompose images into curved rows of pixels 1604 and straight-line or curved columns for a display based on conical diffraction. By changing θ in very small steps, it is possible to obtain arbitrarily high pixel density along the curved rows 1604. Similarly, by changing angle γ (see FIG. 15) together with the wavelength λ of the illumination light (not shown) in very small steps, it is possible to obtain arbitrarily high pixel density in the orthogonal direction.

There is a tradeoff between diffraction efficiency of individual overlapped hoxels, the thickness of the recording medium, and the number of hoxels overlapped in the recording medium. In general, the maximum diffraction efficiency of each hoxel is inversely proportional to the square root of the number of overlapped holograms. Therefore, it is advantageous to minimize the number of overlapped hoxels in an HOE. This can be accomplished by at least two methods.

A first method to minimize the number of overlapped hoxels is to make the height of the eyebox relative to the height of the HOE as small as possible. For example, in a monochromatically illuminated display a 10 mm high eyebox can correspond to 10 mm high hoxels. If the HOE is 40 mm high and a vertical pixel count of 1000 is required, it may be necessary to overlap approximately 333 hoxels at each point of the HOE. However, if the eyebox height is reduced to 4 mm and the HOE height is 40 mm high, the overlap would be much less: approximately 110 overlapping hoxels. In order to accommodate a typical range of potential users of a near-eye display, an eyebox height of at least 4 mm may be utilized.

A second method to minimize the number of overlapped hoxels is to use multiple-wavelength illumination in which collimated beams over a range of incidence angles and wavelengths satisfy the conical diffraction conditions of individual hoxels, each over a range of rotational angles. Thus, each hoxel is capable of conveying a two-dimensional area of the image intended for display.

FIG. 17A illustrates the use of this second method to display multiple curved rows of pixels 1704, 1706 in the eyebox 1702 by illuminating a single hoxel (not shown) in HOE 1708. The cone axis 1734 of conical diffraction is perpendicular to the Bragg planes (not shown) of a hoxel (not shown) in HOE 1708. Illumination beam 1730 has a wavelength λ1 and is incident onto the HOE 1708 at an incident angle γ1 with respect to the cone axis 1734. Wavelength λ1 at incident angle γ1 of illumination beam 1730 satisfies conical diffraction conditions for the Bragg planes (not shown) associated with cone axis 1734 and is diffracted to become beam 1716 that propagates to eyebox 1702 to be viewed as illuminated pixel 1724. Illumination beam 1732 has a wavelength λ2 and is incident onto the HOE 1708 at an incident angle γ2 with respect to the cone axis 1734. Wavelength λ2 with incident angle γ2 of illumination beam 1732 also satisfies conical diffraction conditions for the Bragg planes (not shown) associated with cone axis 1734 and is diffracted to become beam 1718 that propagates to eyebox 1702 to be viewed as illuminated pixel 1726. When illumination beams 1730 and 1732 are in the y-z-plane, illuminated pixels 1724 and 1726 fall on the y-axis indicated by line 1722. Beams 1730 and 1732 are separated by an angle δ, and rays 1716 and 1718 are separated by angle α which is equal to angle δ in accordance with the conical diffraction conditions. It is to be understood that the pixels 1724, 1726, as well as all other pixels in the curved row of pixels 1704, 1706, and pixels in other curved rows (not shown) between 1704 and 1706 are as viewed by an viewer's eye (not shown) in the eyebox 1702 and are representations of the virtual pixels in a plane 1712 at optical infinity. See, for example FIG. 7.

Other pixels on curved row of pixels 1704 are illuminated by shifting the illumination beam 1730 over the cone surface (see FIG. 6) in angular steps θ1. Other pixels on curved row of pixels 1706 are illuminated by shifting the illumination beam 1732 over cone surface (see FIG. 6) in angular steps θ2. Curved row of pixels 1704 may not have the same line curvature as curved row of pixels 1706. Pixels along curved row of pixels 1704 are not necessarily aligned with pixels of curved row of pixels 1706 along lines parallel to the y-axis. However, by using multiple illumination beams at closely spaced wavelengths and correspondingly closely spaced angles δ, it is possible to display multiple rows of pixels via a single hoxel. The number of such rows of pixels is limited only by the angular selectivity of the hoxel and the precision with which the illumination angle and the wavelength can be controlled. Angle δ is an angle within the range of angles required due to wavelength shift λ1 to λ2. For a fixed λ and δ, angle θ is varied to move the displayed pixel 1724 through its range along the curved row of pixels 1704 at infinity; while angle δ and the corresponding wavelength λ are varied to move the displayed pixel through a vertical range corresponding to angle δ. "Vertical" in this context refers to a direction that is approximately orthogonal to a curve drawn through pixels 1704.

Although the number of pixels that may be displayed in the vertical direction via a single hoxel is effectively unlimited, the practical vertical range of such pixels is limited by the sensitivity of human perception to wavelength differences. Human vision can perceive color differences between wavelengths separated by 2 to 10 nanometers, depending on the wavelength. To make different curved rows of pixels 1704, 1706 appear to have the same color when viewed in isolation even though they are displayed with different wavelengths, the range of wavelengths λ can be less than 2 nanometers or less than 10 nanometers, depending on the part of the spectrum in which the pixel is displayed. However, in an RGB display, different wavelength combinations $(\lambda_R, \lambda_G, \lambda_B)$ and $(\lambda'_R, \lambda'_G, \lambda'_B)$ can result in perception of the same color, according to the well-known principle of a chromaticity diagram.

Each hoxel can be used to display a different band of rows of pixels, and the Bragg plane tilt and spacing of each hoxel can be selected to allow illumination independently from the other hoxels, while enabling the full set of bands of rows to fill the field of view. For example, each hoxel could be used to display 30 rows of pixels, each pixel in a specific row being illuminated, or addressed, by a fixed angle $\gamma$ parameter fixing the curved row of pixels addressed while adjusting the angular parameter $\theta$. This would reduce by a factor of 30 the number of hoxels needed for the HOE to display a given number of rows of pixels, and correspondingly reduced number of hoxels subject to overlap increases the achievable diffraction efficiency per hoxel.

The term "reflection hologram" as used in this disclosure refers to holograms made using an object beam and reference beam incident from opposite sides of a holographic recording medium (also called a "plate"). The term "transmission hologram" refers to holograms recorded using object and reference beams incident from the same side of a plate. However, when holograms are recorded using a totally internally reflected (TIR) reference beam, each hologram would then be operable under modes of both transmission and reflection because the reference beam will be propagating both upward and downward with respect to the surfaces of the recording medium. An illumination beam propagating by TIR in such a hologram can reconstruct both the transmission and the reflection components of the hologram. An advantage of this configuration is that diffraction occurs along the entire path of an illumination ray propagating in the hoxel, whereas in the cases of reflection-only and transmission-only holograms, diffraction occurs only for those portions of the illumination ray whose upward or downward direction of propagation corresponds to reflection vs transmission. However, the upward-moving and downward-moving portions of the propagating TIR reference beam will typically interfere in the medium, producing a planar grating whose Bragg planes are parallel to the surfaces of the recording medium. This planar grating converts a portion of each downward-propagating beam component to an upward-propagating component, and a portion of each upward-propagating component to a downward-propagating component, at every point along the propagation path of the TIR illumination beam. While this does not affect the propagation direction of the diffracted beam outside the plate, the additional Bragg planes consume some of the dynamic range of the recording medium and are thus usually not desirable. Therefore, it is important to be able to record a hologram that can be reconstructed via TIR illumination, using a geometry in which the reference beam is not propagated via TIR.

FIG. 17B illustrates the cones 1750, 1752 associated with illumination beam 1730 and illumination beam 1732.

FIG. 18 shows an arrangement for recording a transmission hologram that can be reconstructed via TIR illumination but is recorded without a TIR reference beam. Object beam 1812 having beam width indicated by rays 1808, passes through a prism assembly 1804 and through recording medium 1802. Reference beam 1814 having beam width indicated by rays 1806 passes through prism assembly 1804 and recording medium 1802 to intersect and interfere with object beam 1812 in region 1810. The object beam 1812 and the reference beam 1806 both enter the recording medium 1802 from the side 1820 of the recording medium 1802. For the resulting hologram to be illuminated via TIR, the angle of propagation of the reference beam must be within the range of TIR angles within the plate, typically greater than about 40 degrees from normal incidence on the surface.

Preferably the reference beam propagates at an angle within the recording medium ranging from about 40 degrees to 60 degrees measured from the surface normal.

FIG. 19 shows an arrangement for the recording a reflection hologram that can be reconstructed using TIR illumination. Object beam 1908 having beam width indicated by rays 1912, passes through a prism assembly 1904 and through the recording medium 1902. Reference beam 1914 having beam width indicated by rays 1906 passes through recording medium 1902 to intersect and interfere with object beam 1908 in region 1910 of recording medium 1902. The object beam 1908 and the reference beam 1914 enter the recording medium 1902 from opposite sides 1920, 1922 of the recording medium 1902, thereby recording a reflection hologram. For the resulting hologram to be illuminated via TIR, the angle of propagation of the reference beam must be within the range of TIR angles within the plate, typically greater than about 40 degrees and less than about 60 degrees from normal incidence on the surface. Preferably the reference beam propagates at an angle ranging from about 40 degrees to 60 degrees.

Illumination of HOE in Conical Diffraction Display

There are multiple possible approaches to illuminating a multi-hoxel HOE made according to this disclosure. All of the approaches have the goal of directing light to the hoxels in such a way that the light meets the conical diffraction conditions of at least one hoxel. In order to make use of the full potential of planar Bragg grating hoxels, the range of angles $\theta$ around the surface of a cone may be as much as +50 degrees to −50 degrees. In order to provide that range of illumination angles in a system compact enough to serve as a relatively unobtrusive eyeglass-type display, it is advantageous for the illumination to employ total internal reflection, with illumination light injected at the edges of the HOE.

To understand the challenge of illuminating these hoxels, it is useful to imagine a time-reversed version of all of the rays corresponding to pixels in a curved row at optical infinity, propagating simultaneously. The time-reversed rays exit the edges of the HOE into a wide range of directions. Illumination of the hoxel to display all of the pixels in the row requires the ability to project light into the HOE from each of those directions selectively, whether serially or in parallel.

One category of illumination approaches injects light directly into the edges of the HOE using TIR in-coupling optics such as beveled faces, prisms, or gratings. Another category of illumination approaches employs retroreflective elements to allow the illumination sources to occupy a smaller portion of the HOE's perimeter. Yet another category of illumination approaches employs direct illumination of the hoxels rather than illumination via TIR. A hybrid illumination approach employs an external projector which projects light into TIR in-coupling optics on the HOE (on the face of the HOE or near the edges of the HOE). Some illumination systems employ a single non-monochromatic light source, multiple monochromatic light sources, or multiple non-monochromatic light sources. Some deliver light via optical fibers.

FIG. 20A illustrates illumination of a hologram 2002. The beam 2004 is injected into the hologram 2002 at an edge surface 2012 such that the beam 2004 is approximately perpendicular to edge surface 2012 and such that beam 2004 will TIR at the hologram surfaces 2016, 2018 and thus propagate through the hologram volume 2014. If a hologram is recorded as illustrated in FIG. 18, so that the reference beam 1812 propagates at an angle of between 40 and 60 degrees (measured from surface normal) through the recording medium 1802, then when illuminated in TIR as illustrated in FIG. 20A the hologram will reconstruct only in transmission as indicated by rays 2006, 2008, 2010.

FIG. 20B illustrates illumination of the hologram 2030. The beam 2032 is injected into the hologram 2030 at an edge surface 2042 such that the beam will TIR at the hologram surfaces 2050, 2052 and thus propagate through the hologram volume 2044. If a hologram is recorded as illustrated in FIG. 19 then when illuminated in TIR as illustrated in FIG. 20B the hologram will reconstruct only in reflection producing rays 2034, 2036, 2038. Typically, the Bragg planes are spaced more closely in a reflection hologram than in a transmission hologram, so usually a reflection volume hologram will provide greater angular selectivity than a transmission volume hologram. Greater angular selectivity is a useful feature for a hoxel to have in the context of this disclosure because it reduces the likelihood of crosstalk. Crosstalk includes diffraction at other than the ideal conical diffraction conditions of wavelength and angle of incidence. However, transmission geometry is the preferred hoxel geometry, and increased HOE thickness can increase the angular selectivity if needed.

FIG. 21A shows the illumination of an HOE 2102 via TIR. The HOE 2102 may be recorded as illustrated in FIG. 18 so that it reconstructs only in transmission. The illumination beam 2116 has a beam width indicated by lines 2104 and 2106. The illumination beam 2116 is injected into the HOE 2102 at an edge surface 2118 of the HOE 2102 such that the illumination beam 2116 will TIR within the HOE medium 2120, and thus propagate through the HOE 2102. The diffracted ray bundles 2110, 2112, 2114 out of the HOE 2102 may have significant gaps 2122, 2124 between the ray bundles 2110, 2112, 2114. As shown in FIG. 21A, ray bundles 2110, 2112, 2114 only diffract out of the HOE 2102 as the injected beam 2116 travels from the bottom surface 2128 of HOE 2102 to the top surface 2126 of HOE 2102. The gaps 2122, 2124 are produced where the beam 2116 travels only from the top surface 2126 to the bottom surface 2128 of the HOE 2102.

In an embodiment, as illustrated in FIG. 21B, the diffraction beam gaps 2122, 2124 of FIG. 21A are reduced. The HOE 2150 is illuminated by an illumination beam 2156 having a beam width indicated by lines 2152, 2154. The beam 2156 is injected into the HOE 2150 through an edge surface 2158 of the HOE 2150 at an angle to cause TIR of the beam 2156 in the HOE material 2180. The illumination beam width 2152, 2154 is adjusted to diminish the gaps 2166, 2168 between the diffracted beam bundles 2160, 2162, 2164. By adjusting the width of the beam 2156, the beam edge 2152 can be made to TIR at the bottom surface 2184 of HOE 2150 at the point 2174 while having the beam edge 2154 TIR from the bottom surface 2184 at the point 2176. The point 2176 is directly below the point 2170 at which the beam edge 2152 TIRs from the top surface 2182 of the HOE 2150. Thus, the gaps 2166 and 2168 may be reduced or eliminated based in part on the width of the injected beam 2156.

As will be evident to those skilled in the art, twice as much beam width would be required to completely fill the diffracted beam if the hoxel were a surface relief hologram rather than a volume hologram.

FIG. 22A is a cutaway view of an illumination system for a display system 2200 using two-axis tilt micromirrors 2212, 2214 and laser sources (not shown). As illustrated in FIG. 22A, laser beams 2230, 2236 are incident onto beveled faces 2224, 2226 of the HOE plate 2202, and pass through the HOE plate material 2208 to strike tiltable micromirrors 2212, 2214. The micromirrors 2212, 2214 are located in cavities 2220, 2222 of a tilt-mirror section 2204 and are actively programmatically tilted to direct reflected beams 2232, 2238 toward the hoxels 2210 in the HOE plate 2202 at angles that match the conical diffraction conditions of the hoxels 2210. When the conical diffraction conditions of a hoxel 2210 are met by beams 2232, 2238, beams 2234, 2240 diffract out of the display system 2200. By directing a particular beam at a particular hoxel at the angles that match the conical diffraction conditions for that hoxel and the wavelength of the laser beam, a particular pixel at optical infinity is displayed. Each micromirror 2212, 2214 can direct its beam to a continuum of different conical diffraction condition matching angles on a given hoxel and can thereby display a continuum of different pixels at infinity. Moreover, each micromirror 2212, 2214 can direct its beam 2232, 2238 at angles that match the conical diffraction conditions for several different hoxels and can therefore display pixels in several different (curved) rows at infinity.

FIG. 22B further illustrates the HOE plate 2202 and the tilt-mirror section 2204 of the display system 2200 in an exploded perspective view. In an embodiment, HOE plate 2202 has beveled faces 2224, 2250.2252, 2252, 2254, 2226, and hoxels 2210. The tilt-mirror section 2204 includes a plurality of micromirror cavities 2260, 2262, 2264, 2268, 2270 corresponding to the beveled faces 2224, 250, 2252, 2252, 2254, 2226 of the HOE plate 2202. Each of the micromirror cavities 2260, 2262, 2264, 2268, 2270 includes a two-axis tilt mirror (see FIG. 22A) operable to direct incident beams (see FIG. 22A) toward hoxels 2210. It is to be understood that, for the purpose of drawing clarity, only a small number of tiltable micromirror cavities are illustrated. In practice, a large number, e.g., several hundred, of tiltable micromirrors may be utilized.

FIG. 23 illustrates a portion of an illumination system 2300 shown in exploded perspective view. As illustrated in FIG. 23, in an embodiment, a top plate 2302 comprises a hoxel area 2304 in which at least one hoxel (not shown) may be recorded. Top plate 2302 further comprises micromirror assemblies 2306, 2308, 2310 distributed around at least a portion of the perimeter 2340 of the top plate 2302. In an embodiment, each of the micromirror assembles 2306, 2308, 2310 consists of one or more two-axis micromirrors. It is to be understood that, for the purpose of drawing clarity, only a small number of tiltable micromirrors are indicated. In practice a large number, e.g. several hundred, tiltable micromirror may be utilized.

The bottom plate 2320 comprises grating couplers 2322, 2324, 2326. Illumination beams 2330, 2332, 2334 strike the grating coupler 2324 then proceed to micromirror 2308 near the perimeter 2340. Illumination beam 2330 has a wavelength $\lambda_0$, illumination beam 2332 has a wavelength $\lambda_n$, and illumination beam 2334 has a wavelength km. Each of illumination beams 2330, 2332, 2334 are incident onto the grating 2324 at a different angle $\zeta$ with respect to one another. The range of wavelengths from $\lambda_0$ through wavelength $\lambda_m$ may be a continuum of wavelengths or a finite set of wavelengths.

FIG. 24 illustrates a portion of an illumination system 2400 shown in exploded perspective view. As illustrated in FIG. 24, in an embodiment, a top plate 2402 comprises at least a micromirror subsystem 2412 and a HOE area 2404. The HOE area 2404 may be composed of at least one hoxel (not shown). A bottom plate 2406 comprises at least an in-coupling diffraction grating 2410. Incident beam 2420 may be a non-monochromatic beam that passes through bottom plate 2406 as beam 2422. Beam 2422 is incident onto the in-coupling diffraction grating 2410. The in-coupling diffraction grating 2410 disperses the beam 2422 into a continuum of monochromatic beams 2426, 2424 having a continuum of wavelengths λ1, λ2 that depart the in-coupling diffraction grating 2410 at a range of angles ξ1, ξ2 with respect to the surface normal 2440 of bottom plate 2406. The continuum of monochromatic beams 2426, 2424 reflect from micromirror subsystem 2412 to become reflected beams 2430, 2432 that propagate through the top plate 2402 to the HOE area 2404.

The conical diffraction conditions will be met for each such monochromatic beam 2426, 2424 only at corresponding ranges of tilt angles (not shown) of the micromirrors within the micromirror subsystem 2412. By appropriate choice of the grating pitch in the in-coupling diffraction grating 2410, the incidence angle of the non-monochromatic beam 2420 into the in-coupling diffraction grating 2410, and the conical angle and the axis for each hoxel of the HOE area 2404, it is possible to ensure that, at most, only one pixel at optical infinity is displayed for any angular position of a tilt mirror of the micromirror subsystem 2412, at least within a particular finite angular range. Typically, a large number of tilt mirrors are required to illuminate a hoxel from the full range of angles needed to fill the portion of the full field of view displayed via that hoxel.

Other illumination systems using picoprojectors, diffraction gratings as in-couplers, and so on, may be designed utilizing the principles disclosed herein.

FIG. 25 illustrates multiple light beams β₁, β₂, β₃ having different wavelengths. The light beams β₁, β₂, β₃ are incident onto a tiltable micromirror 2508, such that each of the light beams β₁, β₂, β₃ has a different incident angle onto the micromirror 2508. The tiltable micromirror 2508 may rotate about both axis 2510 and axis 2512. Axis 2512 may be orthogonal to axis 2510. Reflected light beams β'₁, β'₂, β'₃ depart the micromirror 2508 at corresponding different angles to one another. The propagation angles and wavelengths of the reflected light beams β'₁, β'₂, and β'₃ match the conical diffraction conditions of a hoxel after being coupled into a HOE containing the hoxel.

FIG. 26 illustrates a tiltable micromirror 2654 with a Fresnel grating 2656. The tiltable mirror 2654 may rotate about a rotation axis 2660 and an orthogonal rotation axis 2670. In an embodiment, an array of light sources 2650 comprising multiple light emitting diodes 2652 is used to illuminate the tiltable mirror 2654. Other illumination source types may also be used. A divergent light beam 2662 emitted by the array of light sources 2650 may reflect from the tiltable mirror 2654 and be directed as collimated beam 2668. A second divergent light beam 2664 emitted by the array of light sources 2650 may reflect from the tiltable mirror 2654 and be directed as collimated beam 2666. The angular tilt of the tiltable mirror 2654 about the two orthogonal axes 2660, 2670 may depend on which light sources 2652 of the array of light sources 2650 are turned on (i.e., emitting). An optical metamaterial surface relief pattern may be included on the tiltable micromirror 2654 to correct at least partially for chromatic aberrations.

FIG. 27 illustrates a portion of an alternative illumination and scanning system. A polychromatic light source 2702 generates a divergent light beam 2704 that impinges onto a lens 2706. The lens 2706 is combined with a grating 2708 that divides the divergent light beam 2704 into multiple light beams 2710, 2712 according to wavelength. The grating 2708 also focuses the light beams 2710, 2712 onto a modulator array 2714. In an embodiment, the modulator array 2714 is an LCD array. The modulator array 2714 may be an array of tiltable micromirrors and digital micromirror devices (DMD). In an embodiment, the modulator array 2714 is an LCOS device. Divergent light beams 2720, 2722 from the modulator array 2714 are transformed into collimated beams 2728, 2726 by a collimating lens 2724. The collimated beams 2728, 2726 are redirected by a tiltable micromirror 2730, operable to tilt about two orthogonal tilt axes 2732, 2744, to become collimated beams 2740, 2742. As illustrated in FIG. 27, this arrangement allows multiple pixels to be displayed independently and in parallel, by independently activating the modulator elements of the modulator array 2714 corresponding to the pixels at optical infinity.

Collimated beams from adjacent modulator elements of the modulator array 2714 will have an angular difference downstream from the tiltable micromirror 2730. The micromirror 2730 scans through a range approximately equal to that angular difference, while the modulator elements of the modulator array 2714 modulate the individual beams. This fills in all the gaps between adjacent pixels (not shown). Lens 2706 may have a second grating on/at one of its surfaces to compensate for aberrations or to angularly spread sub-spectra from the individual modulator elements of the modulator array 2714. The second grating may be applied to a lens surface by ion milling, UV casting, or any of several other methods.

FIG. 28 illustrates the illumination and scanning system of FIG. 27 from a different perspectivesystem. In an embodiment, as illustrated in FIG. 28, the illumination and scanning system includes the light beam 2704 from the light source 2702, that may be an LED, is collimated by lens 2706, spectrally dispersed in the horizontal direction by the grating 2708, then formed into a 2D array of nearly monochromatic beams. A liquid crystal modulator array 2714 at the focal plane of lens array grating 2708 modulates each beam independently. In this case, the term "focal plane" means the plane or curved surface at which the beams come to separate foci. The lens 2724 recollimates each beam 2720, 2722 and causes all of the beams 2720, 2722 to converge on the tiltable micromirror 2730. A phase-adjusting element may be interposed at any of several places between the light source 2702 and the lens 2724 to correct for aberrations and ensure that each beam is collimated when it exits the lens 2724.

Light beam 2704 may be a monochromatic light beam or a non-monochromatic light beam. In an embodiment, as illustrated in FIG. 28, monochromatic light incident on each individual micromirror of the modulator array 2714 has N×M distinct illumination beams, each with its own angle and wavelength. Therefore, the system can provide parallel display of up to N×M independent pixels. The micromirror 2730 may have a surface relief grating, so reflected beams 2740, 2742 may be at non-normal mirror reflection angles.

It should be noted that the pixel density in one direction depends on the micromirror 2730 tilt angle precision and repeatability, while the pixel density in the other direction depends on the number of distinct wavelengths available. Therefore, in an embodiment, the system employs a non-monochromatic light source 2702, such as, but not limited to, a broadband (40 nm) LED.

FIG. 29 illustrates a portion of an illumination and scanning system. In an embodiment, a light source array 2902 is an array of independently controlled laser diodes or LED's 2904. Each laser diode or LED 2904 may emit a divergent polychromatic beam 2906. A portion of beam 2906 is incident on a portion of focusing grating 2910, 2912 on a tiltable micromirror 2908 having tilt axis 2914 and orthogonal tilt axis 2916. The focusing grating 2910, 2912 combines the functions of a Fresnel lens 2912 operable to collimate the impinging beam 2906 and a linear grating 2910 operable to distribute collimated monochromatic beams 2920, 2922 into different directions. Linear grating 2910 separates the polychromatic beam 2906 into spectral component beams 2920, 2922. Note that for the purpose of drawing clarity FIG. 29 only shows two out of a continuum of beams derived from a single light source 2904. Each light source in the light source array 2902 will produce a continuum of beams, each corresponding to a different wavelength. Also, for drawing clarity only four light sources in the light source array 2902 are shown; however, the light source array 2902 may comprise as many as hundreds or thousands of light sources. This arrangement allows independent modulation of the brightness of the pixels corresponding to each of the laser diodes or LED's 2904 and micromirror 2908 tilt directions. The focusing grating 2910, 2912 may be an optical metasurface, a surface relief hologram, or an e-beam fabricated diffractive structure. Moreover, one or more phase control elements may be included between the light source array 2902 and the micromirror 2908 or downstream from the micromirror 2908, to further reduce aberrations in the produced beams 2920, 2922.

FIG. 30 illustrates a portion of an illumination and scanning system which employs a plurality of illumination modules, each of which includes light source array 3002, 3004 and tiltable mirror 3014, 3016, respectively. The light source arrays 3002, 3004 may include independently controlled laser diodes or LED's 3006, 3008. Each LED 3006, 3008 emits a continuum of different wavelengths in a range of approximately 40 nanometers. The light beam 3010, 3012 from each LED 3006, 3008 is collimated and redirected by the grating 3032, 3034 onto the micromirror 3014, 3016 into a continuum of different angles, each angle corresponding to a different beam 3026, 3040, and 3028, 3042 each having a different wavelength. Micromirror 3014 has tilt axes 3018, 3020. Micromirror 3016 has tilt axes 3022, 2024. Beams 3026, 3040, and 3028, 3042 are directed by the tiltable micromirrors 3014, 3016 to at least partially impinge onto hoxels (not shown) of HOE 3030. The tilt angles of the micromirror and the spacing of the LEDs are adjusted to display multiple pixels simultaneously, where there may be one pixel displayed for each LED 3006, 3008, at any given tilt angle. Each LED 3006, 3008 may be modulated independently, thereby allowing parallel independent simultaneous display of as many pixels as there are LEDs in the array 3002, 3004. Each fixed position of the tilt mirror in a module will result in the display of a column of pixels, each pixel corresponding to an LED. Scanning the tilt mirror on its two axes will display pixels in a portion of the overall field of view. Adjacent modules can display pixels in overlapping portions of the overall field of view, thereby enlarging the eyebox.

In practice, it may be difficult to position the LEDs with sufficient precision to be able to predict the tilt angles needed to illuminate a specific pixel at infinity for each module. Therefore, in an embodiment a calibration procedure is executed wherein each module scans through its range of angles and the resulting locations of displayed pixels are measured. The resulting data is then used to provide a look-up table or other algorithmic means to translate a desired image frame into a corresponding set of tilt angles and modulations.

FIG. 31 illustrates another alternative illumination system. An In an embodiment, an LED array 3102 illuminates an optical element 3104 comprising both a diffraction grating and a lens. Illumination light 3120 is split into two or more convergent beams 3122, 3124 depending on the spectral composition of illumination beam 3120. The beams 3122, 3124 are focused onto an LCD modulator array 3106. The beams from the LCD modulator array 3106 couple into optical fibers 3112 of optical fiber bundle 3110 to propagate to desired positions. An optional LCD modulator 3114 at the distal end of the optical fibers 3112 may further change the angular distribution of the light. The light is focused into columns of N spots 3108 corresponding to the N LED's in the LED array 3102. The light in each spot enters an optical fiber 3112 in the optical fiber bundle 3110 and is conveyed in that optical fiber 3112 to a corresponding place where it may be used to illuminate one or more tiltable micromirrors which in turn direct the light to hoxels in an HOE in order to display pixels at optical infinity (not shown). Using optical fibers 3112 allows compaction of the overall optical system without the geometric limitations imposed by refractive, diffractive, or reflective optics on conveying light to the specific locations and angles required to meet the conical diffraction conditions.

FIG. 32 illustrates the illumination of multiple hoxels 3204, 3206 of HOE 3202. The illumination beams 3210, 3212, 3214 have different incident angles onto the HOE 3202 and thus onto some of the hoxels 3204, 3206. Illumination systems involving a tiltable micromirror can have an issue involving the scan rate of a two-axis tiltable micromirror.

There are several ways to overcome the issue, many of which involve displaying multiple pixels independently and in parallel. First, each micromirror can be illuminated by multiple light sources at different γ angles but having the same wavelength as illustrated in FIG. 25. In FIG. 25, the multiple light sources 2502, 2504, 2506 are independently modulated laser diodes in one-row of a laser diode array.

Second, each micromirror can be illuminated by multiple beams having different γ angles and different wavelengths. As illustrated in FIG. 27, a single laser diode source 2702 forms a plurality of beams individually focused onto pixels of a liquid crystal light modulator 2714, collimating optics 2724, and a tiltable micromirror 2730. This system provides multiple collimated beams all having the same wavelength and all incident on the micromirror but having different γ angles. The micromirror 2730 may have a surface relief grating (for example, a blazed reflective grating) to deflect the reflected beam away from the standard reflection angle and thus allow off-axis operation. The liquid crystal light modulator 2714 allows each beam to be modulated independently, and therefore allows the resulting pixels to be displayed in parallel, one for each beam. In a working implementation, each of multiple micromirrors has a corresponding illumination subsystem to illuminate the micromirror with multiple collimated beams having the same wavelength.

It is possible to illuminate each micromirror simultaneously with a number of independently intensity-controlled beams, each having a different wavelength, using for example the optical system illustrated in FIGS. 27 and 28.

FIG. 33 depicts use of a single non-monochromatic LED 3302 to illuminate a micromirror 3308. The micromirror may have two orthogonal tilt axis 3310, 3312. Divergent illumination beam 3304 is emitted from LED 3302 and travels to lens system 3306. Lens system 3306 may collimate or nearly collimate beam 3304 to become beam 3314 that impinges onto the tiltable micromirror 3308. The micromirror 3308 redirects beam 3314 to become beam 3316 that proceeds to hoxels (not shown). The beam 3316 may be swept through angular ranges 3320 depending on the tilts of the micromirror 3308.

The LED 3302 may be modulated to control the intensity of non-monochromatic beam 3304 at each moment. Only one wavelength meets the conical diffraction conditions for a particular hoxel and at a particular tilt angle, so as the micromirror 3308 is tilted through a two-dimensional continuum of angles, the hoxel will diffract a specific wavelength at each tilt angle, forming a two-dimensional continuum of pixels at infinity. The micromirror 3308 may be tilted about the two tilt axes 3310, 3312 to predetermined orientations depending on the wavelengths of beam 3304 emitted by the LED. In this way, the micromirror can adjust the angular approach to a HOE having multiple hoxels such that the conical diffraction conditions are met by the beam 3316 according to (or consistent with) the wavelength of the beam 3316.

The illumination beam 3304 is positioned at an angle. If the LED 3302 has a spectral width 30 times the angular selectivity of the target hoxel, only about $\frac{1}{30}^{th}$ of the light reaching the hoxel at any particular angle will be diffracted. If the micromirror 3308 is tilted slightly about the tilt axis 3310 and/or the tilt axis 3312, the light will reach the hoxel at a slightly different angle. Only the spectral portion of the light 3316 that has the right wavelength λ to meet the conical diffraction conditions of the hoxel will be diffracted to the system's eyebox (not shown). The diffracted light (not shown) at a first and second angle (not shown) will correspond to two different pixels at optical infinity, separated by an angle that is twice the difference between the two micromirror tilt angles.

Therefore, the vertical pixel density will depend not only on the number of hoxels, but also on the number of different wavelengths that can be used to illuminate a hoxel. Because an LED 3302 produces a continuous spectrum, the obtainable vertical pixel density is in principle limited only by the angular selectivity (which is directly related to the wavelength selectivity) of the hoxel. However, in practice the frame rate of the micro actuator and the achievable modulation speed of the LED 3302 will limit the vertical pixel density. The same is true of horizontal pixel density.

FIG. 40 illustrates another illumination system 4000 employing retroreflectors or retrofluorescent elements 4006 around the periphery of the HOE 4002. The system 4000 allows all of the illumination to be provided from two adjacent sides of the HOE 4002 (e.g., the top and outside edge). Light 4010 may be injected into the HOE 4002 via a source 4004. The light 4010 may be injected into a TIR mode traveling from the right edge 4020 of the HOE 4002. For illumination of a hoxel in the HOE 4002 from the left-hand side 4022, light 4010 may be injected into a TIR mode traveling from the right edge 4020 but retroreflected from retroreflective elements 4006 on the left-hand side 4022 to propagate via TIR in the opposite direction and thereby illuminate the HOE 4002 from the left-hand side 4022 despite having its source 4004 on the right-hand side 4004.

For providing a broadband, high spatial coherence light source instead of an LED, scannable in x and y, a relatively short-wavelength beam (e.g., 450 nm or 405 nm) can be scanned in angles phi and theta through a lens onto a phosphor screen located one focal length beyond the lens. The short wavelength beam can be focused to a very small point by the lens onto the phosphor screen. Fluorescence of the phosphor, induced by the short wavelength light, forms a broad band, bright, point light source.

FIG. 41 illustrates a system 4100 having a layer of high refractive index spherical beads 4124 coating the phosphor screen 4128. The combination of phosphor 4128 and high index beads 4124 comprises a retrofluorescent screen. When a beam is scanned by scanning mirror 4106 through a range of angles theta and phi 4110, the resulting point source of broadband fluorescent light can be scanned through a corresponding range of x, y positions 4130 on the screen. The retrofluorescent beam passes through lens 4116 and is transformed to a collimated beam whose angle theta prime, phi prime, corresponds to the scan angle theta, phi. Importantly, after passing through a beamsplitter 4114, the retrofluorescent beams all pass through an aperture 4120 that corresponds to the scanner aperture. Source 4102 is a short wavelength light source.

The illumination source can provide a position and angle scannable non-monochromatic collimated beam that may be injected into a TIR mode to illuminate a hoxel according to the present disclosure. Similarly, the beam may be used for direct illumination of a hoxel.

The illumination source can provide an angle-scannable non-monochromatic, collimated beam that may be injected into a TIR mode to illuminate a hoxel according to the present disclosure. Similarly, the beam may be used for direct illumination of a hoxel.

Because each hoxel can be illuminated simultaneously by multiple beams at different γ, θ, and λ it is possible to obtain a large parallelization speedup by an arrangement such as that illustrated in FIGS. 22 and 23. Each micromirror can illuminate a subset of the hoxels over a relatively small range of angles while all of the micromirrors together cover the full range of illumination angles. Because the micromirrors and their light sources can operate independently and in parallel, the parallelism speedup factor is roughly equal to the number of micromirrors when the field of view portion displayed via each micromirror does not overlap with the portions displayed via other micromirrors. However, in practice it will not be uncommon for there to be an overlap of roughly 9×, so the speedup will be more on the order of one-ninth of the number of micromirrors.

The combined speedup due to parallelism can be on the order of 3000×: ~100× for ~100 micromirrors, and ~30× for multiple-angle illumination. Using the system of FIG. 20a, the speedup can in principle be even greater by a factor of approximately another 30× for a total of ~9,000×.

Human vision can discriminate about 150 different monochromatic colors in the spectrum from 380 nm to 780 nm. Wavelengths closer together than about 3 nm are very difficult to distinguish. In an image displayed in RGB color, it is possible to adjust the color balance according to the chromaticity diagram to produce the same perceived color if any of the R, G, or B wavelengths is shifted by 3 nm or more. In an RGB display based on the current disclosure, color distortions caused by wavelength multiplexing can be corrected by straightforward color mapping well within the ability of a person skilled in the art.

If the wavelengths are close enough together, they will be perceived as having the same color, and if they are separated enough, they can be used to provide additional pixels so that there are more pixels in a column than there are hoxels. If the wavelength range used to illuminate a hoxel is great enough that the human eye can perceive color differences, the perceived color can be corrected by appropriately adjusting the relative intensities of red, green, and blue for each displayed pixel in accordance with the well-known principles of human color vision.

FIG. 34 illustrates an illumination arrangement having a tiltable micromirror 3408 that has one tilt axis 3410. A monochromatic beam 3412 is incident onto tiltable micromirror 3408 and is redirected as beam 3414 to hoxel 3402. Line 3406 is a perpendicular axis to tiltable micromirror 3408, and changes direction when the micromirror 3408 is tilted on the tilt axis 3410. Hoxel 3402 diffraction reflects beam 3414 according to the conical diffraction relations to become beam 3416 directed toward an eyebox 3422. The perceived beam 3416 appears as if it is a beam 3418 from a pixel 3404 from a curved row of pixels 3430 in a plane (not shown) at optical infinity. Each position of the tiltable micromirror will correspond to a visually perceived pixel (not shown) at optical infinity. Alternatively, hoxel 3402 may be so constructed as to provide the formation of the visually perceived pixel in a plane (not shown) closer to the eye of the observer (not shown) than at optical infinity.

FIG. 35A illustrates a single curved hoxel 3504 of an HOE 3502 and the Bragg planes 3506 of the hoxel 3504. The hoxel 3504 has curved edges 3530, 3532. The illumination beam angle range 3510 is the horizontal angular range over which an illumination beam may be swept while meeting the conical diffraction conditions for hoxel 3504. This angular range 3510 may be divided into a number, e.g. three, angular sub-ranges 3512, 3514, 3516. The rays 3522, 3524 define the angular range 3512. The rays 3524, 3526 define the angular range 3514. The rays 3526, 3528 define the angular range 3516.

FIG. 35B illustrates the curved edge hoxel 3504 approximated by three straight edge hoxels 3542, 3544, 3546. Hoxel 3542 has Bragg planes 3548. Hoxel 3544 have Bragg planes 3550. Hoxel 3546 have Bragg planes 3552. The Bragg planes 3548, 3550, 3552 have the same orientation and spacing as the Bragg planes 3506 of curved hoxel 3504 of FIG. 35A. Each hoxel comprises a plurality (in this case three) of sub-hoxels whose Bragg plane axes may include a component in the horizontal direction as well as in the vertical direction. The angular ranges of illumination for the sub-hoxels are indicated as 3543, 3545, and 3547 for sub-hoxels 3542, 3544, and 3546 respectively. The sub-hoxels do not necessarily need to overlap within a hoxel, although it is easier to obtain a perceptually smooth transition between pixels if the sub-hoxels do overlap.

In the example of FIG. 35C, the Bragg planes 3560 of hoxel 3570 have a different orientation and/or grating pitch than the Bragg planes 3548 of hoxel 3542. The Bragg planes 3562 of hoxel 3572 has the same orientation and/or grating pitch as the Bragg planes 3550 of hoxel 3544. The Bragg planes 3564 of hoxel 3574 have a different orientation and/or grating pitch than the Bragg planes 3552 of hoxel 3546. It is in this way that the total angular range 3510 of hoxel 3504 of FIG. 35A may be sub-divided into small angular ranges 3576, 3578, 3580 that may enable simpler illumination arrangements.

This splitting a curved hoxel into three hoxels with different Bragg plane orientations may be utilized to reduce the size of the illumination beam angular direction range needed to provide a given horizontal field of view (FOV). Similarly, splitting a curved hoxel into three hoxels with different Bragg plane orientations may be utilized to allow a more compact illumination system.

As shown in FIG. 35A, hoxels may have curved edges in a predominantly horizontal direction. Hoxels (not shown) may have curved edges in the vertical direction. With curved hoxel edges in the vertical direction, similar sub-division of the hoxel into multiple hoxels, as in FIGS. 35A-C, may be adapted to reduce the illumination angular range.

The size of the eyebox is largely determined by two factors: the height of the individual hoxels and the widths of the illuminating beams as illustrated in FIG. 11. When a hoxel is illuminated via TIR, it is illuminated upon each bounce of the beam during TIR. The multiple bounces provide an extended height to the eyebox. A thin HOE plate, say 1 mm, can provide as many as 6 bounces in a 10 mm hoxel width, so the illumination beam can be as narrow as about 1.5 mm and still produce a diffracted beam about 10 mm wide. Moreover, multiple bounces in TIR increase the effective diffraction efficiency of the hoxel being illuminated, because if the diffraction efficiency is, e.g. 1% in a single bounce, and TIR allows, say, four bounces while a light beam is within the hoxel, then the effective diffraction efficiency would be nearly 4%.

The eyebox width may also be made wider or taller by employing a beam expander such as that described in Sangsik Kim et al., *Phontonic Waveguide to Free-Space Gaussian Beam Extreme Mode Converter*, 7:72, Light: Science & Applications (2018) (DOI 10.1038/s41377-018-0073-2).

Micromirrors may be mounted in such a way and illuminated in such a way that only a single-axis scan is needed to address the pixels addressed by each micromirror. In this case, each micromirror can be angled relative to its axis of rotation. A reflected beam sweeps through a conic section (ellipse, paraboloid or hyperboloid curve) as the micromirror tilts on its angled axis, so that the reflected beam sweeps through a curve that provides a series of beam directions and positions that meet conical diffraction conditions for a hoxel. A non-monochromatic source like an LED allows this approach to work more easily, because it relaxes the requirement for precise angular control.

In some alternative embodiments, the HOE includes hoxels whose Bragg plane axes are tilted by varied amounts not only in the vertical direction but also in the horizontal direction illustrated in FIG. 35C. This allows additional freedom in the design of the illumination apparatus.

FIG. 36 illustrates eyewear with HOE for viewing virtual information. Optics compartment 3606 may contain the optical system of FIG. 31, from which emerges a coherent fiber bundle carrying individually modulated light beams, one for each pixel in the display. The fibers enter a distribution manifold and continue to selected positions within the frame 3610 of the eyeglasses, where their light enters the edge of the HOE 3614 (which comprises the eyeglass lens) traveling in the angular direction and having the wavelength that enables it to be diffracted by the hoxels in the HOE to display corresponding pixels at infinity.

Figure 37A:
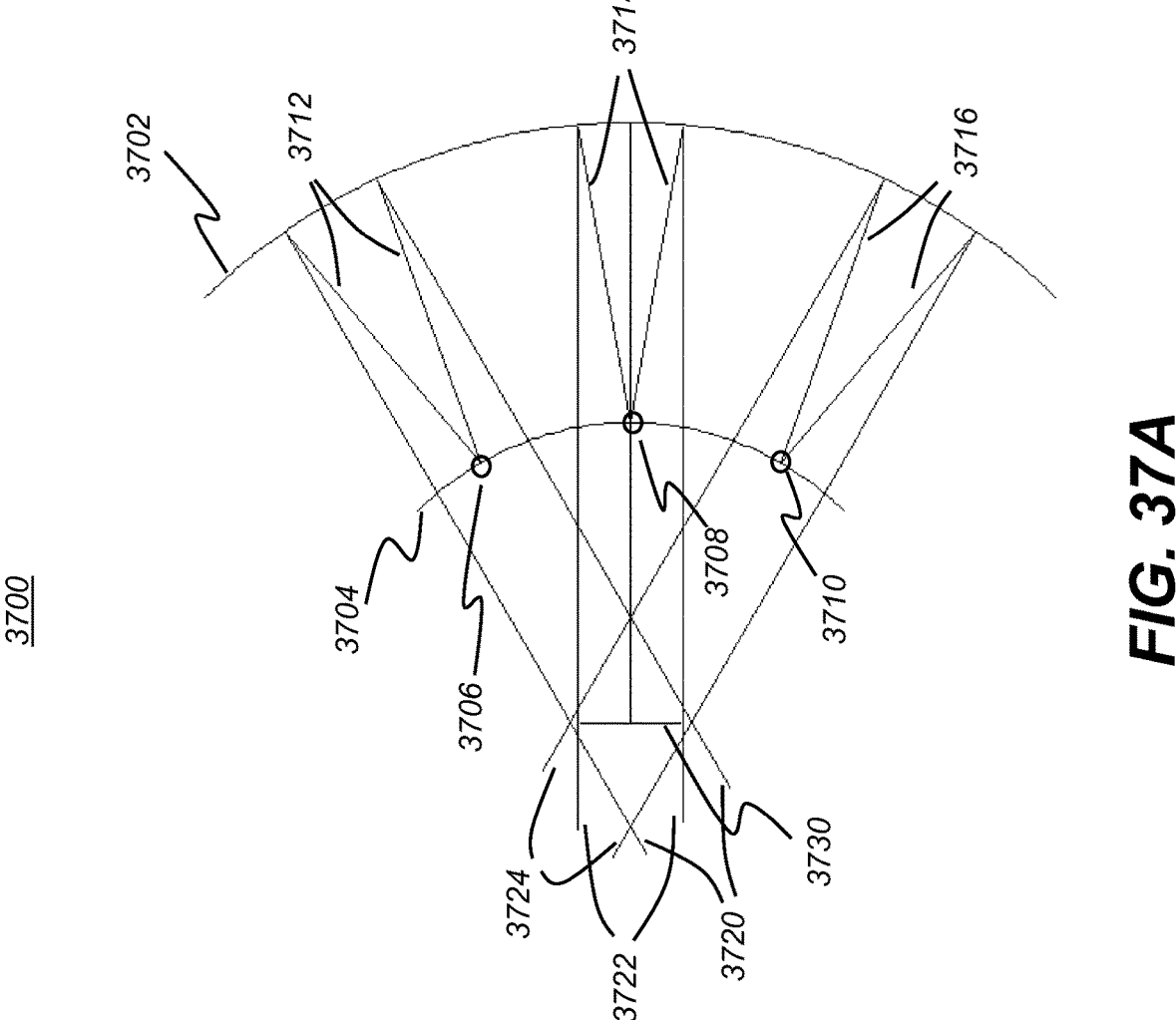

FIG. 37A shows a portion of an optical system 3700 (which may be referred to here as a "Schmidt Projector") comprising a spherical mirror 3702 and a spherical source surface 3704. The spherical source surface 3704 has a radius of curvature equal to ½ of the radius of curvature of the spherical mirror 3702. The sphere center of the spherical source surface 3704 is coincident with the sphere center of the spherical mirror 3702. The spherical source surface 3704 has pixels 3706, 3708, 3710, that emit divergent light bundles 3712, 3714, 3716 that are reflected by the spherical mirror 3702 to become collimated ray bundles 3720, 3722, 3724. The collimated ray bundles 3720, 3722, 3724, intersect each other to form an eyebox 3730 at the center of the spherical mirror 3702. The optical geometry of FIG. 37 can be optically folded into various geometries.

Figure 37B:
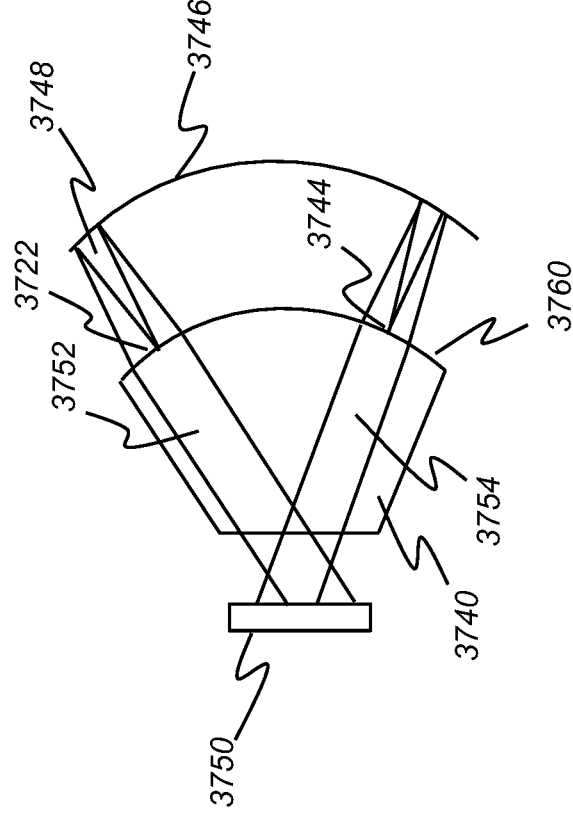

FIG. 37B shows a variation of the Schmidt Projector design introduced in FIG. 37A. Element 3740 is a transparent refractive lens with spherical surface 3760. Light emitted from points on surface 3760 reflects off spherical mirror 3746 to form a diverging beam 3748 which is collimated by refraction at spherical surface 3760, to travel as a collimated beam 3752 through lens 3740. An advantage to this variation of the Schmidt Projector is that the distance from surface 3760 to spherical mirror 3746 can be substantially less than ½ the radius of curvature of surface 3760.

FIG. 38 is an illustration of an image viewing system 3800 comprising a spherical mirror 3802 and an image source system 3804 comprising a spherical diffusion surface 3806 and a projector 3808. Image viewing system 3800 further comprises a quarter wave plate 3820, a polarizer 3822 where polarizer 3822 may be a wire grid polarizer. Image viewing system 3800 further comprises a tilt mirror 3830 and a waveguide assembly 3832. Waveguide assembly 3832 comprises an injection prism assembly 3840 that is attached to a waveguide plate assembly 3842. The injection prism assembly 3840 may comprise one or more prisms assembled into a final prism assembly shape. One or more surfaces of injection prism assembly 3840 may be coated to be a mirror surface. One or more surfaces of injection prism assembly 3840 may be coated with antireflective coatings or absorptive coatings. In some embodiments, the injection prism assembly 3840 may comprise a diffraction grating. The waveguide plate assembly 3842 may comprise multiple stacked planar waveguides. Waveguide plate assembly 3842 comprises one or more volume holograms 3844 embedded into the waveguide plate assembly 3842. The one or more volume holograms 3844 may be attached to an outer surface of waveguide plate assembly 3842. Volume holograms 3844 may comprise one or more hoxels. Image viewing system 3800 forms a viewing eye box 3850. The location of the viewing eye box 3850 is such that the optical path length from the surface of the spherical mirror 3802 to the viewing eye box 3850 is the same as the radius length of the spherical mirror 3802.

A ray 3860 from the image source system 3804 is directed to the spherical mirror 3802 where it is reflected to the tilt mirror 3830. The tilt mirror allows the rays from the imaging source system 3804 to charge the angular range of the image source system 3804 in the final viewing image. That is, if the image source system only displays 20 rows of pixels, by tilting the tilt mirror 3830 and multiplexing what the pixels display with the position of the tilt mirror 3830, the final image may appear to have 40 rows of pixels or more.

Injection prism assembly 3840 provides a means for injecting the image bearing rays into the waveguide plate assembly 3842 where the rays 3860 propagate from through the waveguide plate assembly 3842 by total internal reflection. When rays 3860 intersect with the volume holograms 3844 a portion of the rays 3860 are diffracted out of the waveguide plate assembly 3842 to become rays 3862 that propagate to the viewing eye box 3850. A portion of the rays 3860 are reflected at the volume holograms 3844 surface and continue to propagate along the waveguide plate assembly 3842 by total internal reflection to encounter the volume holograms 3844 again, potentially several times. At each encounter with the volume holograms 3844 a portion of the rays is diffracted out of the waveguide plate assembly 3842 and a portion is reflected to remain in the waveguide plate assembly 3842.

FIG. 39A is a side view and FIG. 39B is a top view of an image viewing system 3900 comprising a waveguide assembly 3902 comprising a parallel plate waveguide 3904, and a prism assembly 3906. Image viewing system 3900 further comprises a tilt mirror 3908 and an image projector 3910. In one embodiment, a quarter wave plate and wire grid polarizer assemble 3920 is embedded into the parallel plate waveguide 3904. One end 3922 of the parallel plate waveguide 3904 is formed into a portion of a spherical mirror and is coated by a material suitable to form a minor, e.g. silver or other known material used to form mirrors. One or more volume holograms 3930 are attached to an outer surface 3932 of parallel plate waveguide 3904. The volume holograms 3930 may comprise one or more hoxels (not shown) where each hoxel is a collection of Bragg planes. Parallel plate waveguide 3904 may further comprise an image source diffusive surface 3940 conforming to a spherical surface whose radius is half of the radius of surface 3922. Image source diffusive surface 3940 may be embedded into parallel plate waveguide 3904 or may virtually embedded therein via optical folding. Light rays diffracting out of the volume holograms 3930 form image viewing eye box 3950 from which the projected image may be viewed. Tilt mirror 3908 is synchronized with the projector 3910 and multiplexed so that multiple collections of rows of image pixels are formed in the eye box from a single collection of projector rows of pixels. That is, if the project has or utilizes only 20 rows of pixels, then by multiplexing the pixels with the position of the tilt mirror 3908, the image formed may have 40 or more rows of pixels. In one embodiment, instead of rows of pixels, these are columns of pixels.

It is to be understood that optical metamaterials may be used to serve the function of diffraction gratings, Fresnel lenses, Fresnel zone plates, holographic lenses, beamsplitters, wave plates, and the like, in the present disclosure. Moreover, optical metamaterials as are known in the art may be used to achromatize refractive optical elements and/or correct aberrations to improve image resolution in displays made according to the present disclosure. Although several embodiments refer to HOE structures, such structures should be considered as examples of volume Bragg gratings more generally.

It should be appreciated that certain features of the near-eye display system and/or the components thereof, which are, for clarity, described in the context of separate embodiments, may also be provided in combination in a single embodiment. Conversely, various features of the near-eye display system and/or the components thereof, which are, for brevity, described in the context of a single embodiment, may also be provided separately or in any suitable combination. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A display apparatus for encoding and displaying images, comprising:
   a transmissive waveguide;
   a volume Bragg grating having at least one hoxel arranged along or within the transmissive waveguide, wherein the volume Bragg grating is configured to reflect light beams having a wavelength and an incidence angle to a conical axis satisfying conical diffraction conditions;

an illuminator operable to generate the light beams over a range of incidence angles to the conical axis, a range of wavelengths, and a range of rotational angles about the conical axis; and a controller, in communication with the illuminator, operable to encode the images and to directly control the rotational angle, the wavelength, and the incidence angle to the conical axis of the light beams incident on the at least one hoxel.

2. The display apparatus of claim 1, wherein one or more pixels of the images are encoded with a change in the incidence angle to the conical axis and a corresponding change in the wavelength of the light beams operable to satisfy the conical diffraction conditions.

3. The display apparatus of claim 2, wherein one or more other pixels of the images are encoded with a change in the rotational angle of the light beams.

4. The display apparatus of claim 3, wherein the illuminator includes a light source and a beam steering device operable to direct the light beams into the volume Bragg grating, wherein the beam steering device comprises a plurality of tiltable micromirrors.

5. The display apparatus of claim 1, wherein the at least one hoxel is one of a plurality of hoxels within the volume Bragg grating, the plurality of hoxels including a first hoxel and a second hoxel that at least partially overlap and have different conical diffraction conditions configured to convey different portions of the images.

6. The display apparatus of claim 5, wherein each of the first and second hoxels are formed as a plurality of Bragg planes having respective first and second conical axes oriented normal to their respective plurality of Bragg planes.

7. The display apparatus of claim 6, wherein the first and second conical axes are oriented in different directions and the spacing of the respective plurality of Bragg planes of the first and second hoxels are different, whereby the first and second hoxels are configured to direct light beams to different portions of the images.

8. The display apparatus of claim 7, wherein the first and second hoxels are relatively offset and arranged in regions of the volume Bragg grating operable to direct light beams into an eyebox over a range of pixels supported by each of the first and second hoxels.

9. The display apparatus of claim 7, wherein the illuminator is arranged to emit light within discrete wavelength bands associated with the first and second hoxels wherein at any given incidence angle within the range of incidence angles to the conical axis satisfying conical diffraction conditions of the first and second hoxels, the light beams are reflected from only one of the first and second hoxels.

10. The display apparatus of claim 9, wherein the discrete wavelength bands controlling angular outputs of the first and second hoxels are limited such that variations in wavelength within the wavelength bands are not perceived as changes in color by a wearer.

11. The display apparatus of claim 9, wherein the one or more wavelength bands satisfy the conical diffraction conditions of the first and second hoxels over respective ranges of incidence angles to the conical axis spanning at least one-half degree.

12. The display apparatus of claim 5, wherein the transmissive waveguide forms part of a wearable device configured to convey images generated in a position offset from a wearer's eye.

13. The display apparatus of claim 1, wherein the at least one hoxel is one of a plurality of hoxels that overlap each other within the volume Bragg grating, wherein each of the plurality of hoxels overlaps with no more than two other hoxels of the plurality of hoxels.

14. A method of encoding and displaying images, comprising:

reflecting light beams satisfying conical diffraction conditions of at least one hoxel of a volume Bragg grating with paired combinations of wavelength and incidence angle to a conical axis of the at least one hoxel over a plurality of rotational angles about the conical axis, and generating the light beams in an encoded form of the images by controlling both the rotational angles and the paired combinations of wavelength and incidence angle to the conical axis of the light beams reflected from the at least one hoxel.

15. The method of claim 14, wherein the step of generating the light beams includes generating light beams having different incidence angles to the conical axis along with different wavelengths collectively satisfying the conical diffraction conditions operable to encode different pixels within the images.

16. The method of claim 15, wherein the step of generating the light beams includes generating light beams satisfying the conical diffraction conditions of the at least one hoxel at different rotational angles about the conical axis of the at least one hoxel operable to display a two-dimensional arrangement of pixels within the images.

17. The method of claim 16, wherein the step of reflecting includes reflecting the light beams satisfying the conical diffraction conditions of the at least one hoxel into an eyebox.

18. The method of claim 17, wherein the at least one hoxel is one of a plurality of hoxels within the volume Bragg grating including a first hoxel and a second hoxel, and arranging the first and second hoxels to at least partially overlap within the volume Bragg grating and to have different conical diffraction conditions configured to convey different portions of the images.

19. The method of claim 18, further comprising arranging the first and second hoxels with respective first and second conical axes that are oriented normal to respective first and second sets of Bragg planes and are relatively inclined to one another.

20. The method of claim 19, wherein the first and second sets of Bragg planes differ from one another in the spacing between their respective Bragg planes.

* * * * *